(12) United States Patent
Xie et al.

(10) Patent No.: US 12,259,278 B2
(45) Date of Patent: Mar. 25, 2025

(54) TEMPERATURE MEASUREMENT METHOD AND ELECTRONIC DEVICE

(71) Applicant: Huawei Technologies Co., Ltd., Shenzhen (CN)

(72) Inventors: Qi Xie, Wuhan (CN); Kai Qian, Shenzhen (CN); Liwei Huang, Shenzhen (CN); Hua Jiang, Nanjing (CN); Landi Li, Shanghai (CN); Wei Li, Shenzhen (CN); Jian Qin, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 517 days.

(21) Appl. No.: 17/581,254

(22) Filed: Jan. 21, 2022

(65) Prior Publication Data
US 2022/0146320 A1    May 12, 2022

Related U.S. Application Data

(63) Continuation of application No. PCT/CN2020/096039, filed on Jun. 15, 2020.

(30) Foreign Application Priority Data

Apr. 3, 2020  (CN) .......................... 202010261169.8

(51) Int. Cl.
*G01J 5/00*  (2022.01)
*G01J 5/80*  (2022.01)
(Continued)

(52) U.S. Cl.
CPC .......... *G01J 5/0003* (2013.01); *G01J 5/0025* (2013.01); *G01J 5/80* (2022.01); *G01K 13/223* (2021.01); *H04N 5/33* (2013.01); *H04N 23/611* (2023.01)

(58) Field of Classification Search
CPC .......... G01J 5/0003; G01J 5/80; G01J 5/0025; G01K 13/223; H04N 5/33; H04N 23/611
See application file for complete search history.

(56) References Cited

U.S. PATENT DOCUMENTS 10,060,798 B1    8/2018  Riscalla
10,518,900 B2 *  12/2019  Torres .................. H04N 17/002
(Continued)

FOREIGN PATENT DOCUMENTS

CN    1362825 A    8/2002
CN    2857354 Y    1/2007
(Continued)

OTHER PUBLICATIONS

Yu Zhibin, "Aerospace Physiology" Fourth Military Medical University Press, 2008, 1 page (abstract).
(Continued)

*Primary Examiner* — Randy W Gibson
(74) *Attorney, Agent, or Firm* — Conley Rose, P.C.

(57) ABSTRACT

A method, applied to an electronic device comprising a camera and a temperature sensor, wherein the method comprises displaying a temperature measurement interface, receiving, from a user, a temperature measurement operation, measuring, in response to the temperature measurement operation and using the temperature sensor, a first temperature of a measured object, collecting, using the camera, a picture of the measured object, determining, based on the picture, a type of the measured object, matching, based on the type, a first temperature algorithm for the measured object, and determining, based on the first temperature and first algorithm, a second temperature of the measured object.

20 Claims, 51 Drawing Sheets

(51) Int. Cl.
*G01K 13/20* (2021.01)
*H04N 5/33* (2023.01)
*H04N 23/611* (2023.01)

(56) References Cited

U.S. PATENT DOCUMENTS

| | | | |
|---|---|---|---|
| 11,450,428 B2* | 9/2022 | Soreefan | G01J 5/064 |
| 2016/0029896 A1* | 2/2016 | Lee | A61B 5/7221 |
| | | | 600/474 |
| 2016/0113517 A1* | 4/2016 | Lee | H04N 23/811 |
| | | | 600/474 |
| 2017/0006237 A1* | 1/2017 | Rud | G01J 5/044 |
| 2018/0313695 A1 | 11/2018 | Shim et al. | |
| 2019/0042871 A1* | 2/2019 | Pogorelik | G06T 5/73 |
| 2022/0283043 A1* | 9/2022 | Ju | H04N 23/611 |
| 2023/0075679 A1* | 3/2023 | Zhang | G01J 5/80 |
| 2023/0263399 A1* | 8/2023 | Wu | G01J 5/0265 |
| | | | 600/549 |
| 2024/0171863 A1* | 5/2024 | Yamashita | G06V 10/25 |

FOREIGN PATENT DOCUMENTS

| | | |
|---|---|---|
| CN | 103442113 A | 12/2013 |
| CN | 203745084 U | 7/2014 |
| CN | 105125181 A | 12/2015 |
| CN | 105933538 A | 9/2016 |
| CN | 106855436 A | 6/2017 |
| CN | 107095653 A | 8/2017 |
| CN | 107361748 A | 11/2017 |
| CN | 107456214 A | 12/2017 |
| CN | 108254081 A | 7/2018 |
| CN | 108344525 A | 7/2018 |
| CN | 108647562 A | 10/2018 |
| CN | 108760082 A | 11/2018 |
| CN | 109724703 A | 5/2019 |
| CN | 111259872 A | 6/2020 |
| CN | 111351579 A | 6/2020 |
| EP | 2577242 A1 | 4/2013 |
| EP | 2802128 B1 | 7/2018 |
| JP | 2013164745 A | 8/2013 |
| KR | 101720282 B1 | 3/2017 |
| KR | 20180136150 A | 12/2018 |
| WO | 2011151806 A1 | 12/2011 |
| WO | 2014142750 A1 | 9/2014 |

OTHER PUBLICATIONS

ITU-T H.264, Jun. 2019, "Series H: Audiovisual and Multimedia Systems, Infrastructure of audiovisual services—Coding of moving video , Advanced video coding for generic audiovisual services," 836 pages.

A. Peleki et al, "Novel Use of Smartphone-based Infrared Imaging in the Detection of Acute Limb Ischaemia," EJVES Short Reports, vol. 32, Jan. 1, 2016, XP093155835, 3 pages.

* cited by examiner

TEMPERATURE MEASUREMENT METHOD AND ELECTRONIC DEVICE

CROSS-REFERENCE TO RELATED APPLICATIONS

This is a continuation of International Patent Application No. PCT/CN2020/096039 filed on Jun. 15, 2020, which claims priority to Chinese Patent Application No. 202010261169.8 filed on Apr. 3, 2020. The disclosures of the aforementioned applications are hereby incorporated by reference in their entireties.

TECHNICAL FIELD

This application relates to the field of electronic technologies and terminals, and in particular, to a temperature measurement method and an electronic device.

BACKGROUND

With increased material living standards, temperature-related health information has gradually become an important concern in people's life. For example, body temperature information of children and the elderly is periodically obtained, to monitor a human health status of children and the elderly. Alternatively, body temperature information of a pet is periodically obtained, to monitor a health status of the pet. Alternatively, in life, a user wants to measure a temperature of milk, bath water, flour fermentation, or the like.

The most commonly used temperature measurement devices include contact temperature measurement devices such as a mercury thermometer and an electronic thermometer, or non-contact infrared temperature measurement devices such as a forehead thermometer, an ear thermometer, and an industrial thermometer. A mercury bulb of the mercury thermometer is easy to crack, which easily causes cross infection. In addition, the contact temperature measurement devices, such as the mercury thermometer and the electronic thermometer, have a low temperature measurement speed and are inconvenient for the user to carry.

The non-contact infrared thermometers, such as the forehead thermometer and the ear thermometer, can measure a temperature of a measured object in contact or non-contact mode and display a temperature measurement result. This can effectively avoid cross infection and eliminate a safety risk of the mercury thermometer. However, the non-contact infrared thermometers have a relatively small display screen. In an operation process, the user presses a mechanical button to start a temperature measurement module, or after temperature measurement is completed, the user presses a power button to turn off the thermometer. Therefore, the operation is complex. In addition, in a use process of the non-contact infrared thermometers, it is difficult to support a flexible touch operation, and implement a function such as temperature data management by the user.

SUMMARY

This application provides a temperature measurement method and an electronic device. In the method, a measured object is intelligently identified and matched, different temperature algorithms correspond to different measured objects, and different temperature correction algorithms are determined based on the different objects, to determine a temperature of the measured object, and to improve temperature measurement accuracy.

According to a first aspect, a temperature measurement method is provided, applied to an electronic device including at least one camera and a temperature sensor, where the method includes displaying a temperature measurement interface, receiving a temperature measurement operation of a user, and in response to the temperature measurement operation, measuring a first temperature of a measured object by using the temperature sensor, turning on the at least one camera, collecting a picture of the measured object by using the at least one camera, and determining a type of the measured object based on the picture of the measured object, matching a temperature algorithm for the measured object based on the type of the measured object; and determining a second temperature of the measured object based on the first temperature and the temperature algorithm.

Optionally, the temperature sensor may be an infrared temperature sensor.

It should be understood that the first temperature may be a temperature of the measured object directly measured by the temperature sensor. After intelligently identifying the type of the measured object, the electronic device matches the temperature algorithm for the measured object. The second temperature is a final temperature obtained through calculation based on the temperature algorithm and the first temperature.

According to the foregoing technical solution, when temperatures of different measured objects such as a human body, an animal, and another object are measured, the picture of the measured object may be obtained by using the camera of the electronic device. The different measured objects are intelligently identified by using an identification function of the electronic device, the temperature algorithm is matched based on the different measured objects, and temperature correction is performed based on the temperature measured by the temperature sensor, to improve temperature measurement accuracy.

With reference to the first aspect, in some implementations of the first aspect, the method further includes receiving a recording operation of the user, and in response to the recording operation, displaying a predicted object name, and when the predicted object name includes the measured object, saving information about the second temperature in an information base of the measured object, or when the predicted object name does not include the measured object, adding the measured object to the predicted object name, and saving information about the second temperature in an information base of the measured object.

According to the foregoing solution, after the temperatures of different measured objects such as a human body, an animal, and another object are measured, the electronic device may intelligently manage temperature data based on different temperature measurement results. Further, after the temperature is measured, the user may record the temperature data of the different measured objects by using a thermometer application, and may associate the measured object with an address book, a gallery, a biometric identification user, or the like of a mobile phone, to intelligently manage the temperature data, and to improve user experience.

In a possible implementation, the predicted object name may be associated with an address book contact of the electronic device. Optionally, a predicted object name in a temperature record window is associated with an address book list of the mobile phone, and one or more contacts in the address book list of the mobile phone may be displayed in the predicted object name. The user selects a current measured object from the contacts, for example, taps "Xiao Ming" to save temperature information to "Xiao Ming". Optionally, after the temperature information is saved, the recorded temperature information may be viewed in contact information of "Xiao Ming" in the address book.

Alternatively, the predicted object name "Xiao Ming" displayed in the temperature record window is displayed to the user after the mobile phone performs screening and matching from the address book. Further, if a profile picture of "Xiao Ming" that is stored in the address book is used as a contact profile picture, after the temperature is measured, the mobile phone obtains facial information of the measured object and the like by using a camera component (for example, a wide-angle camera or a macro lens), compares the facial information, and matches the profile picture of "Xiao Ming", to determine that the current measured object is "Xiao Ming". "Xiao Ming" is displayed in the temperature record window. The user can tap "OK" to save current temperature information in the information of "Xiao Ming". In this process, the user does not need to select the current measured object from the plurality of contacts, and the measured object is automatically matched for the user. The process is simple and facilitates user operations.

Alternatively, the user goes to the address book list of the mobile phone through a jump link in the temperature record window, so that the user selects the current measured object. After finding "Xiao Ming", the user may select "Xiao Ming" and store current temperature information. This is not limited in this embodiment of this application.

In another possible implementation, the predicted object name may be associated with a classified object marked in the gallery of the electronic device.

Optionally, the predicted object name "Xiao Ming" displayed in the temperature record window is an object in a portrait classification in a local album of the mobile phone, and a system performs screening and matching from a plurality of portrait objects, and then displays "Xiao Ming" to the user. Specifically, if a portrait album of "Xiao Ming" is established in the local album, after the temperature is measured, the mobile phone obtains facial information of the measured object by using a camera component (for example, a wide-angle camera or a macro lens), compares the facial information, and matches a portrait of "Xiao Ming", to determine that the measured object is "Xiao Ming". "Xiao Ming" is displayed in the temperature record window. The user can tap "OK" to save current temperature information in the information of "Xiao Ming". In this process, the user does not need to select or enter the current measured object, and the measured object is automatically matched for the user. The process is simple and facilitates user operations.

Alternatively, the user goes to an album list of the mobile phone through a jump link in the temperature record window, so that the user selects a photo of "Xiao Ming". The photo of "Xiao Ming" may be selected and the current temperature information may be stored. This is not limited in this embodiment of this application.

In still another possible implementation, a measurement result may be matched with a fingerprint user that has been established by the mobile phone.

Further, the predicted object name displayed in the temperature record window may be associated with the fingerprint user established by the mobile phone. For example, after temperature measurement is completed, the measured object may enter fingerprint information in a fingerprint identification module of the mobile phone, so that the temperature measurement result may be directly associated with the established fingerprint user. This is not limited in this embodiment of this application.

The foregoing implementation may automatically match the measured object for the user. This process is simple and facilitates user operations. In addition, the user can manually mark a measured object name for matching. For example, the user manually enters and saves a text. Alternatively, the user takes a photo of the measured object, and marks and saves data and the photo of the measured object.

With reference to the first aspect and the foregoing implementations, in some implementations of the first aspect, when the measured object is a person, the method further includes: determining a measurement part of the person based on the picture of the measured object; and determining a first correction algorithm based on the measurement part; and the determining a second temperature of the measured object based on the first temperature and the temperature algorithm includes determining the second temperature of the measured object based on the first temperature, the temperature algorithm, and the first correction algorithm.

In a possible implementation, the camera assembly of the electronic device may include one or more cameras, for example, a first camera and a second camera. A field of view (FOV) of the first camera is greater than an FOV of the second camera. The electronic device may collect overall information of the measured object using the first camera, and collect partial human body information by using the second camera.

It should be understood that one camera can cover a specific range of scenery, and the specific range is usually represented by an angle. The angle is referred to as a field of view FOV of a lens. In other words, the FOV refers to the range covered by the lens, and an object beyond the range is not captured in the lens.

Optionally, the camera assembly of the electronic device may include a wide-angle camera, a primary camera, a macro lens, a long-focus camera, a time of flight (TOF) camera, and the like. A form and a quantity of cameras lenses are not limited in this embodiment of this application.

Optionally, in different scenarios, different cameras in a camera assembly 10 may be invoked. For example, when a body temperature of a person is measured, the person is relatively close to a mobile phone. To obtain a feature of the person, the wide-angle camera may be used to obtain a full-view feature of the person, or the macro lens may be used to obtain facial information.

Alternatively, the mobile phone may obtain a full-view feature of the measured object by using the wide-angle camera, and determine, based on the full-view feature, that the measured object is a person, a pet, or another object; and further obtain detail information by using the macro lens, and determine that a forehead, an oral cavity, an armpit, or the like is specifically measured when a human body temperature is measured. This is not limited in this embodiment of this application.

With reference to the first aspect and the foregoing implementations, in some implementations of the first aspect, the picture of the measured object includes a facial feature of the measured object, and when a degree of matching between the facial feature and a profile picture of a first contact in the address book contacts is greater than a preset value, the first contact is displayed in the predicted object name.

With reference to the first aspect and the foregoing implementations, in some implementations of the first aspect, the picture of the measured object includes the facial feature of the measured object, and when a degree of matching between the facial feature and a first portrait user marked in the gallery is greater than a preset value, the first portrait user is displayed in the predicted object name.

With reference to the first aspect and the foregoing implementations, in some implementations of the first aspect, the method further includes when a preset scenario is met, displaying, by the electronic device, a first prompt window or sending a first voice prompt, where the first prompt window or the first voice prompt is used to prompt the user that the second temperature cannot be currently displayed, and the preset scenario includes any one or more of the following detecting that the second temperature is beyond a first preset range, or detecting that a distance between the measured object and the temperature sensor is beyond a second preset range, or failing to detect the measured object, or detecting that an ambient temperature is beyond a third preset range; or detecting that a temperature of the electronic device is beyond a fourth preset range.

With reference to the first aspect and the foregoing implementations, in some implementations of the first aspect, when the measured object is a person, if the second temperature is within the first preset range and it is determined, based on the second temperature, that a health status of the measured object is abnormal, the method further includes displaying a second prompt window or sending a second voice prompt, where content of the second prompt window or the second voice prompt includes one or more of the following the abnormal health status of the measured object, or outpatient medical information for the abnormal health status of the measured object, or a news event related to the abnormal health status of the measured object.

In conclusion, according to the temperature measurement method provided in this embodiment of this application, new thermometer software is designed based on the electronic device integrated with the infrared temperature sensor. The user may measure the temperatures of the different objects such as the human body, the object, and the animal by using the electronic device and the thermometer software. The temperature data is intelligently managed based on the temperature measurement results of the different objects.

In a temperature measurement process, the user may select different temperature measurement modes based on a current requirement, for example, select a body temperature measurement mode or an object temperature measurement mode. For the different temperature measurement modes, the mobile phone may intelligently identify the current measured object, and perform temperature based on different parts of the current measured object, to improve temperature measurement accuracy.

After the temperature is measured, the user may record the temperature data of the different measured objects by using a thermometer application, and may associate the measured object with an address book user of the mobile phone, an object identified by the gallery, a fingerprint user, and the like, to manage the temperature data more intelligently. In addition, when the temperature measurement result is abnormal, for example, when it is determined, based on a high body temperature, that the measured object has a fever, the mobile phone may automatically recommend information such as a position and a phone number of a fever clinic to the user. Alternatively, the mobile phone may automatically connect to a cloud server, obtain a current phase current news even, and send a prompt message to the user, for example, an epidemic prevention measure and a precaution related to a fever.

With reference to the first aspect and the foregoing implementations, in some implementations of the first aspect, the method further includes determining a second correction algorithm based on the type of the measured object. The determining a second temperature of the measured object based on the first temperature and the temperature algorithm includes determining the second temperature of the measured object based on the first temperature, the temperature algorithm, the first correction algorithm, and the second correction algorithm.

With reference to the first aspect and the foregoing implementations, in some implementations of the first aspect, the determining a second correction algorithm based on the type of the measured object includes determining an epsilon of the measured object based on the type of the measured object, and determining the second correction algorithm based on the epsilon of the measured object.

It should be understood that in a temperature measurement process, after obtaining the temperature measured by the infrared temperature sensor, the mobile phone may correct, based on the different measured objects or measurement scenarios, the temperature obtained by the infrared temperature sensor, to obtain a final measurement result. In other words, the different measurement scenarios may correspond to different error correction algorithms.

It should be further understood that, if a black body is an ideal object and an epsilon of the black body is 1, for different measured objects, energy of the measured object may be corrected based on different epsilons.

According to the foregoing solution, in a process of obtaining the measurement result, the measured object is intelligently detected and identified, for example, the measured object is identified as a person or an object, and different temperature algorithm models or temperature correction algorithms are matched based on the identified measured object. Alternatively, the measurement result may be corrected based on the ambient temperature, to more accurately determine the temperature of the measured object, and to improve temperature measurement accuracy.

With reference to the first aspect and the foregoing implementations, in some implementations of the first aspect, after the determining the final second temperature of the measured object, the method further includes when the second temperature is within the first preset range, displaying the second temperature in the temperature measurement interface or broadcasting the second temperature by voice.

For example, after the user correctly performs a measurement operation and measures the temperature, the mobile phone notifies, through voice broadcast, the user that, "The current body temperature is 36° C., and the body temperature is normal". Alternatively, when the user incorrectly performs a temperature measurement operation, or in various abnormal scenarios, the mobile phone may notify the user of a correct operation through voice broadcast. In addition, an alarm prompt tone may be further added to prompt the user that the operation is incorrect. Alternatively, when the temperature measured by the user is too high, for example, 39.5° C., the mobile phone may add an alarm prompt tone, and notify, through voice broadcast, the user that the current measured object is in a high fever state, and the user needs to seek medical treatment in time. This is not limited in this embodiment of this application.

With reference to the first aspect and the foregoing implementations, in some implementations of the first aspect, the information about the second temperature further includes information about a measurement time point, and after the saving information about the second temperature in an information base of the measured object, the method further includes receiving a deletion operation of the user, and in response to the deletion operation, deleting the current information about the second temperature or deleting information about all second temperatures of the measured object.

With reference to the first aspect and the foregoing implementations, in some implementations of the first aspect, after the displaying a temperature measurement interface, the method further includes calibrating the temperature sensor, where the calibration manner includes one or more of the following: automatically calibrating the temperature sensor, or periodically calibrating the temperature sensor, or when receiving a calibration operation instruction of the user, calibrating the temperature sensor in response to the calibration operation instruction, or calibrating the temperature sensor when detecting an environment change or a position change of the electronic device.

Further, before starting temperature measurement, the mobile phone may automatically calibrate the temperature based on the current ambient temperature, or start temperature calibration based on a selection of the user, to reduce impact of the ambient temperature on the temperature measurement result and to improve temperature measurement accuracy.

In a possible implementation, when the user taps the thermometer application and the thermometer application is run, the system may automatically perform calibration. When the system completes automatic calibration and the user does not perform a temperature measurement operation within a period of time, before measuring a temperature next time, the user may tap a "Manually calibrate" button for recalibration, to improve temperature measurement accuracy.

Alternatively, the mobile phone may perform automatic calibration based on a change of a current position. For example, the mobile phone detects, by positioning, that a current position changes. For example, the mobile phone determines that the position changes when a movement distance exceeds 5 meters, for example, a position change between cities, a position change between different areas of a city, or a position change from home to outdoor. When the thermometer application is run twice, the mobile phone may determine, based on the position change, that a position of the currently running thermometer application is different from a position of previous temperature measurement, and the mobile phone starts an automatic calibration process. It should be understood that a positioning manner of the mobile phone is not limited in this embodiment of this application.

Alternatively, the mobile phone may further determine, based on a change of an angle at which the user holds the mobile phone, that angles at which the user holds the mobile phone change at two times of consecutive temperature measurement, for example, by using various sensors such as a gyro sensor and an acceleration sensor of the mobile phone. The change of the angle at which the mobile phone is held may affect a temperature sensing status of the infrared temperature sensor. For example, a temperature of a hand of the user may affect measurement of the infrared temperature sensor. In this case, the mobile phone may start the automatic calibration process. It should be understood that a manner of detecting the angle at which the user holds the mobile phone is not limited in this embodiment of this application.

It should be understood that, in addition to the foregoing described scenarios, the mobile phone may further detect more scenario changes, and then start the automatic calibration process. This is not limited in this embodiment of this application.

It should be further understood that a difference in the ambient temperature affects an energy value received by the infrared temperature sensor, and the energy value is reflected in a final temperature measurement result. In the automatic calibration process, the temperature of the environment in which the object is located may be automatically obtained before the temperature of the object is measured, and the infrared temperature sensor of the mobile phone is automatically calibrated based on the ambient temperature. In other words, the measured object temperature is corrected or temperature compensation is performed based on the ambient temperature, to reduce a temperature measurement error and improve temperature measurement accuracy.

It should be further understood that there may be different calibration methods for different types of infrared temperature sensors, such as a thermocouple type, a thermoelectric pile type, a thermal resistance type, a photovoltaic effect type, and an optoelectronic effect type. This is not limited in this embodiment of this application.

In conclusion, in the embodiments of this application, the temperature measurement function of the electronic device can be used to quickly and securely measure the body temperature of the infant anytime and anywhere. In the temperature measurement process, the temperature sensor does not need to contact the measured object. This makes the temperature measurement process more sanitary and safer. In addition, because the electronic device is portable and movable, temperatures of a human body and an object can be measured anytime and anywhere, and measurement results can be classified, recorded, intelligently matched, viewed, and managed, to avoid a trouble of carrying a plurality of devices by the user, and to improve user experience.

According to a second aspect, an electronic device is provided, including at least one camera and a temperature sensor, where the temperature sensor is disposed adjacent to the at least one camera, one or more processors, one or more memories, and a module on which a plurality of application programs are installed, where the memory stores one or more programs, and when the one or more programs are executed by the processor, the electronic device is enabled to perform the following steps displaying a temperature measurement interface, receiving a temperature measurement operation of a user, and in response to the temperature measurement operation, measuring a first temperature of a measured object by using the temperature sensor, turning on the at least one camera, collecting a picture of the measured object by using the at least one camera, and determining a type of the measured object based on the picture of the measured object, matching a temperature algorithm for the measured object based on the type of the measured object, and determining a second temperature of the measured object based on the first temperature and the temperature algorithm.

With reference to the second aspect, in some implementations of the second aspect, the method further includes receiving a recording operation of the user, and in response to the recording operation, displaying a predicted object name, and when the predicted object name includes the measured object, saving information about the second temperature in an information base of the measured object, or when the predicted object name does not include the measured object, adding the measured object to the predicted object name, and saving information about the second temperature in an information base of the measured object.

With reference to the second aspect and the foregoing implementations, in some implementations of the second aspect, when the measured object is a person, the method further includes determining a measurement part of the person based on the picture of the measured object; and determining a first correction algorithm based on the measurement part, and the determining a second temperature of the measured object based on the first temperature and the temperature algorithm includes determining the second temperature of the measured object based on the first temperature, the temperature algorithm, and the first correction algorithm.

With reference to the second aspect and the foregoing implementations, in some implementations of the second aspect, the picture of the measured object includes a facial feature of the measured object, and when a degree of matching between the facial feature and a profile picture of a first contact in the address book contacts is greater than a preset value, the first contact is displayed in the predicted object name.

With reference to the second aspect and the foregoing implementations, in some implementations of the second aspect, the picture of the measured object includes the facial feature of the measured object, and when a degree of matching between the facial feature and a first portrait user marked in the gallery is greater than a preset value, the first portrait user is displayed in the predicted object name.

With reference to the second aspect and the foregoing implementations, in some implementations of the second aspect, the method further includes when a preset scenario is met, displaying, by the electronic device, a first prompt window or sending a first voice prompt, where the first prompt window or the first voice prompt is used to prompt the user that the second temperature cannot be currently displayed, and the preset scenario includes any one or more of the following detecting that the second temperature is beyond a first preset range, or detecting that a distance between the measured object and the temperature sensor is beyond a second preset range, or failing to detect the measured object, or detecting that an ambient temperature is beyond a third preset range; or detecting that a temperature of the electronic device is beyond a fourth preset range.

With reference to the second aspect and the foregoing implementations, in some implementations of the second aspect, when the measured object is a person, if the second temperature is within the first preset range and it is determined, based on the second temperature, that a health status of the measured object is abnormal, the method further includes displaying a second prompt window or sending a second voice prompt, where content of the second prompt window or the second voice prompt includes one or more of the following the abnormal health status of the measured object, or outpatient medical information for the abnormal health status of the measured object; or a news event related to the abnormal health status of the measured object.

With reference to the second aspect and the foregoing implementations, in some implementations of the second aspect, the method further includes determining a second correction algorithm based on the type of the measured object. The determining a second temperature of the measured object based on the first temperature and the temperature algorithm includes determining the second temperature of the measured object based on the first temperature, the temperature algorithm, the first correction algorithm, and the second correction algorithm.

With reference to the second aspect and the foregoing implementations, in some implementations of the second aspect, the determining a second correction algorithm based on the type of the measured object includes determining an epsilon of the measured object based on the type of the measured object, and determining the second correction algorithm based on the epsilon of the measured object.

With reference to the second aspect and the foregoing implementations, in some implementations of the second aspect, after the determining the final second temperature of the measured object, the method further includes when the second temperature is within the first preset range, displaying the second temperature in the temperature measurement interface or broadcasting the second temperature by voice.

With reference to the second aspect and the foregoing implementations, in some implementations of the second aspect, the information about the second temperature further includes information about a measurement time point, and after the saving information about the second temperature in an information base of the measured object, the method further includes receiving a deletion operation of the user, and in response to the deletion operation, deleting the current information about the second temperature or deleting information about all second temperatures of the measured object.

With reference to the second aspect and the foregoing implementations, in some implementations of the second aspect, after the displaying a temperature measurement interface, the method further includes calibrating the temperature sensor, where the calibration manner includes one or more of the following automatically calibrating the temperature sensor; or periodically calibrating the temperature sensor, or when receiving a calibration operation instruction of the user, calibrating the temperature sensor in response to the calibration operation instruction, or calibrating the temperature sensor when detecting an environment change or a position change of the electronic device.

According to a third aspect, this application provides an apparatus. The apparatus is included in an electronic device, and the apparatus has a function of implementing behavior of the electronic device in the foregoing aspects and the possible implementations of the foregoing aspects. The function may be implemented by hardware, or may be implemented by hardware executing corresponding software. The hardware or the software includes one or more modules or units corresponding to the foregoing function, for example, a display module or unit, a detection module or unit, or a processing module or unit.

According to a fourth aspect, this application provides an electronic device, including a touch display screen, where the touch display screen includes a touch-sensitive surface and a display screen, a temperature sensor, where the temperature sensor is disposed adjacent to the at least one camera, one or more cameras, one or more processors, one or more memories, a plurality of application programs, and one or more computer programs. The one or more computer programs are stored in the memory, and the one or more computer programs include an instruction. When the instruction is executed by the one or more processors, the electronic device is enabled to perform the temperature measurement method in any possible implementation of any one of the foregoing aspects.

According to a fifth aspect, this application provides an electronic device, including one or more processors and one or more memories. The one or more memories are coupled to the one or more processors, the one or more memories are configured to store computer program code, the computer program code includes a computer instruction, and when the one or more processors execute the computer instruction, the electronic device is enabled to perform the temperature measurement method in any possible implementation of any one of the foregoing aspects.

According to a sixth aspect, this application provides a computer storage medium, including a computer instruction. When the computer instruction is run on an electronic device, the electronic device is enabled to perform the method for enabling a shortcut function in any possible implementation of any one of the foregoing aspects.

According to a seventh aspect, this application provides a computer program product. When the computer program product runs on an electronic device, the electronic device is enabled to perform the temperature measurement method in any possible implementation of any one of the foregoing aspects.

DESCRIPTION OF EMBODIMENTS

The following describes technical solutions in embodiments of this application with reference to accompanying drawings in the embodiments of this application. In descriptions of the embodiments of this application, "/" means "or" unless otherwise specified. For example, A/B may represent A or B. In this specification, "and/or" describes only an association for describing associated objects and represents that three relationships may exist. For example, A and/or B may represent the following three cases Only A exists, both A and B exist, and only B exists. In addition, in the description in the embodiments of this application, "a plurality of" means two or more.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features.

The temperature measurement method provided in the embodiments of this application may be applied to an electronic device on which a temperature measurement module is installed, for example, a mobile phone, a tablet computer, a wearable device, a vehicle-mounted device, an augmented reality (AR)/virtual reality (VR) device, a notebook computer, an ultra-mobile personal computer (UMPC), a netbook, or a personal digital assistant (PDA). Optionally, the temperature measurement module may include an infrared temperature sensor and the like. A specific type of the electronic device is not limited in this embodiment of this application.

Figure 1:
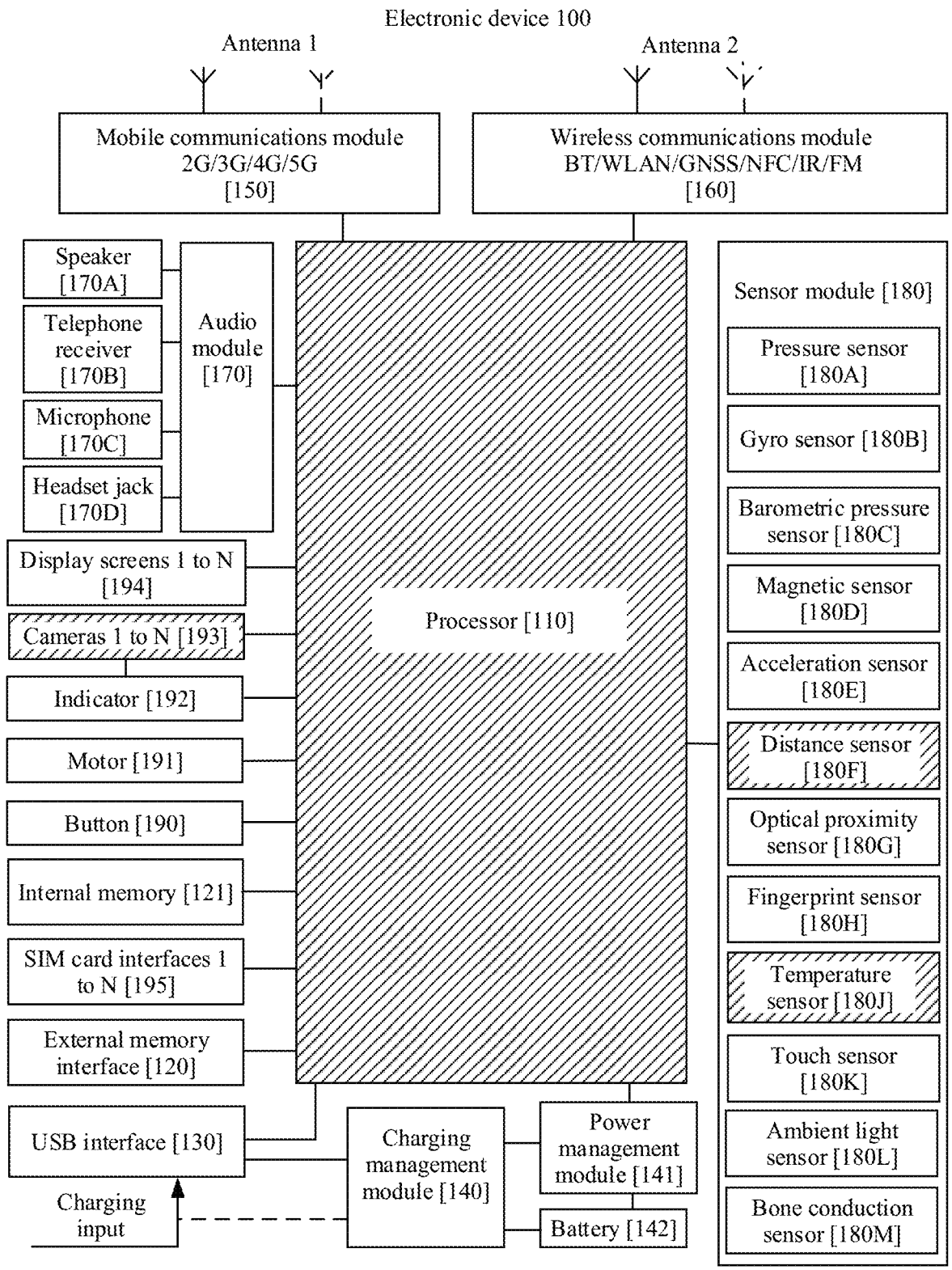
FIG. 1 is a schematic structural diagram of an electronic device according to an embodiment of this application.

For example, FIG. 1 is a schematic structural diagram of an electronic device 100 according to an embodiment of this application. The electronic device 100 may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a telephone receiver 170B, a microphone 170C, a headset jack 170D, a sensor module 180, a button 190, a motor 191, an indicator 192, a camera 193, a display screen 194, a subscriber identity module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that an example structure in this embodiment of this application does not constitute a specific limitation on the electronic device 100. In some other embodiments of this application, the electronic device 100 may include more or fewer components than those shown in FIG. 1, or some components may be combined, or some components may be split, or different component arrangements may be used. The components in FIG. 1 may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural processing unit (NPU). Different processing units may be independent components, or may be integrated into one or more processors.

The controller may be a nerve center and a command center of the electronic device 100. The controller may generate an operation control signal based on an instruction operation code and a time sequence signal, to complete control of instruction reading and instruction execution.

A memory may further be disposed in the processor 110, and is configured to store an instruction and data. In some embodiments, the memory in the processor 110 is a cache memory. The memory may store an instruction or data that is just used or cyclically used by the processor 110. If the processor 110 needs to use the instruction or the data again, the processor 110 may directly invoke the instruction or the data from the memory, to avoid repeated access and reduce a waiting time of the processor 110. Therefore, system efficiency is improved.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronization serial bus, and includes a serial data line (SDA) and a serial clock line (SCL). In some embodiments, the processor 110 may include a plurality of groups of I2C buses. The processor 110 may be coupled to the touch sensor 180K, a charger, a flash light, the camera 193, and the like by using different I2C bus interfaces. For example, the processor 110 may be coupled to the touch sensor 180K by using the I2C interface, so that the processor 110 communicates with the touch sensor 180K by using the I2C bus interface, to implement a touch function of the electronic device 100.

The I2S interface may be configured for audio communication. In some embodiments, the processor 110 may include a plurality of groups of I2S buses. The processor 110 may be coupled to the audio module 170 by using the I2S bus, to implement communication between the processor 110 and the audio module 170. In some embodiments, the audio module 170 may transfer an audio signal to the wireless communications module 160 through the I2S interface, to implement a function of answering a call by using a Bluetooth headset.

The PCM interface may also be configured for audio communication, and sample, quantize, and code an analog signal. The UART interface is a universal serial data bus, and is configured for asynchronous communication. The MIPI interface may be configured to connect the processor 110 to a peripheral device such as the display screen 194 or the camera 193. The MIPI interface includes a camera serial interface (CSI), a display serial interface (DSI), and the like. In some embodiments, the processor 110 communicates with the camera 193 by using the CSI interface, to implement a photographing function of the electronic device 100. The processor 110 communicates with the display screen 194 by using the DSI interface, to implement a display function of the electronic device 100.

The GPIO interface may be configured by using software. The GPIO interface may be configured as a control signal, or may be configured as a data signal. In some embodiments, the GPIO interface may be configured to connect the processor 110 to the camera 193, the display screen 194, the wireless communications module 160, the audio module 170, the sensor module 180, and the like. The GPIO interface may alternatively be configured as the I2C interface, the I2S interface, the UART interface, the MIPI interface, or the like.

The USB interface 130 is an interface that conforms to a USB standard specification, and may be specifically a mini USB interface, a micro USB interface, a USB Type C interface, or the like. The USB interface 130 may be configured to connect to the charger to charge the electronic device 100, or may be configured for data transmission between the electronic device 100 and a peripheral device. The USB interface may alternatively be connected to a headset, to play audio by using the headset. The interface may alternatively be configured to connect to another electronic device such as an AR device.

It may be understood that an interface connection relationship between the modules illustrated in this embodiment of this application is merely an example for description, and does not constitute a limitation on a structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive charging input from the charger. The charger may be a wireless charger or a wired charger. The charging management module 140 supplies power for the electronic device by using the power management module 141 while charging the battery 142.

The power management module 141 is connected to the battery 142, the charging management module 140, and the processor 110. The power management module 141 receives an input of the battery 142 and/or the charging management module 140, and supplies power for the processor 110, the internal memory 121, an external memory, the display screen 194, the camera 193, the wireless communications module 160, and the like. The power management module 141 may further be configured to monitor parameters such as a battery capacity, battery cycles, a battery health status (electric leakage or impedance). In some other embodiments, the power management module 141 may alternatively be disposed in the processor 110. In some other embodiments, the power management module 141 and the charging management module 140 may alternatively be disposed in a same component.

A wireless communication function of the electronic device 100 may be implemented by using the antenna 1, the antenna 2, the mobile communications module 150, the wireless communications module 160, the modem processor, the baseband processor, and the like.

The electronic device 100 implements a display function by using the GPU, the display screen 194, the application processor, and the like. The GPU is a microprocessor for image processing, and is connected to the display screen 194 and the application processor. The GPU is configured to perform mathematical and geometric calculation, and is configured to render an image. The processor 110 may include one or more GPUs that execute a program instruction to generate or change display information.

The display screen 194 is configured to display an image, a video, and the like. The display screen 194 includes a display panel. The display panel may use a liquid-crystal display (LCD) screen, an organic light-emitting diode (OLED), an active-matrix OLED (AMOLED), a flexible LED (FLED), a mini LED, a micro LED, a micro-OLED, a quantum dot LED (QD-LED), or the like. In some embodiments, the electronic device 100 may include one or N displays 194, where N is a positive integer greater than 1.

The electronic device 100 can implement a photographing function by using the ISP, the camera 193, the video codec, the GPU, the display screen 194, the application processor, and the like.

The ISP is configured to process data fed back by the camera 193. For example, during photographing, a shutter is turned on, and light is transmitted to a photosensitive element of the camera through a lens. An optical signal is converted into an electrical signal, the photosensitive element of the camera transmits the electrical signal to the ISP for processing, and the electrical signal is converted into an image that can be seen. The ISP may further optimize an algorithm for noise, brightness, and complexion of an image. The ISP may further optimize parameters such as exposure and a color temperature of a shooting scenario. In some embodiments, the ISP may be disposed in the camera 193.

The camera 193 is configured to capture a static image or a video. An optical image of an object is generated through the lens, and is projected to the photosensitive element. The photosensitive element may be a charge coupled device (CCD) or a complementary metal-oxide-semiconductor (CMOS) photoelectric transistor. The photosensitive element converts the optical signal into the electrical signal, and then transmits the electrical signal to the ISP to convert the electrical signal into a digital image signal. The ISP outputs the digital image signal to the DSP for processing. The DSP converts the digital image signal into a standard image signal in a format such as RGB or YUV. In some embodiments, the electronic device 100 may include one or N cameras 193, where N is a positive integer greater than 1.

The digital signal processor is configured to process a digital signal. In addition to the digital image signal, the digital signal processor may further process another digital signal. The video codec is configured to compress or decompress a digital video. The NPU is a neural-network (NN) computing processor, quickly processes input information by using a biological neural network structure such as a mode of transmission between human-brain nerve cells, and may further constantly perform self-learning. Applications such as intelligent cognition of the electronic device 100, such as image identification, facial identification, speech identification, and text understanding, can be implemented by using the NPU.

The external memory interface 120 may be configured to connect to an external storage card such as a micro SD card, to extend a storage capability of the electronic device 100. The external storage card communicates with the processor 110 by using the external memory interface 120, to implement a data storage function. For example, a file, for example, music or a video, is stored into the external storage card.

The internal memory 121 may be configured to store computer-executable program code, and the executable program code includes an instruction. The processor 110 runs the instruction stored in the internal memory 121, to implement various function applications and data processing of the electronic device 100.

The electronic device 100 can implement an audio function, for example, music playing and recording, by using the audio module 170, the speaker 170A, the phone receiver 170B, the microphone 170C, the headset jack 170D, the application processor, and the like. The button 190 of the electronic device 100 may include a power button, a volume button, and the like. The button 190 may be a mechanical button, or may be a touch button. The motor 191 may generate a vibration prompt. The motor 191 may be configured to provide an incoming call vibration prompt, and may further be configured to feed back a touch vibration. The indicator 192 may be an indicator light that may be configured to indicate a charging status and a battery power change, or may be configured to indicate a message, a missed call, a notification, and the like. The SIM card interface 195 is configured to connect to a SIM card.

In addition, the electronic device 100 further includes various different sensors. For example, the pressure sensor 180A is configured to sense a pressure signal, and may convert the pressure signal into an electrical signal. The gyro sensor 180B may be configured to determine a moving posture of the electronic device 100. The barometric pressure sensor 180C is configured to measure barometric pressure. The magnetic sensor 180D includes a Hall sensor. The acceleration sensor 180E may detect magnitude of accelerations in various directions (usually on three axes) of the electronic device 100. The distance sensor 180F is configured to measure a distance. The electronic device 100 may measure the distance by using an infrared ray or a laser. In some embodiments, in a photographing scene, the electronic device 100 may use the distance sensor 180F to measure a distance to implement fast focusing. The optical proximity sensor 180G may include, for example, an LED and an optical detector such as a photodiode. The ambient light sensor 180L is configured to sense ambient light brightness. The electronic device 100 may adaptively adjust brightness of the display screen 194 based on the sensed ambient light brightness. The fingerprint sensor 180H is configured to collect a fingerprint. The electronic device 100 may use a feature of the collected fingerprint to implement fingerprint unlocking, accessing an application lock, fingerprint photographing, fingerprint call answering, and the like. The touch sensor 180K is also referred to as a "touch panel". The touch sensor 180K may be disposed on the display screen 194, and the touch sensor 180K and the display screen 194 constitute a touchscreen. The touch sensor 180K is configured to detect a touch operation on or near the touch sensor 180K. The touch sensor may transfer the detected touch operation to the application processor to determine a type of a touch event. The bone conduction sensor 180M may obtain a vibration signal.

An embodiment of this application further includes the temperature sensor 180J, configured to measure a temperature. For example, the temperature sensor 180J may be a non-contact infrared temperature sensor, and the non-contact infrared temperature sensor may measure the temperature of the object by using infrared rays. It should be understood that a type and a quantity of infrared temperature sensors are not limited in this embodiment of this application.

For the non-contact infrared temperature sensor, according to a black body radiation law and a relationship between an amount of energy radiated by an object and a temperature of the object, the object with a higher temperature has a stronger infrared radiation capability. Spectral radiant existence of a black body is determined by Planck's formula. When the non-contact infrared temperature sensor is used to measure a temperature, infrared energy radiated by a measured object is converted into an electrical signal on a detector by using an optical system of the sensor, and a temperature value of the signal may be displayed. It should be understood that, an epsilon, a field of view, a distance to the measured object, a position of the measured object, and the like of the measured object are all key factors that affect temperature measurement accuracy.

It should be further understood that the non-contact infrared temperature sensor provided in this embodiment of this application may include different types of infrared temperature sensors such as a thermoelectric pile infrared temperature sensor, a thermocouple infrared temperature sensor, a thermal resistor infrared temperature sensor, a photovoltaic effect-based infrared temperature sensor, and a photoelectron effect-based infrared temperature sensor. This is not limited in this embodiment of this application.

In some possible cases, the electronic device 100 may measure a temperature by using the temperature sensor 180J, and execute a temperature processing policy. For example, when the temperature reported by the temperature sensor 180J exceeds a threshold, the electronic device 100 performs an operation of reducing performance of a processor near the temperature sensor 180J, to reduce power consumption and to implement thermal protection. In some other embodiments, when the temperature is below another threshold, the electronic device 100 heats the battery 142 to prevent the electronic device 100 from abnormally shutting down due to the low temperature. In some other embodiments, when the temperature is below still another threshold, the electronic device 100 boosts an output voltage of the battery 142, to prevent abnormal shutdown caused by the low temperature.

Figure 2:
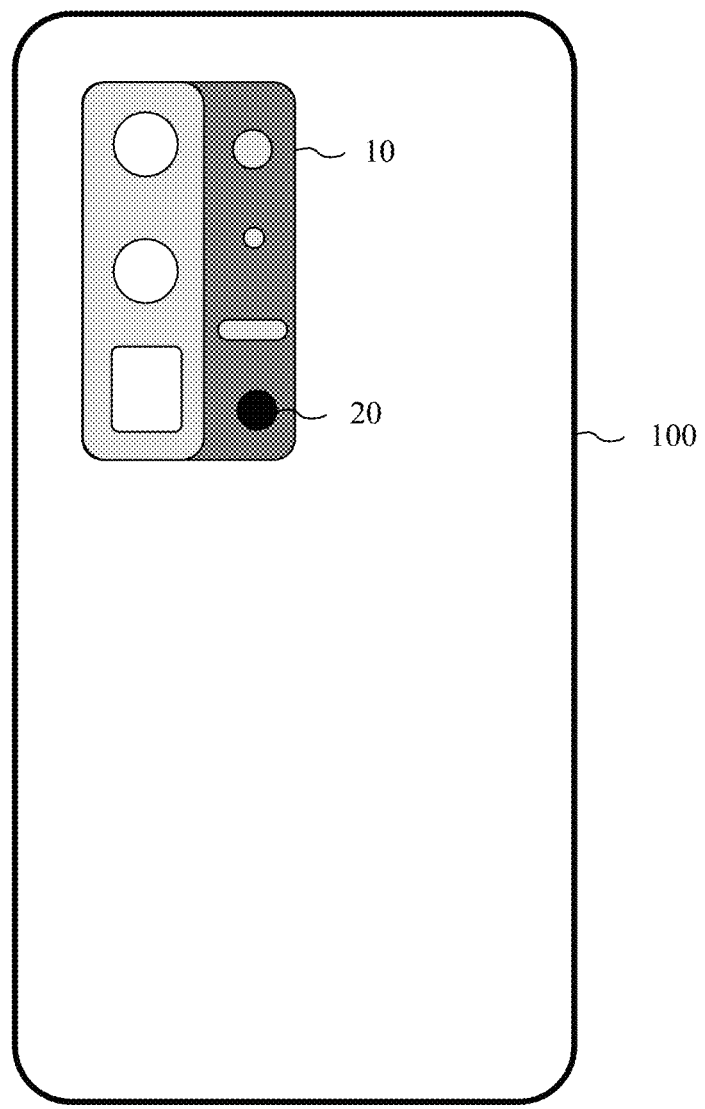
FIG. 2 is a schematic installation diagram of an infrared temperature sensor according to an embodiment of this application.

FIG. 2 is a schematic installation diagram of an infrared temperature sensor according to an embodiment of this application. In this embodiment of this application, a mobile phone on which the infrared temperature sensor is installed is used as an example to describe a temperature measurement method.

As shown in FIG. 2, a rear housing of the mobile phone includes a camera assembly 10. The camera assembly 10 of the mobile phone may include one or more cameras, for example, a wide-angle camera, a primary camera, a macro lens, a long-focus camera, and a TOF camera. A form and a quantity of cameras are not limited in this embodiment of this application.

Optionally, in this embodiment of this application, the infrared temperature sensor 20 may be installed at a position close to the camera assembly 10. In addition, when measuring a temperature of an object by using the infrared temperature sensor 20, a user may invoke the camera assembly 10 to obtain information about the measured object, and the like.

In a possible implementation, the camera assembly of the electronic device may include one or more cameras, for example, a first camera and a second camera. An FOV of the first camera is greater than an FOV of the second camera. The electronic device may collect overall information of the measured object by using the first camera, and collect partial human body information by using the second camera.

It should be understood that one camera can cover a specific range of scenery, and the specific range is usually represented by an angle. The angle is referred to as a field of view FOV of a lens. In other words, the FOV refers to the range covered by the lens, and an object beyond the range is not captured in the lens.

Optionally, the camera assembly of the electronic device may include a wide-angle camera, a primary camera, a macro lens, a long-focus camera, a TOF camera, and the like. A form and a quantity of cameras lenses are not limited in this embodiment of this application.

In different scenarios, different cameras in the camera assembly 10 may be invoked. For example, when a body temperature of a person is measured, the person is relatively close to a mobile phone, and to obtain a feature of the person, the wide-angle camera may be used to obtain a full-view feature of the person, or the macro lens may be used to obtain facial information. This is not limited in this embodiment of this application.

Alternatively, the infrared temperature sensor 20 may be installed at a position close to a front-facing camera assembly of the mobile phone 100. An installation position and an installation manner of the infrared temperature sensor 20 are not limited in this embodiment of this application.

Figure 3:
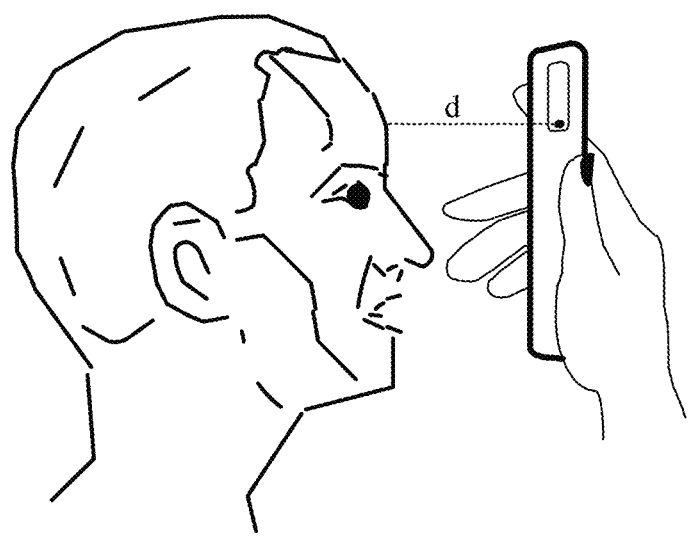
FIG. 3 is a schematic diagram of a temperature measurement method according to an embodiment of this application.

With reference to the schematic installation diagram of the infrared temperature sensor in FIG. 2, correspondingly, the user may measure the temperature according to the method in FIG. 3. FIG. 3 is a schematic diagram of a temperature measurement method according to an embodiment of this application. As shown in FIG. 3, an infrared temperature sensor is integrated into a rear-facing camera assembly 10 of the mobile phone 100. When measuring a forehead temperature, a user may place the mobile phone 100 at a forehead, make a distance d between the infrared temperature sensor 20 and the forehead within a specific measurement range, and start temperature measurement by using an application program (for example, a thermometer application) installed on the mobile phone.

Figure 4:
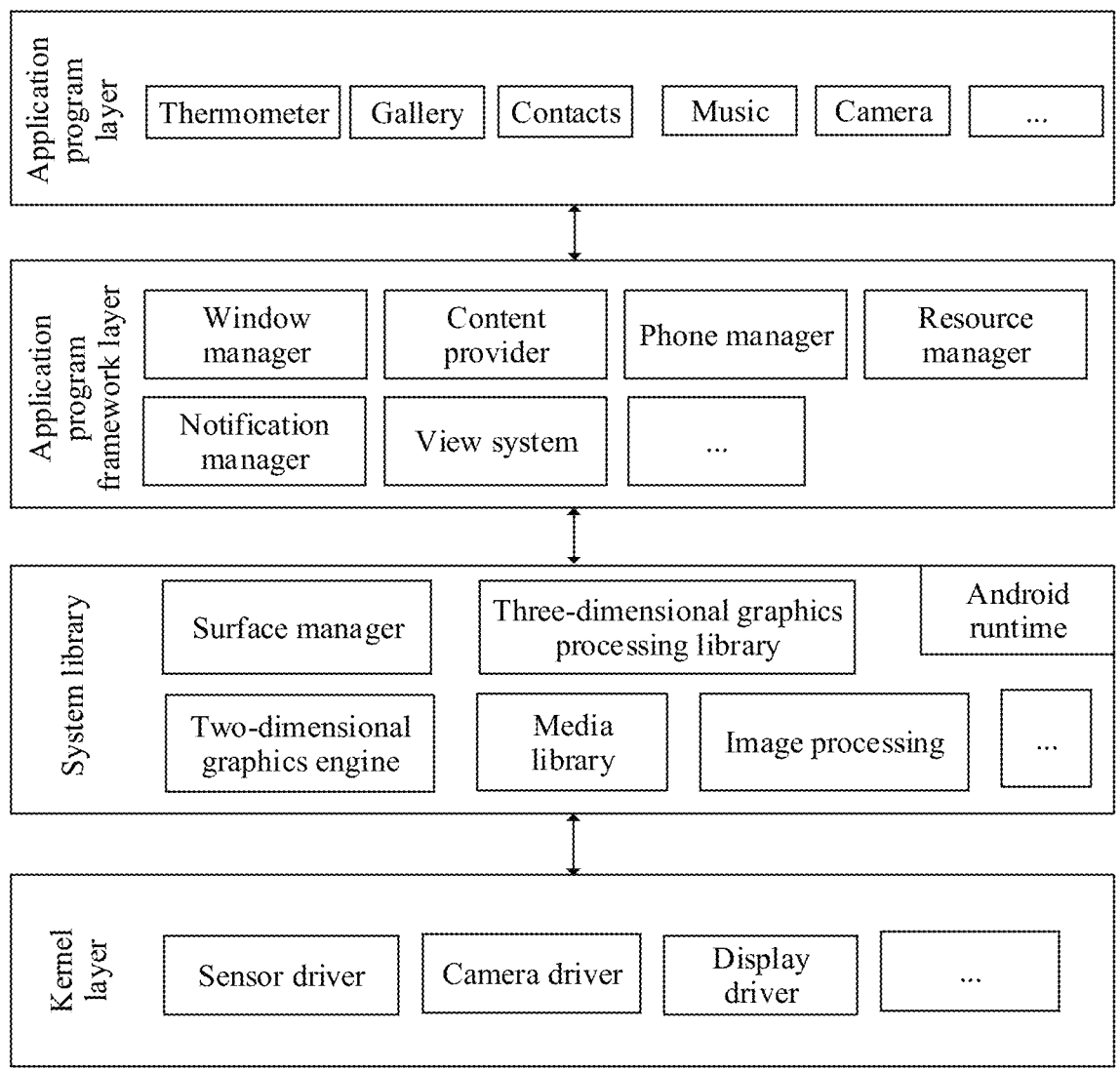
FIG. 4 is a structural block diagram of software of an electronic device according to an embodiment of this application.

In addition, in this embodiment of this application, a mobile phone with an Android system having a layered architecture is used as an example to describe a software structure of the mobile phone 100. FIG. 4 is a structural block diagram of software of an electronic device 100 according to an embodiment of this application. In the layered architecture, software is divided into several layers, and each layer has a clear role and task. The layers communicate with each other by using a software interface. In some embodiments, an Android system is divided into four layers, namely, an application program layer, an application program framework layer, Android runtime and a system library, and a kernel layer from top to bottom. The application program layer may include a series of application program packages.

As shown in FIG. 4, the application program package may include an application (APP) program such as a thermometer, a camera, a gallery, music, or a contact.

The application program framework layer provides an application programming interface (API) and a programming framework for an application program at the application program layer. The application program framework layer includes some predefined functions.

As shown in FIG. 4, the application program framework layer may include a window manager, a content provider, a view system, a phone manager, a resource manager, a notification manager, and the like.

The window manager is configured to manage a window program. The window manager may obtain a size of a display screen, determine whether there is a status bar, lock a screen, take a screenshot, and the like.

The content provider is configured to store and obtain data, and make the data accessible to an application program. The data may include a video, an image, audio, calls that are made and answered, a browsing history and a bookmark, a phone book, and the like.

The view system includes visual controls such as a control for displaying a character and a control for display a picture, and the view system may be configured to construct an application program. A display interface may include one or more views. For example, a display interface including a messaging notification icon may include a view for displaying a character and a view for displaying a picture.

The phone manager is configured to provide a communication function of the electronic device 100, for example, management of a call status (including connected and disconnected).

The resource manager provides various resources such as a localized character string, an icon, a picture, a layout file, and a video file for an application program.

The notification manager enables an application program to display notification information in a status bar, and may be configured to convey a notification-type message. The notification-type message may automatically disappear after the message is displayed for a short period of time without user interaction. For example, the notification manager is configured to provide a notification of download completion, a message prompt, and the like. The notification manager may alternatively be a notification that appears on the top of a status bar of a system in a text form of a graph or a scroll bar, for example, a notification of an application program running in a background or a notification that appears on a screen in a form of a dialog window. For example, text information is prompted in the status bar, a prompt tone is produced, the electronic device vibrates, or the indicator light blinks.

The Android runtime includes a kernel library and a virtual machine. The Android runtime is responsible for scheduling and management of the Android system.

The kernel library includes two parts a function that needs to be invoked by a Java language and a kernel library of Android.

The application program layer and the application program framework layer run on the virtual machine. The virtual machine executes a Java file at the application program layer and the application program framework layer as a binary file. The virtual machine is configured to perform functions such as object life cycle management, stack management, thread management, safety and exception management, and garbage collection.

The system library may include a plurality of functional modules, for example, a surface manager, a media library (media libraries), a three-dimensional graphics processing library (for example, OpenGL ES), and a two-dimensional (2D) graphics engine (for example, SGL).

The surface manager is configured to manage a display subsystem, and provide fusion of 2D and 3D layers for a plurality of applications.

The media library supports playback and recording of a plurality of commonly used audio and video formats, static image files, and the like. The media library may support a plurality of audio and video coding formats, for example, Moving Pictures Expert Group (MPEG)4, H.264, music player (MP)3, Augmentative and Alternative Communication (AAC), Adaptive Multi-rate (AMR), Joint Photographic Experts Group (JPG), and Portable Network Graphics (PNG).

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a sensor driver, a camera driver, a display driver, and the like. For example, the sensor driver is configured to invoke an infrared temperature sensor, and the camera driver may enable the camera to collect an image.

For ease of understanding, in the following embodiments of this application, a mobile phone having the structures shown in FIG. 1 and FIG. 4 is used as an example to describe in detail, with reference to the accompanying drawings and application scenarios, the temperature measurement method provided in the embodiments of this application.

Figure 5A:
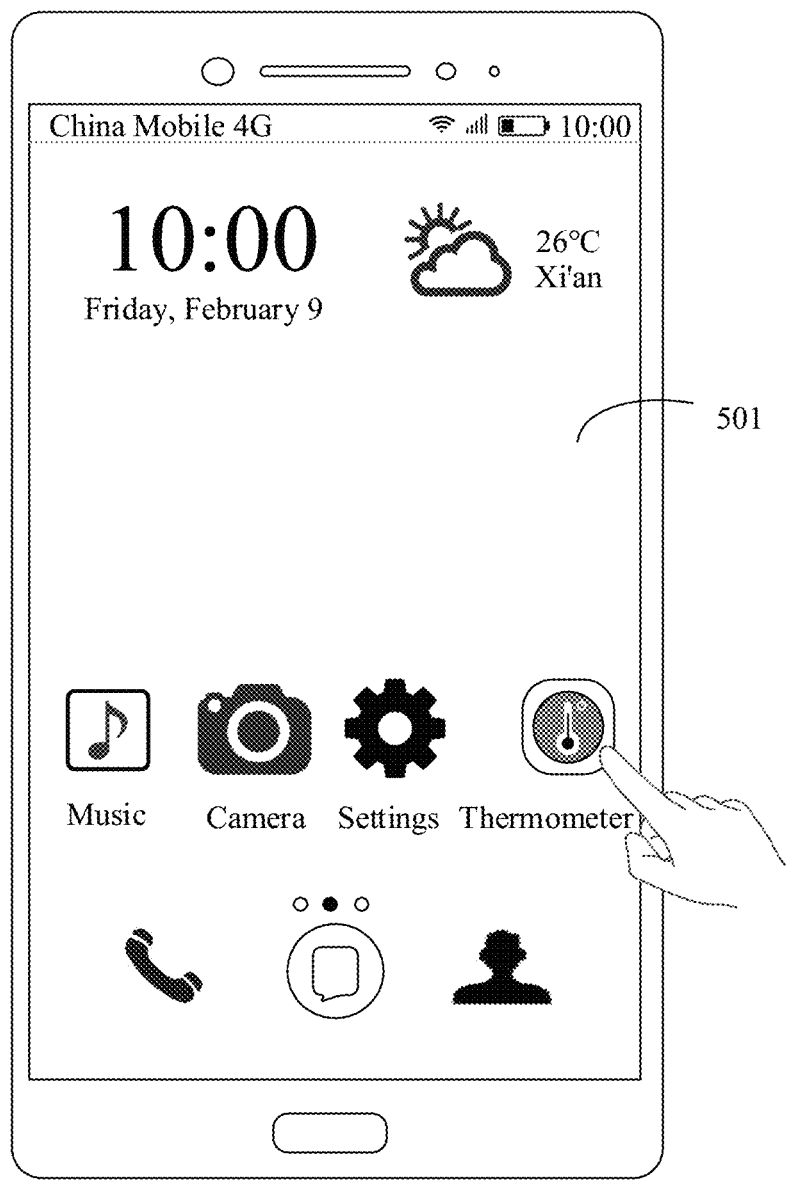
FIG. 5A to FIG. 5D are schematic diagrams of an interface of a temperature measurement process according to an embodiment of this application.

FIG. 5A to FIG. 5D are schematic diagrams of a graphical user interface (GUI) of a temperature measurement process according to an embodiment of this application. FIG. 5A shows interface content 501 currently output by a mobile phone in an unlock mode. The interface content 501 displays a plurality of application (App) programs, such as music, a camera, settings, and a thermometer. It should be understood that the interface content 501 may further include more application programs. This is not limited in this embodiment of this application.

Figure 5B:
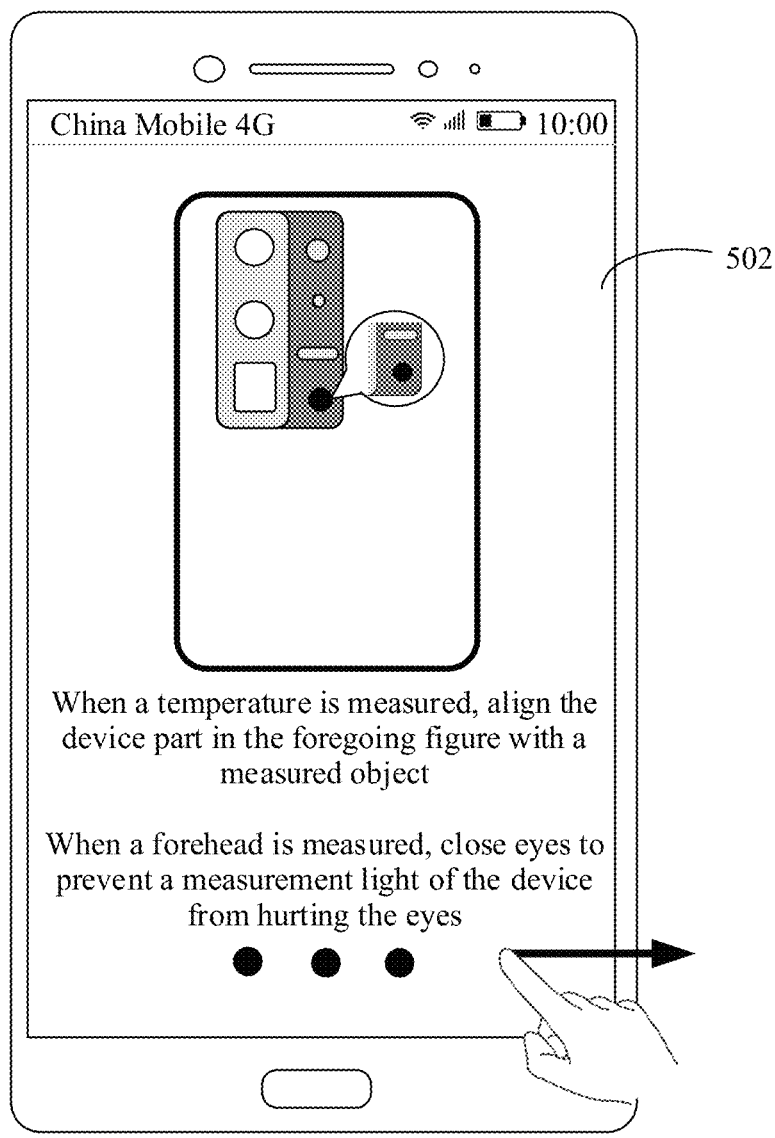
Figure 5C:
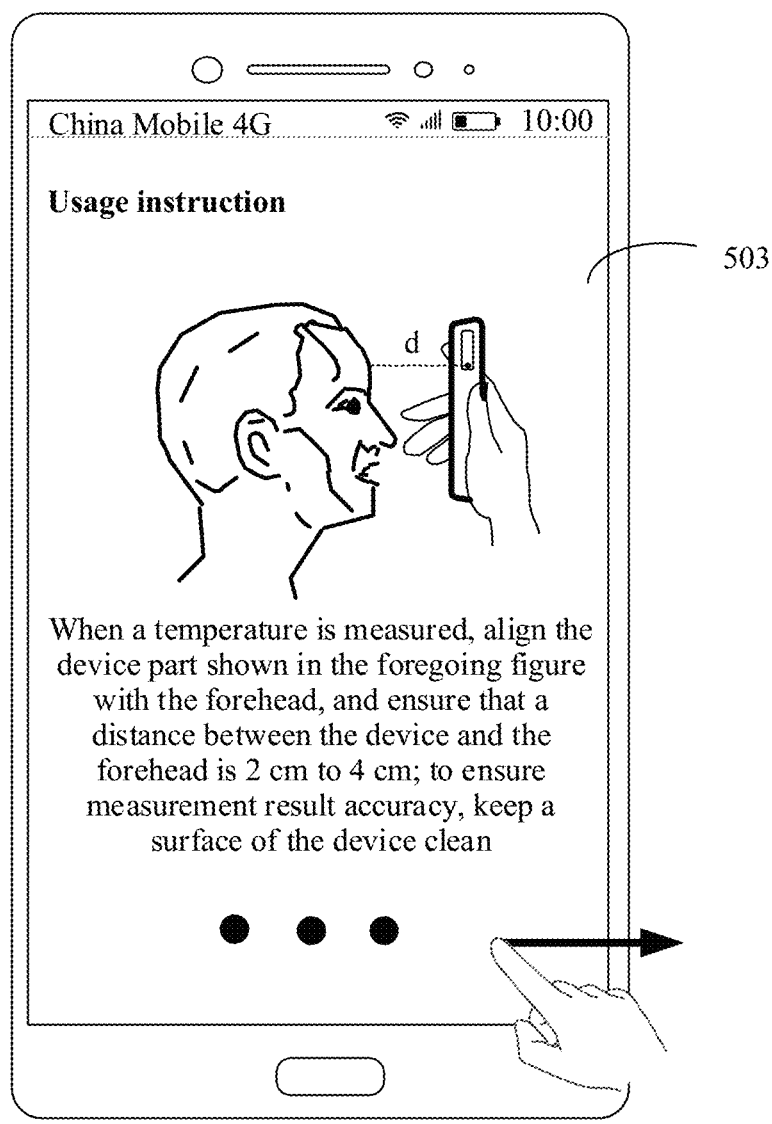

As shown in FIG. 5A, a user taps an icon of the thermometer application, and the mobile phone runs the thermometer application in response to the tapping operation of the user. When the user runs the thermometer application for the first time after installing the thermometer application, a temperature measurement method and a temperature measurement precaution may be displayed in an interface. As shown in FIG. 5B, an interface 502 may include a schematic diagram of a position of an infrared temperature sensor and a temperature measurement precaution. For example, a user is prompted in a manner of text, a picture, or an animation: When a temperature is measured, align the device part in the foregoing figure with a measured object, or when a forehead is measured, close eyes to prevent a measurement light of the device from hurting the eyes. It should be understood that, in a process of measuring a distance between the mobile phone and the measured object, a ranging device such as a laser sensor or a TOF lens may emit light used for ranging, such as laser light. In a temperature measurement process, the measured object may be prompted to close the eyes or the like, to prevent the measurement light from hurting the eyes.

The user can slide the screen in a direction shown in FIG. 5B to view more usage instructions. For example, "When a temperature is measured, align the device part shown in the foregoing figure with the forehead, and ensure that a distance between the device and the forehead is 2 cm to 4 cm." "To ensure measurement result accuracy, keep a surface of the device clean." "1. Temperature measurement description of a body surface temperature difference of different parts. 2. It is recommended that the temperature is measured at a proper room temperature (16° C. to 35° C.). 3. The measured person shall stay indoors for 30 minutes before measurement. 4. Do not eat or exercise before the body temperature is measured. 5. When measuring, remove hair from the forehead and keep the forehead clean. 6. When the forehead is measured, prevent the measurement light from hurting the eyes. 7. A temperature range is from 35° C. to 42° C. 8. Temperature data will not be sent to the cloud or used for other purposes. 9. When the temperature is measured, in addition to a measure button on this page, a volume button on the device can also be pressed to start temperature measurement." Details are not described herein again. It should be understood that the usage instruction may be specific to different measured objects or different measurement processes, for example, body temperature measurement of a person or body temperature measurement of an animal. This is not limited in this embodiment of this application.

In a possible implementation, after the user installs the thermometer application, when the user starts the thermometer application not for the first time, the user may view the temperature measurement precaution in another manner. For example, the user may view the temperature measurement precaution by tapping another button in the interface.

Figure 5D:
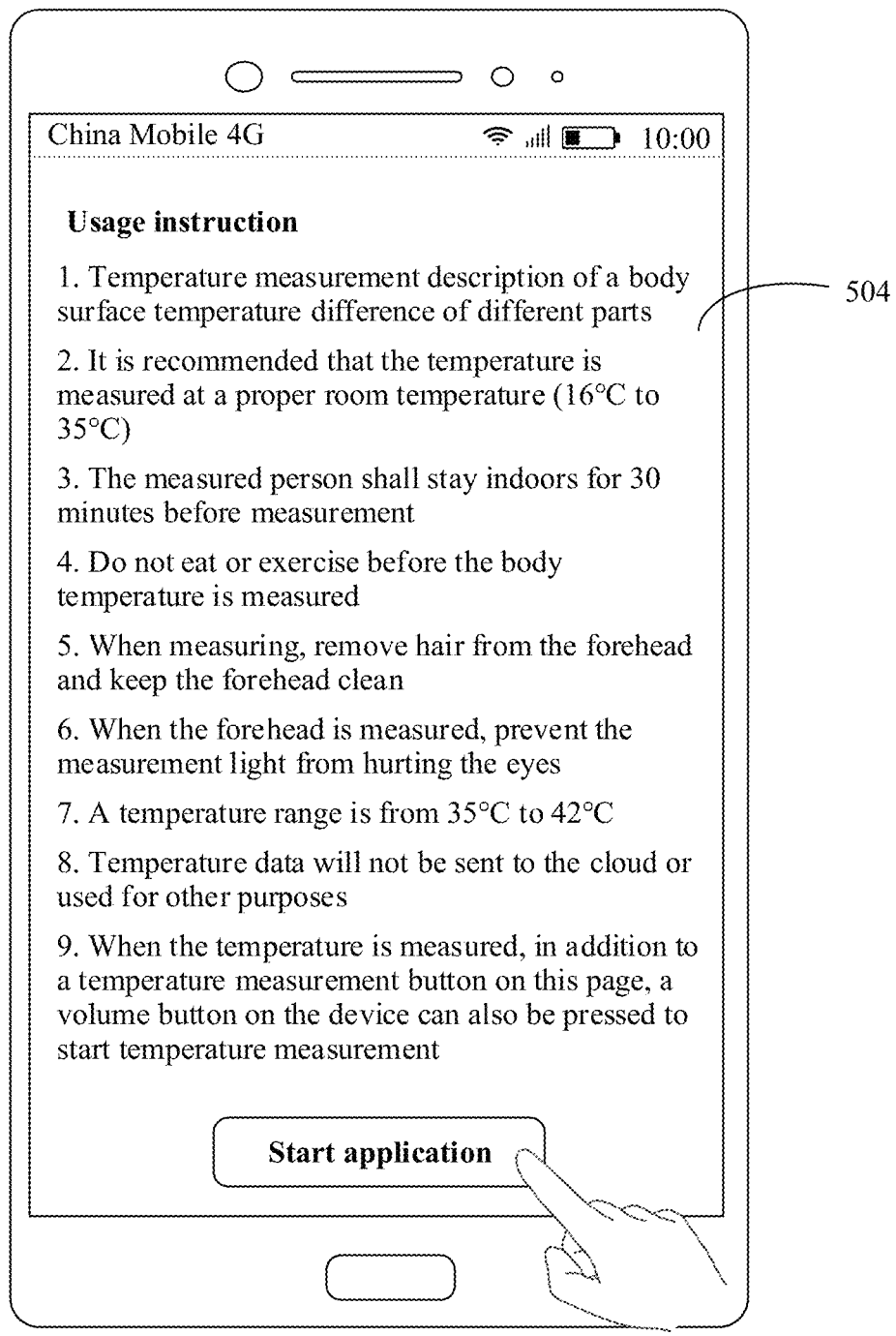

After viewing the temperature measurement precaution, as shown in FIG. 5D, the user can tap "Start application" and a home screen of the thermometer application is displayed.

Figure 6A:
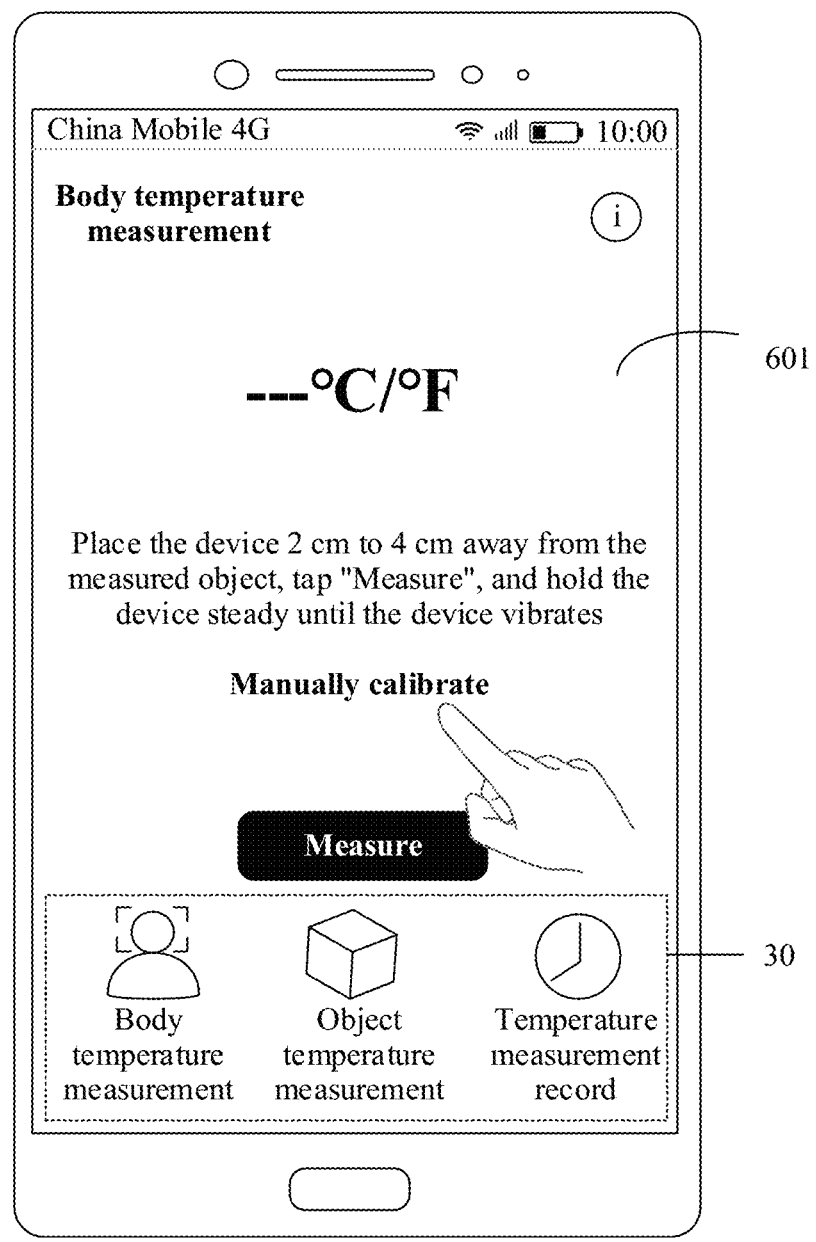
FIG. 6A to FIG. 6D are schematic diagrams of an interface of another temperature measurement process according to an embodiment of this application.
Figure 6B:
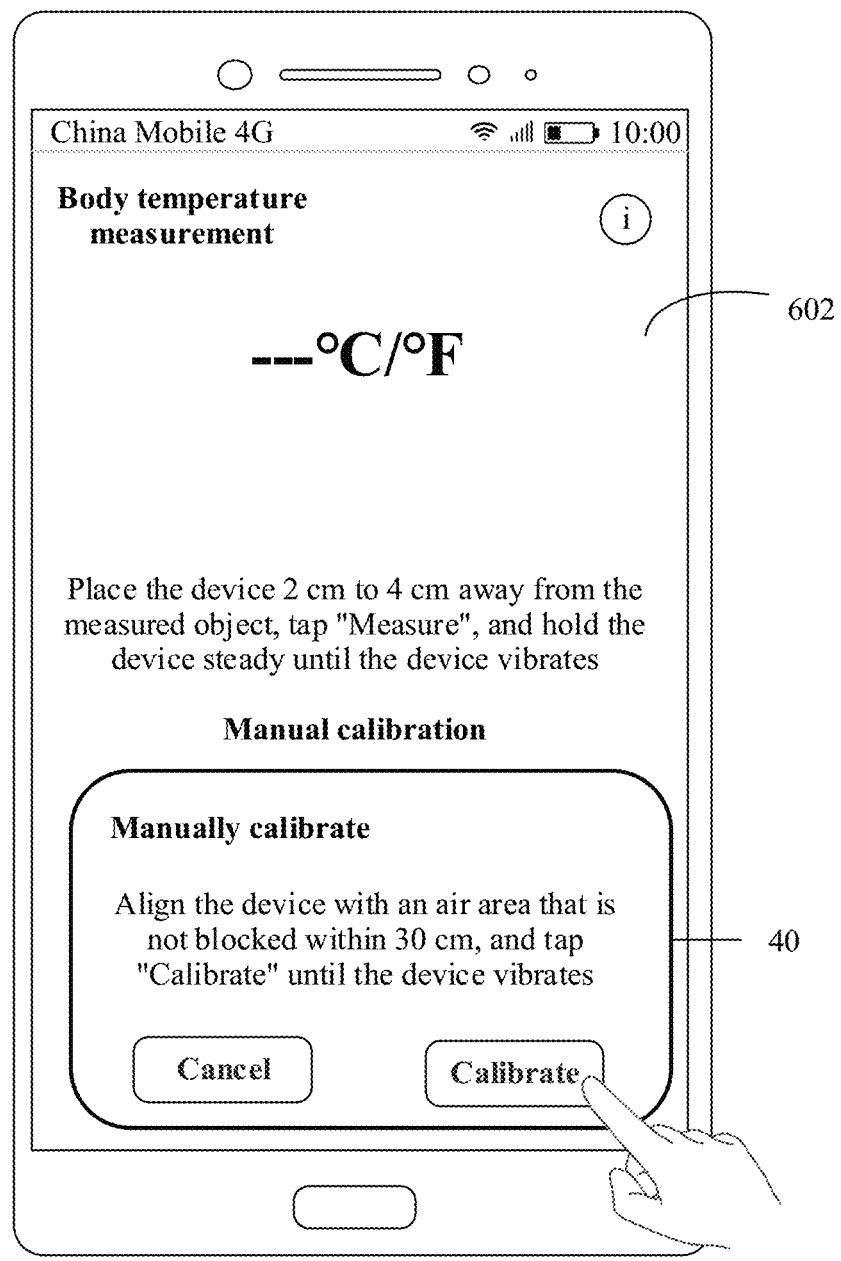
Figure 6C:
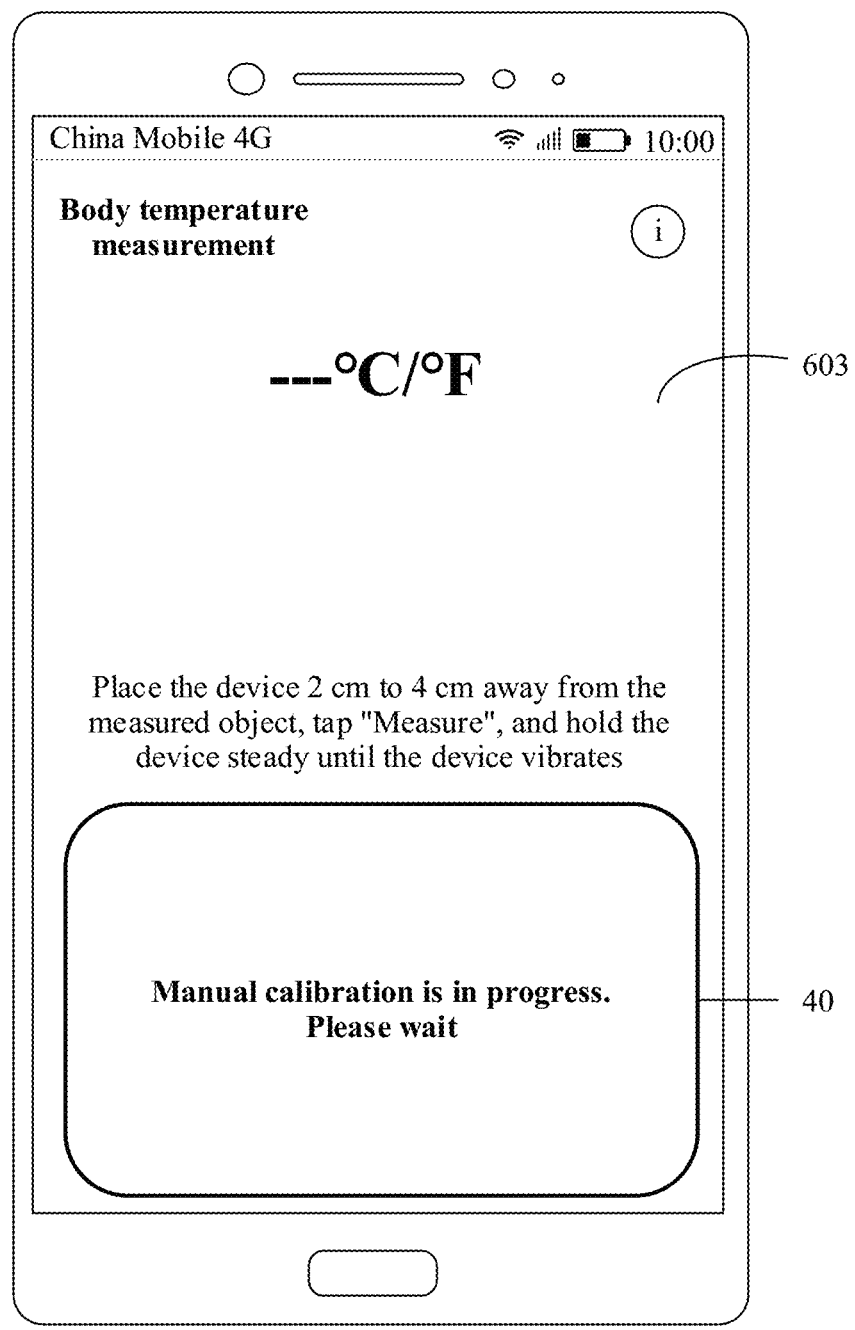

FIG. 6A to FIG. 6D are schematic diagrams of an interface of another temperature measurement process according to an embodiment of this application. FIG. 6A shows a home screen 601 of a thermometer application. The home screen 601 of the thermometer application includes a plurality of display areas, and each display area includes different buttons and displays different content. For example, as shown in FIG. 6A, a menu area 30 at the bottom of the home screen 601 includes a body temperature measurement menu, an object temperature measurement menu, and a temperature measurement record menu. Optionally, after the user starts the thermometer application, by default a system sets a currently displayed "Body temperature measurement" interface as the home screen.

In this embodiment of this application, the thermometer application may include different temperature measurement modes, for example, a body temperature measurement mode and an object temperature measurement mode in the menu area 30. Alternatively, more temperature measurement modes, such as a pet temperature measurement mode, an adult male temperature measurement mode, and an adult female temperature measurement mode, may be obtained through classification in a plurality of manners such as a measured object, a gender, and an age. In this embodiment of this application, the body temperature measurement mode and the object temperature measurement mode are used as examples to describe a temperature measurement method.

On the home screen 601, there may be an area for displaying the temperature. The temperature may be measured by using a Celsius (° C.) temperature or a Fahrenheit (° F.) temperature. Optionally, a manner of measuring the temperature may be automatically selected based on a language, a geographical position, or a time setting of the system. For example, when the language specified on the mobile phone is a language used in the Bahamas, Belize, the British Cayman Islands, Palau, the United States of America and other dependent territories (Puerto Rico, Guam, the United States Virgin Islands), or when the displayed geographical position is the countries or regions listed above, the temperature is measured by the (° F.) temperature. When the mobile phone is in a country or region other than those listed above, the temperature is measured in the (° C.) temperature.

The home screen 601 may further include a temperature measurement prompt: Place the device 2 centimeters (cm) to 4 cm away from the measured object, tap "Measure", and hold the device steady until the device vibrates. The user may measure the temperature based on the temperature measurement prompt content. Specifically, after the temperature measurement mode is selected, the system may indicate the user to perform temperature measurement within the correct distance range (for example, from 2 cm to 4 cm) through distance information measured by a distance sensor in the mobile phone.

In addition, the home screen 601 may further include a "Manually calibrate" button. Optionally, the user may calibrate the temperature by tapping the "Manually calibrate" button. As shown in FIG. 6A, the user taps the "Manually calibrate" button. In response to the tapping operation of the user, the mobile phone displays a manual calibration confirmation box 40. The user may perform an operation by viewing a prompt in the manual calibration confirmation box 40. For example, the user is prompted to do the following: Align the device with an air area that is not blocked within 30 cm, and tap "Calibrate" until the device vibrates. The user taps the "Calibrate" button in the manual calibration confirmation box 40. The manual calibration confirmation box 40 displays "Manually calibrate is in progress. Please wait" shown in FIG. 6C.

In a possible implementation, when the user taps the thermometer application and the thermometer application is run, the system may automatically perform calibration. When the system completes automatic calibration and the user does not perform a temperature measurement operation within a period of time, before measuring a temperature next time, the user may tap a "Manually calibrate" button for recalibration, to improve temperature measurement accuracy.

Alternatively, the mobile phone may perform automatic calibration based on a change of a current position. For example, the mobile phone detects, by positioning, that a current position changes. For example, the mobile phone determines that the position changes when a movement distance exceeds 5 meters, for example, a position change between cities, a position change between different areas of a city, or a position change from home to outdoor. When the thermometer application is run twice, the mobile phone may determine, based on the position change, that a position of the currently running thermometer application is different from a position of previous temperature measurement, and the mobile phone starts an automatic calibration process. It should be understood that a positioning manner of the mobile phone is not limited in this embodiment of this application.

Alternatively, the mobile phone may further determine, based on a change of an angle at which the user holds the mobile phone, that angles at which the user holds the mobile phone change at two times of consecutive temperature measurement, for example, by using various sensors such as a gyro sensor 180B and an acceleration sensor 180E of the mobile phone. The change of the angle at which the mobile phone is held may affect a temperature sensing status of the infrared temperature sensor. For example, a temperature of a hand of the user may affect measurement of the infrared temperature sensor. In this case, the mobile phone may start the automatic calibration process. It should be understood that a manner of detecting the angle at which the user holds the mobile phone is not limited in this embodiment of this application.

It should be understood that, in addition to the foregoing described scenarios, the mobile phone may further detect more scenario changes, and then start the automatic calibration process. This is not limited in this embodiment of this application.

It should be further understood that a difference in the ambient temperature affects an energy value received by the infrared temperature sensor, and the energy value is reflected in a final temperature measurement result. In the automatic calibration process, the temperature of the environment in which the object is located may be automatically obtained before the temperature of the object is measured, and the infrared temperature sensor of the mobile phone is automatically calibrated based on the ambient temperature. In other words, the measured object temperature is corrected or temperature compensation is performed based on the ambient temperature, to reduce a temperature measurement error and improve temperature measurement accuracy.

It should be further understood that there may be different calibration methods for different types of infrared temperature sensors, such as a thermocouple type, a thermoelectric pile type, a thermal resistance type, a photovoltaic effect type, and an optoelectronic effect type. This is not limited in this embodiment of this application.

Figure 6D:
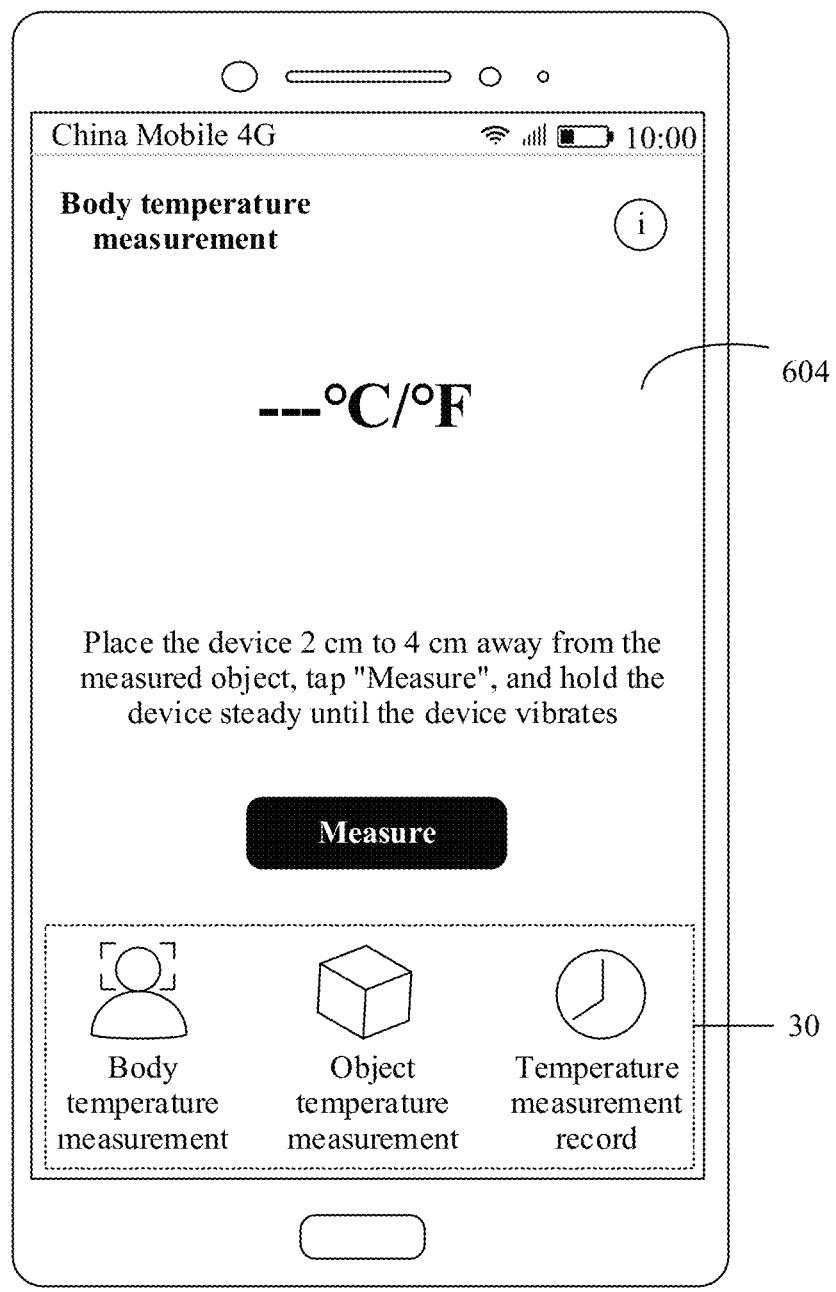
Figure 7A:
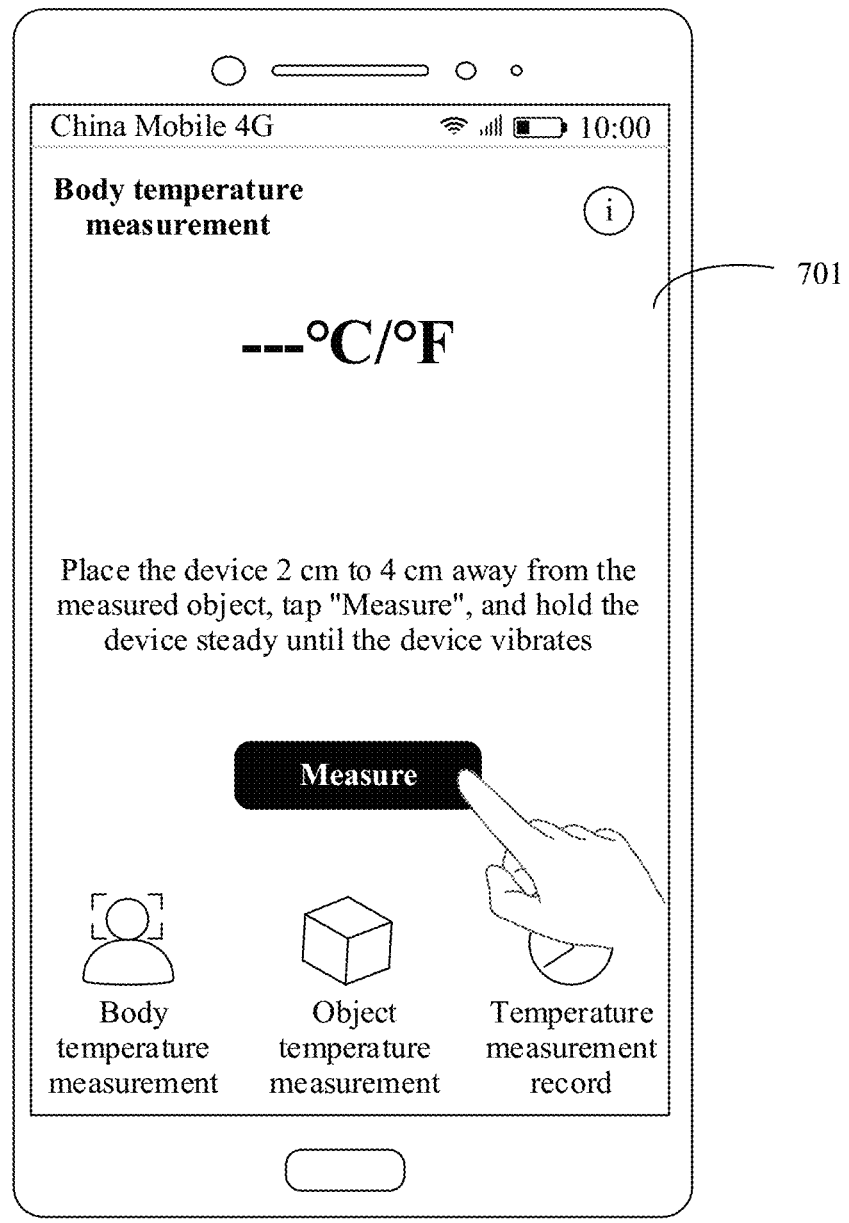
FIG. 7A to FIG. 7E are schematic diagrams of an interface of another temperature measurement process according to an embodiment of this application.
Figure 7B:
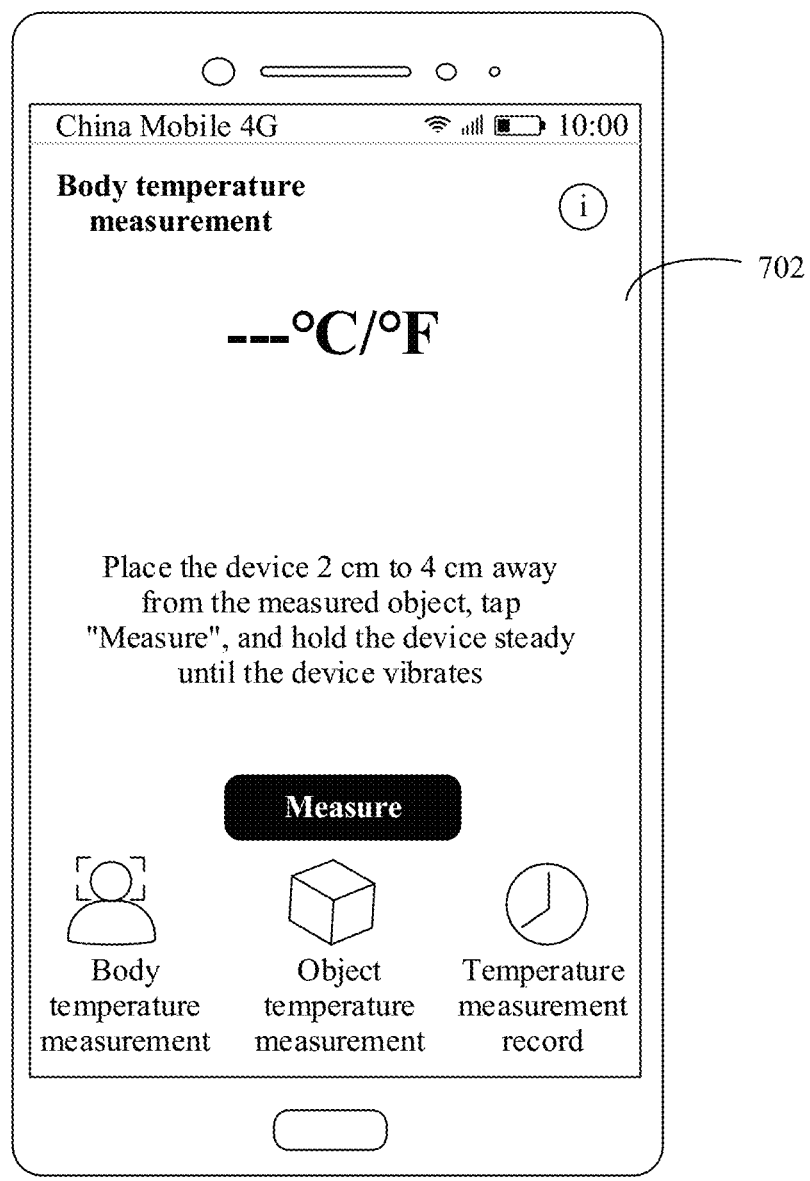

After the automatic calibration is completed, the mobile phone may display a temperature measurement interface 604 shown in FIG. 6D. The user may tap a "Measure" button in the interface 604 to start a temperature measurement process. FIG. 7A to FIG. 7E are schematic diagrams of an interface of another temperature measurement process according to an embodiment of this application. FIG. 7A shows a temperature measurement interface 701 of a thermometer application. A user places an infrared temperature sensor 2 cm to 4 cm away from a measured object according to an instruction (for example, measures a forehead temperature of the user according to an operation shown in FIG. 3), and taps a "Measure" button in the interface 701, to start a temperature measurement process. An interface 702 may display "Measuring temperature".

Figure 7C:
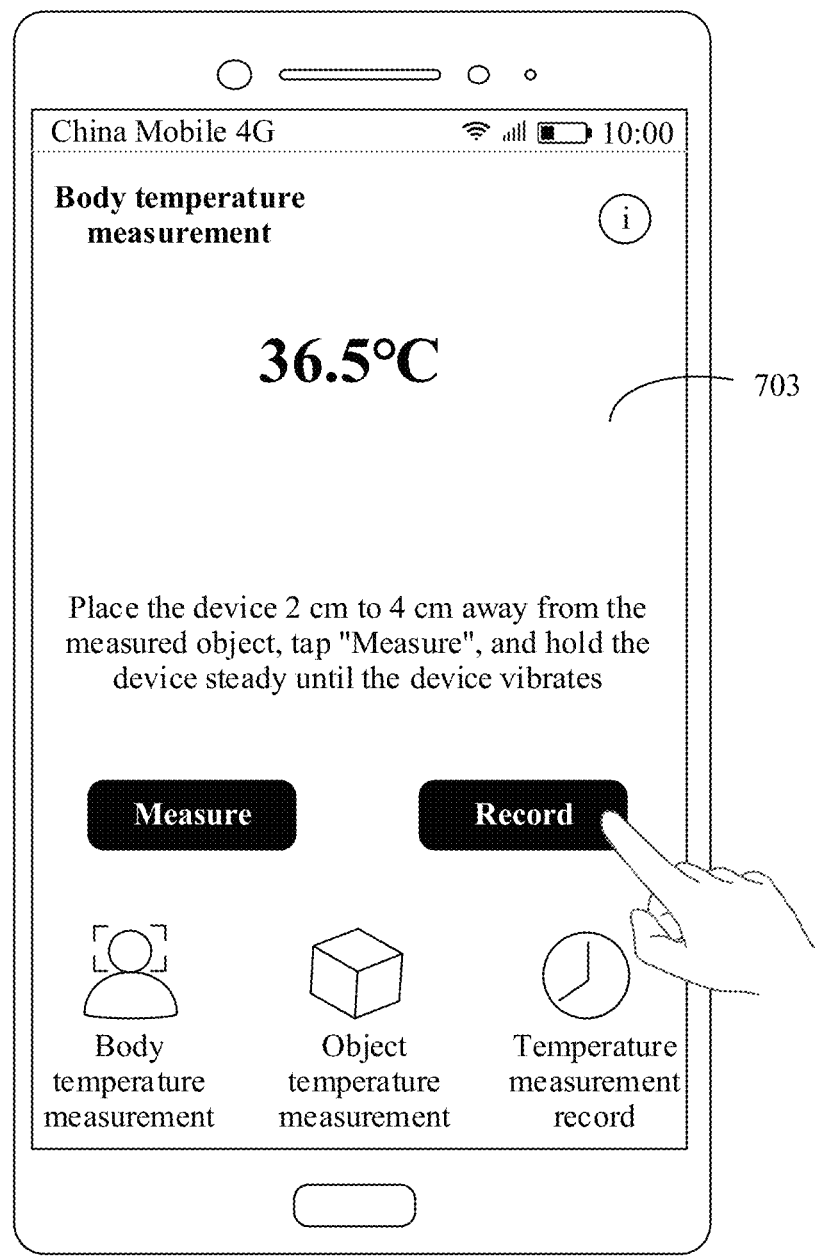

After the temperature measurement is completed, a final temperature result is displayed in a temperature measurement completion interface 703. For example, as shown in FIG. 7C, the forehead temperature of the user that is finally obtained through measurement is 36.5° C. In addition, the temperature measurement completion interface 703 includes two buttons: a "Measure" button and a "Record" button. The user may tap the "Measure" button to perform temperature measurement again on the forehead of the current user, or perform temperature measurement on another object. The user can tap the "Record" button to save a current measured temperature value.

As shown in FIG. 7C, the user taps the "Record" button, and in response to the tap operation of the user, the mobile phone displays a temperature record window 50. The user records the current temperature value in the temperature record window 50.

Figure 7D:
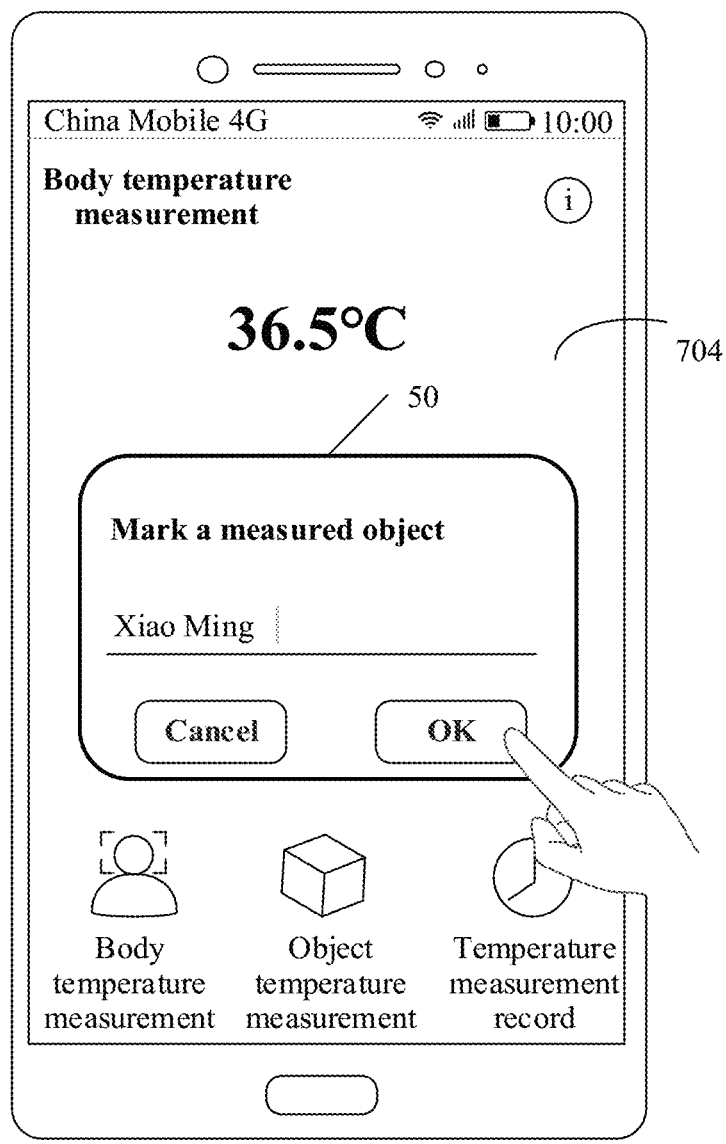

In a possible implementation, when the measured object uses a temperature measurement function of the mobile phone for the first time, as shown in FIG. 7D, after the user taps the "Record" button, in the temperature record window 50, there is no predicted measured object name, or there is no current measured object in a predicted measured object name. The user can enter information about the current measured object, for example, "Xiao Ming", and then tap an "OK" button to save a temperature value of "Xiao Ming".

Figure 7E:
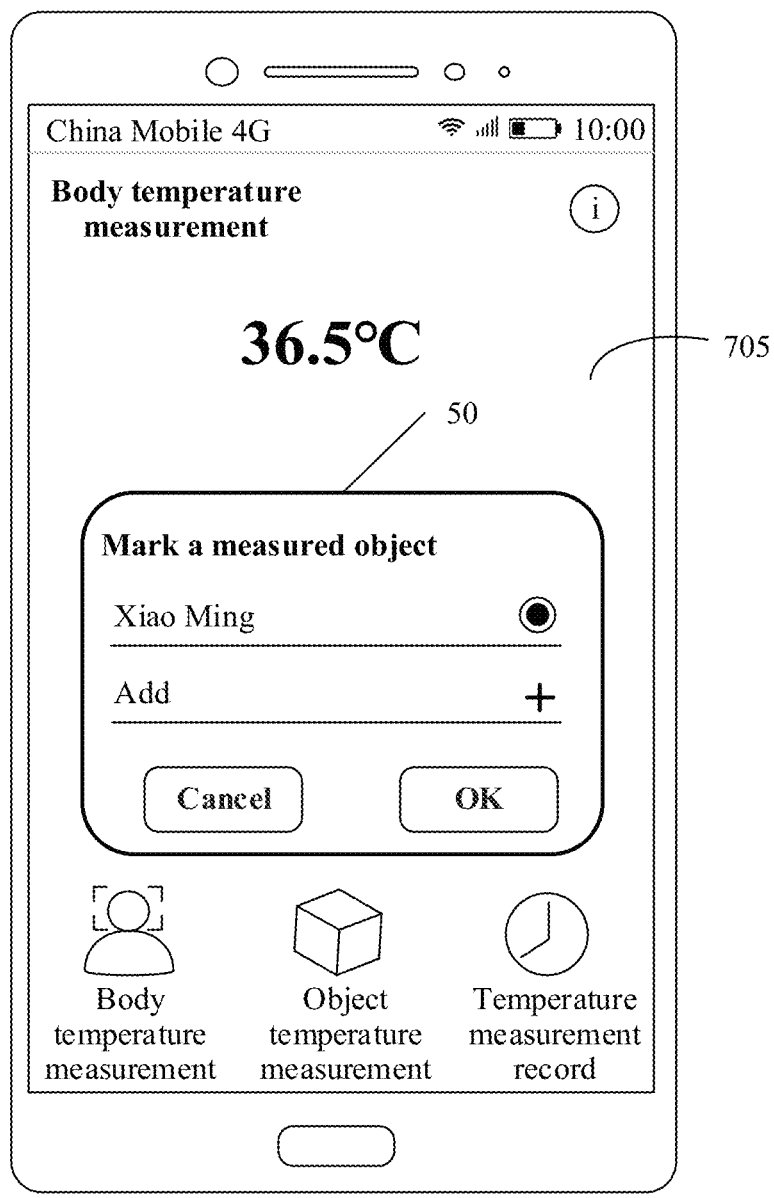

In another possible implementation, when the measured object has used a temperature measurement function of the mobile phone, or there is temperature information of the measured object in the thermometer application, on an interface 705 shown in FIG. 7E, after the user taps the "Record" button, a predicted object name is displayed in the temperature record window 50, and the predicted object name includes "Xiao Ming". The user taps the "Xiao Ming" option and the "OK" button. In other words, a currently measured 36.5° C. may be saved to "Xiao Ming", and information such as a measurement time and a date is also saved.

Optionally, the predicted object name including "Xiao Ming" is associated with an address book list of the mobile phone, the predicted object name may display one or more contacts in the address book list of the mobile phone, and the user selects the current measured object from the contacts, for example, taps "Xiao Ming" to save the temperature information to "Xiao Ming". Optionally, after the temperature information is saved, the recorded temperature information may be viewed in contact information of "Xiao Ming" in the address book.

Alternatively, the predicted object name "Xiao Ming" displayed in the temperature record window 50 is displayed to the user after the mobile phone performs screening and matching from the address book. Specifically, if a profile picture of "Xiao Ming" that is stored in the address book is used as a contact profile picture, after the temperature is measured, the mobile phone obtains facial information of the measured object and the like by using a camera component 10 (for example, a wide-angle camera or a macro lens), compares the facial information, and matches the profile picture of "Xiao Ming", to determine that the current measured object is "Xiao Ming". "Xiao Ming" is displayed in the temperature record window 50. The user can tap "OK" to save current temperature information in the information of "Xiao Ming". In this process, the user does not need to select the current measured object from the plurality of contacts, and the measured object is automatically matched for the user. The process is simple and facilitates user operations.

Alternatively, the user goes to the address book list of the mobile phone through a jump link in the temperature record window 50, so that the user selects the current measured object. After finding "Xiao Ming", the user may select "Xiao Ming" and store current temperature information. This is not limited in this embodiment of this application.

It should be understood that when obtaining the facial information of the measured object by using the camera assembly 10, the mobile phone may obtain the facial information in a background, and a preview image is not displayed in the temperature measurement interface of the mobile phone, or the mobile phone may obtain the facial information in a foreground, and a preview image is displayed in the temperature measurement interface of the mobile phone. This is not limited in this embodiment of this application. Optionally, the predicted object name "Xiao Ming" displayed in the temperature record window 50 is an object in a portrait classification in a local album of the mobile phone, and a system performs screening and matching from a plurality of portrait objects, and then displays "Xiao Ming" to the user. Specifically, if a portrait album of "Xiao Ming" is established in the local album, after the temperature is measured, the mobile phone obtains facial information of the measured object by using a camera component 10 (for example, a wide-angle camera or a macro lens), compares the facial information, and matches a portrait of "Xiao Ming", to determine that the measured object is "Xiao Ming". "Xiao Ming" is displayed in the temperature record window 50. The user can tap "OK" to save current temperature information in the information of "Xiao Ming". In this process, the user does not need to select or enter the current measured object, and the measured object is automatically matched for the user. The process is simple and facilitates user operations.

Alternatively, the user goes to an album list of the mobile phone through a jump link in the temperature record window 50, so that the user selects a photo of "Xiao Ming". The photo of "Xiao Ming" may be selected and the current temperature information may be stored. This is not limited in this embodiment of this application.

After the user saves the temperature information 36.5° C. of "Xiao Ming" according to the operation shown in FIG. 7A to FIG. 7E, the user measures a body temperature for a baby and may record a body temperature value of the baby. FIG. 8A to FIG. 8D schematic diagrams of an interface of still another temperature measurement process according to an embodiment of this application.

Figure 8A:
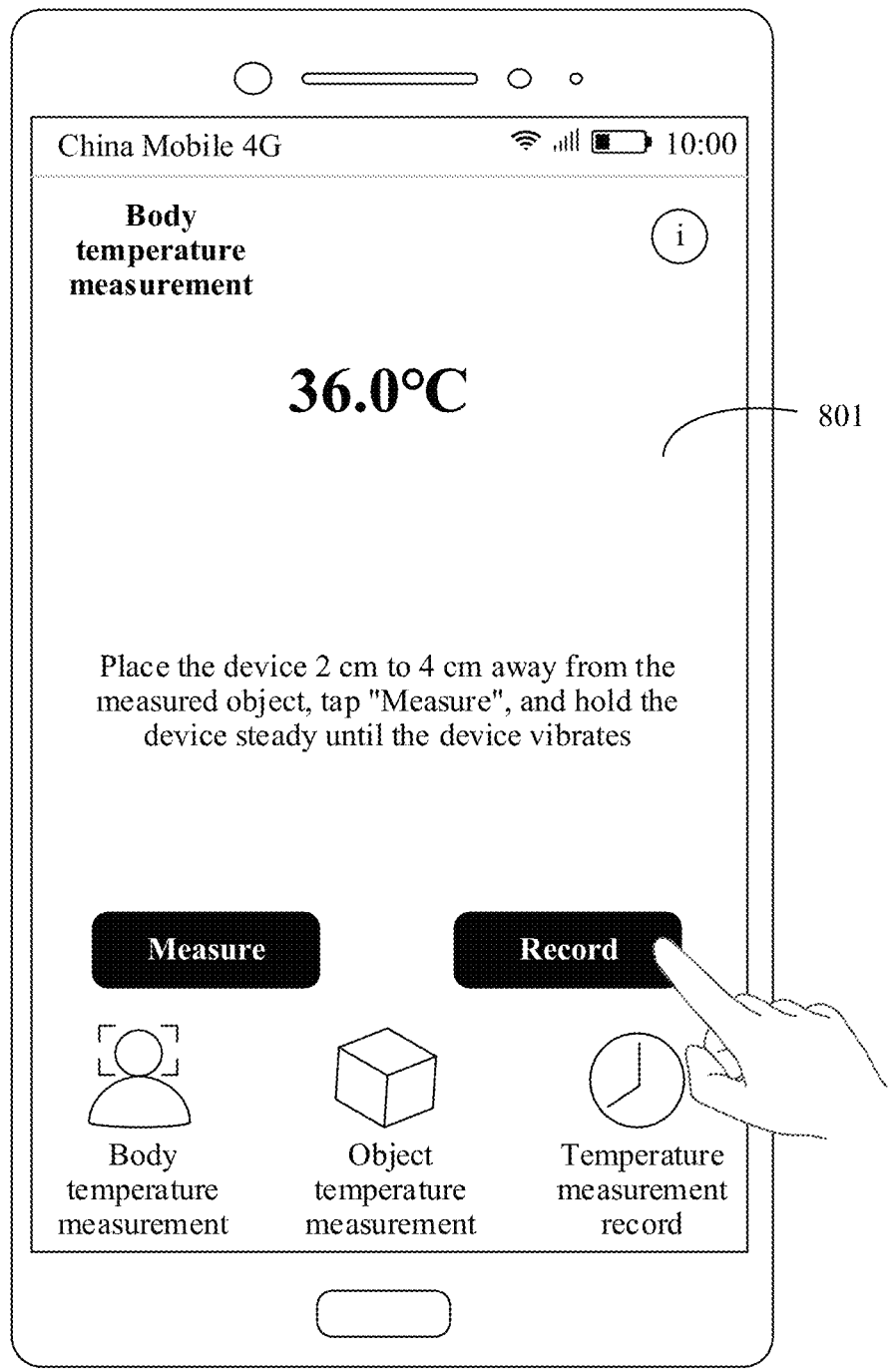
FIG. 8A to FIG. 8D are schematic diagrams of an interface of still another temperature measurement process according to an embodiment of this application.
Figure 8B:
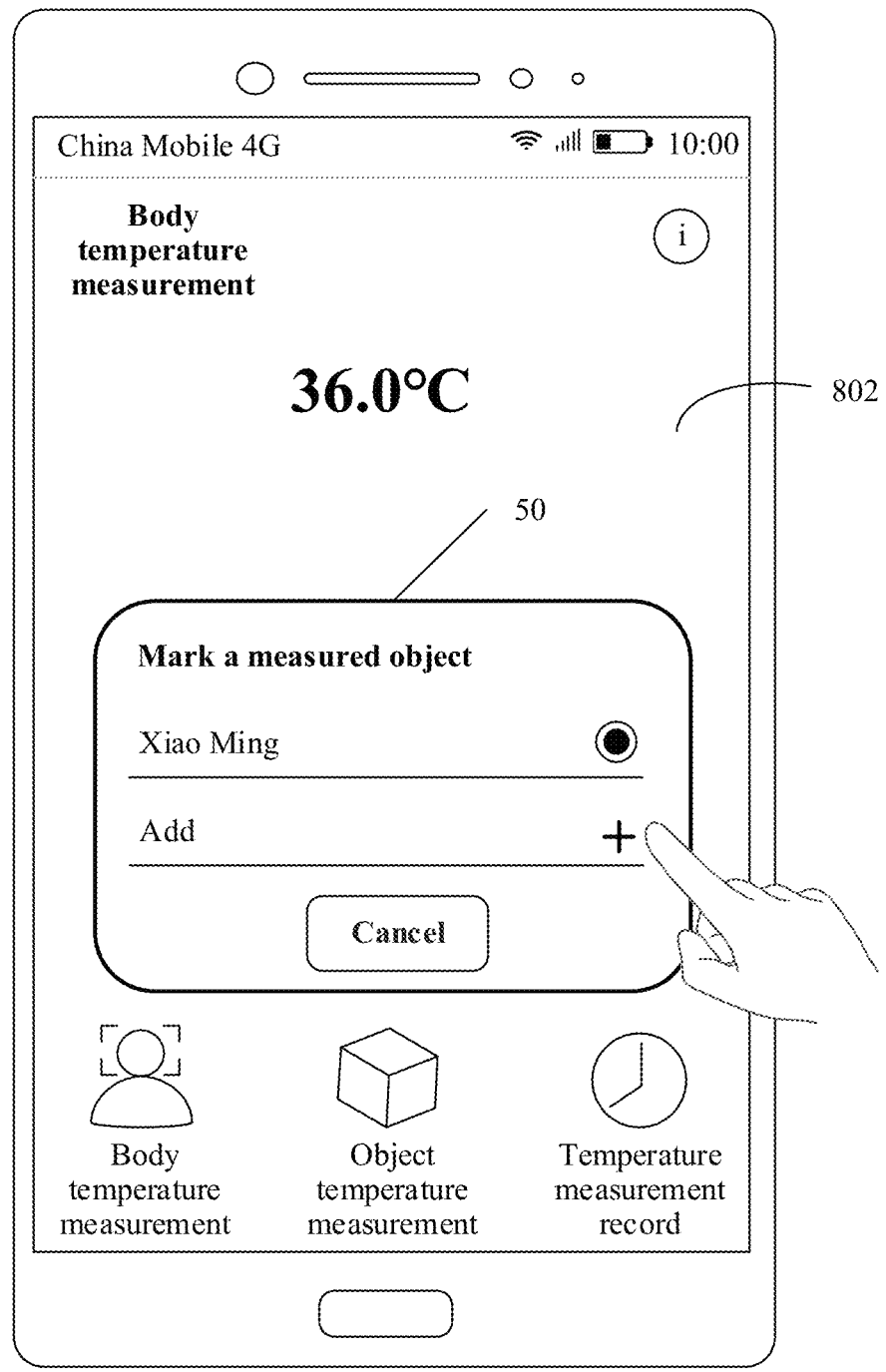
Figure 8C:
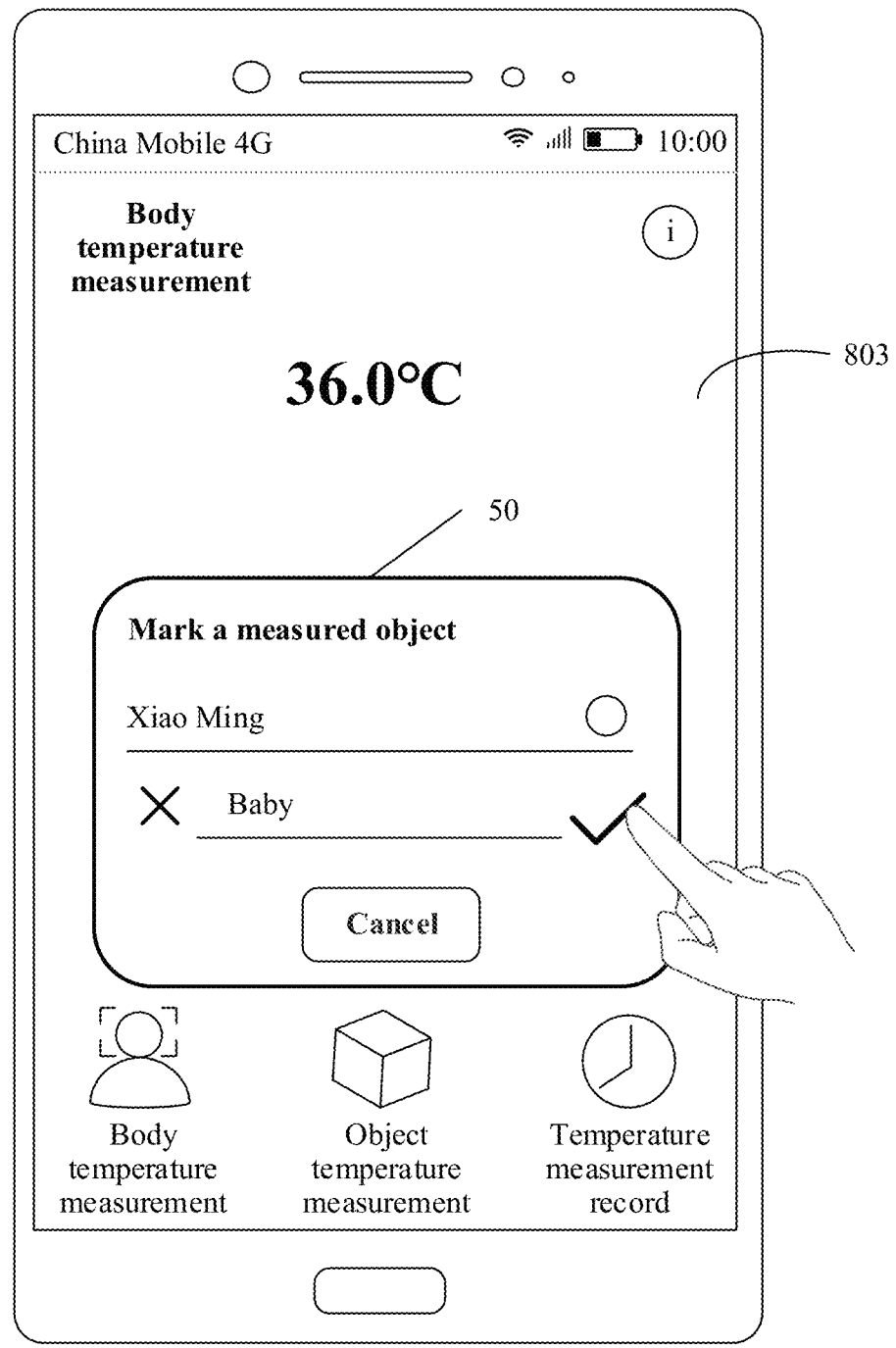
Figure 8D:
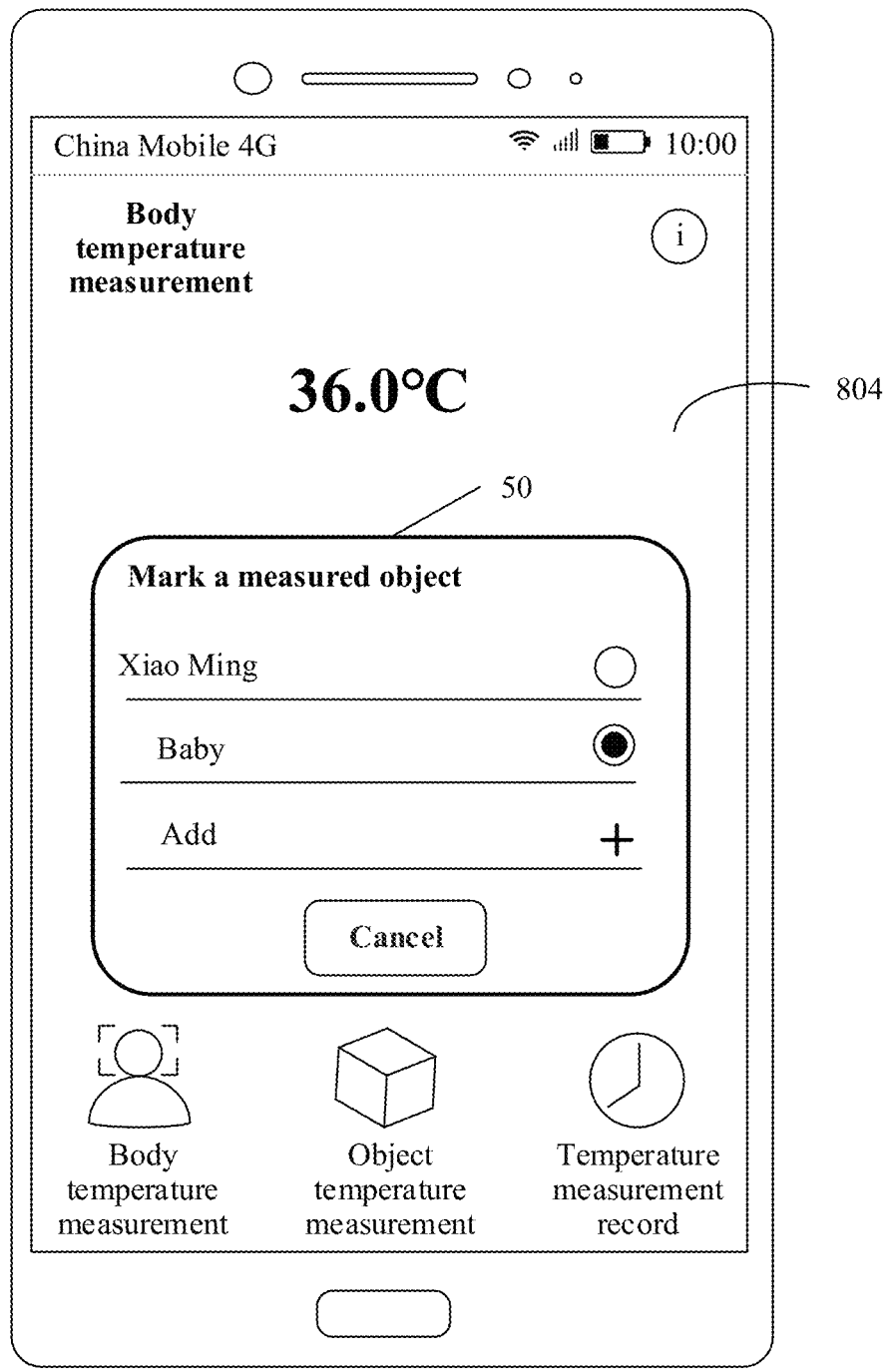

As shown in FIG. 8A, after the user taps a "Record" button, a temperature record window 50 on an interface 802 displays a previously recorded object name. When "Baby" is in the predicted object name, the user may directly select the "Baby" option, and may save a current body temperature value to a temperature record of "Baby". When "Baby" is not in the predicted object name, as shown in FIG. 8B, the user may tap an "Add" option or a "+" button, as shown in FIG. 8C, enter the new "Baby" user, and tap "OK". The temperature record window 50 may display a diagram shown in FIG. 8D. The new added "Baby" option is included in the predicted object name, and a currently measured body temperature value 36° C. is saved as temperature information of the "Baby" user.

With reference to FIG. 6A to FIG. 8D, the foregoing describes an operation process of measuring the body temperature of the person. In the body temperature measurement process of the user, the infrared temperature sensor may fail to obtain the body temperature of the person due to an improper operation. FIG. 9A to FIG. 9I are schematic diagrams of an interface of still another temperature measurement process according to an embodiment of this application.

Figure 9A:
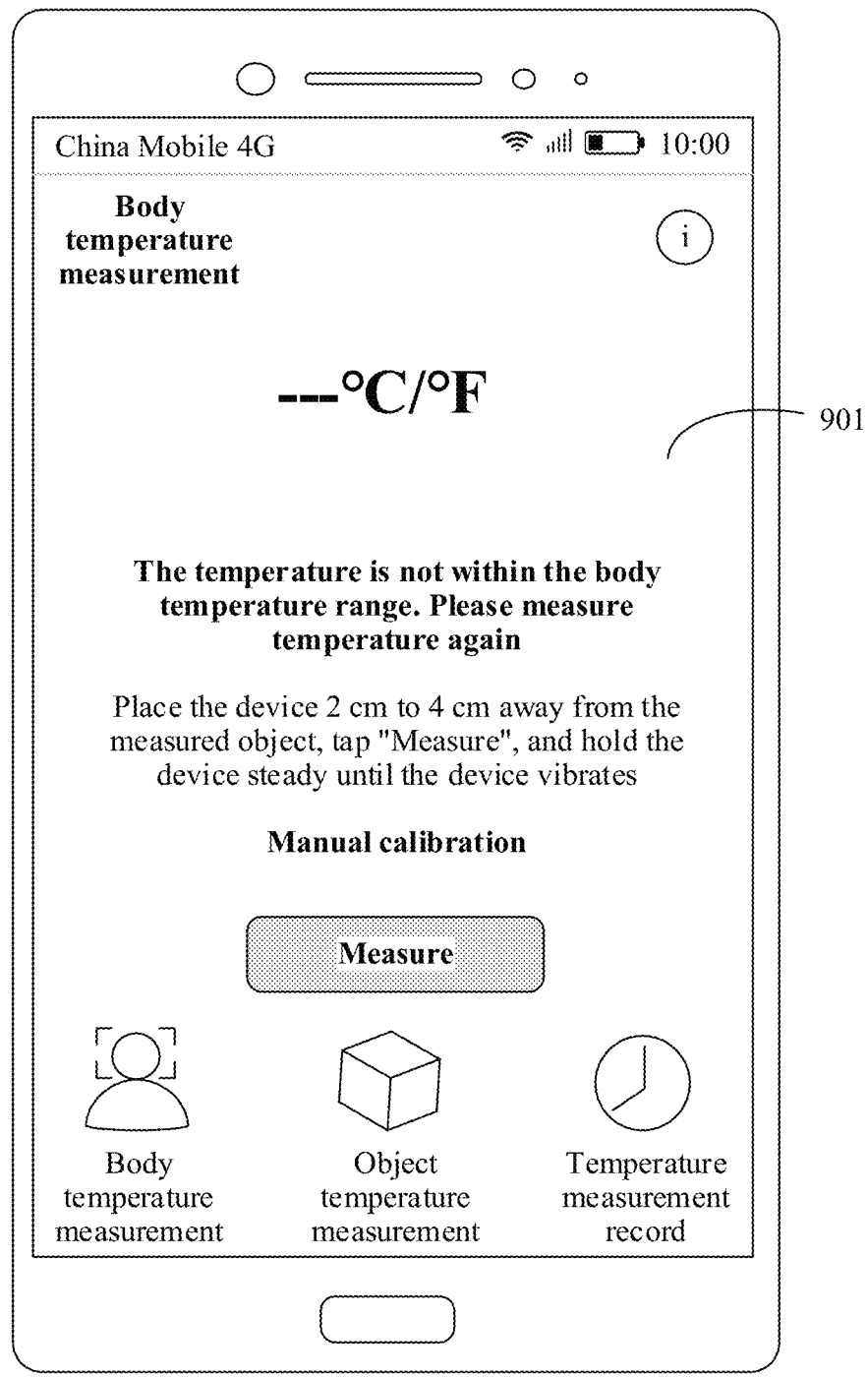
FIG. 9A to FIG. 9I are schematic diagrams of an interface of still another temperature measurement process according to an embodiment of this application.

In a possible implementation, when a mode currently selected by a user is a body temperature measurement mode, a temperature range that can be measured by a system is 35.0° C. to 42.0° C. by default. When a temperature range measured by a mobile phone is less than 35.0° C. or greater than 42.0° C., in other words, when a current temperature is not within the temperature range of the body temperature measurement mode, as shown in FIG. 9A, the mobile phone may display a prompt message on a temperature measurement interface 901, to prompt the user with "The temperature is not within the body temperature range. Please measure temperature again". The user may tap "Measure" again according to the prompt. Optionally, in this case, the interface cannot display the temperature, and a "Measure" button is gray. When a temperature measurement box is gray, the user cannot start a temperature measurement process.

Figure 9B:
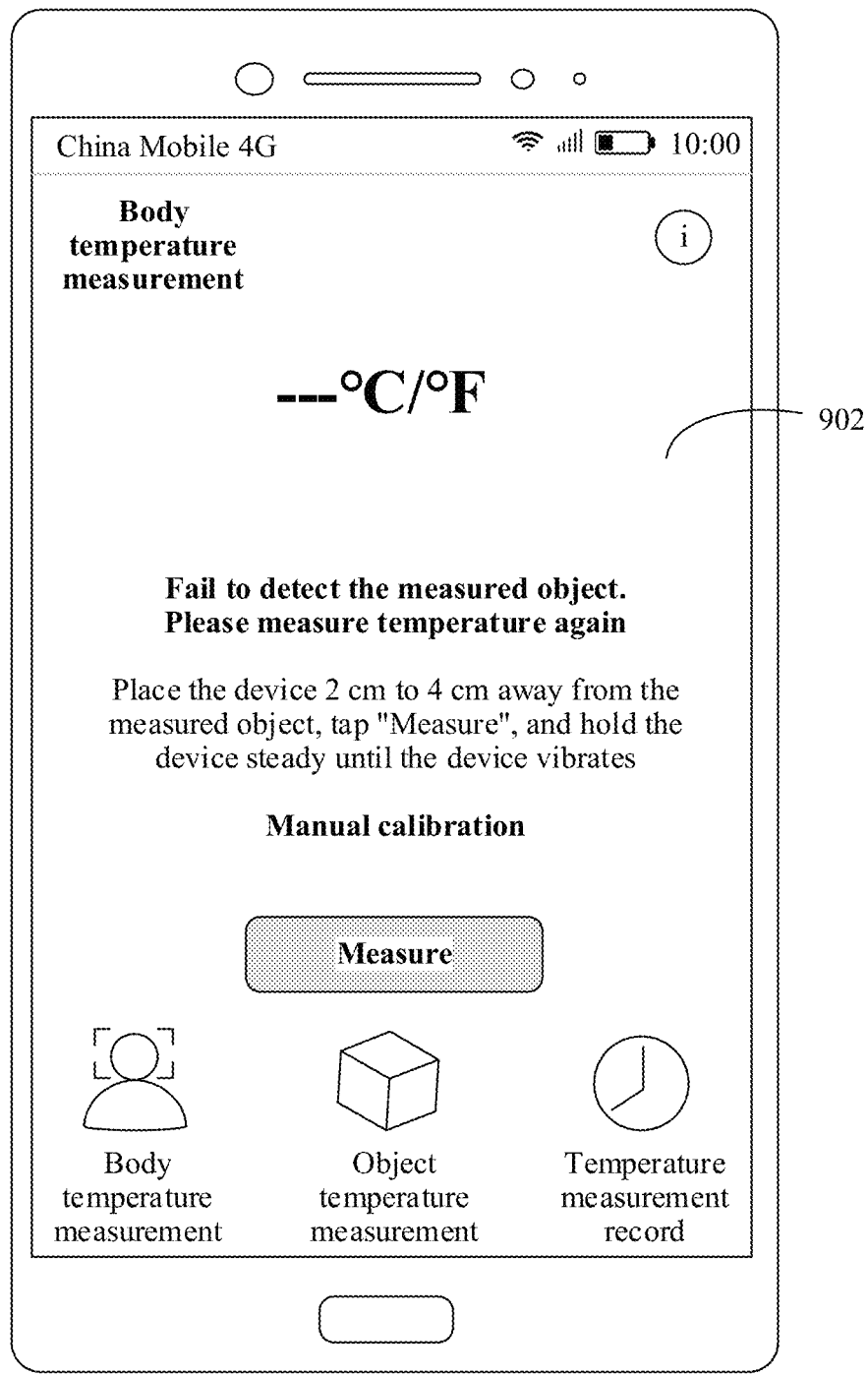

In another possible implementation, when a mode currently selected by a user is a body temperature measurement mode, and when a mobile phone fails to detect a measured object, for example, an infrared temperature sensor of the mobile phone is too far away from the measured object, or an abnormal temperature, of an area in which the measured object is measured, that is collected by an infrared temperature sensor makes the mobile phone fail to detect the measured object, as shown in FIG. 9B, the mobile phone may display a prompt message on a temperature measurement interface 902, to prompt the user with "Fail to detect the measured object. Please measure temperature again". The user may tap "Measure" again according to the prompt.

Figure 9C:
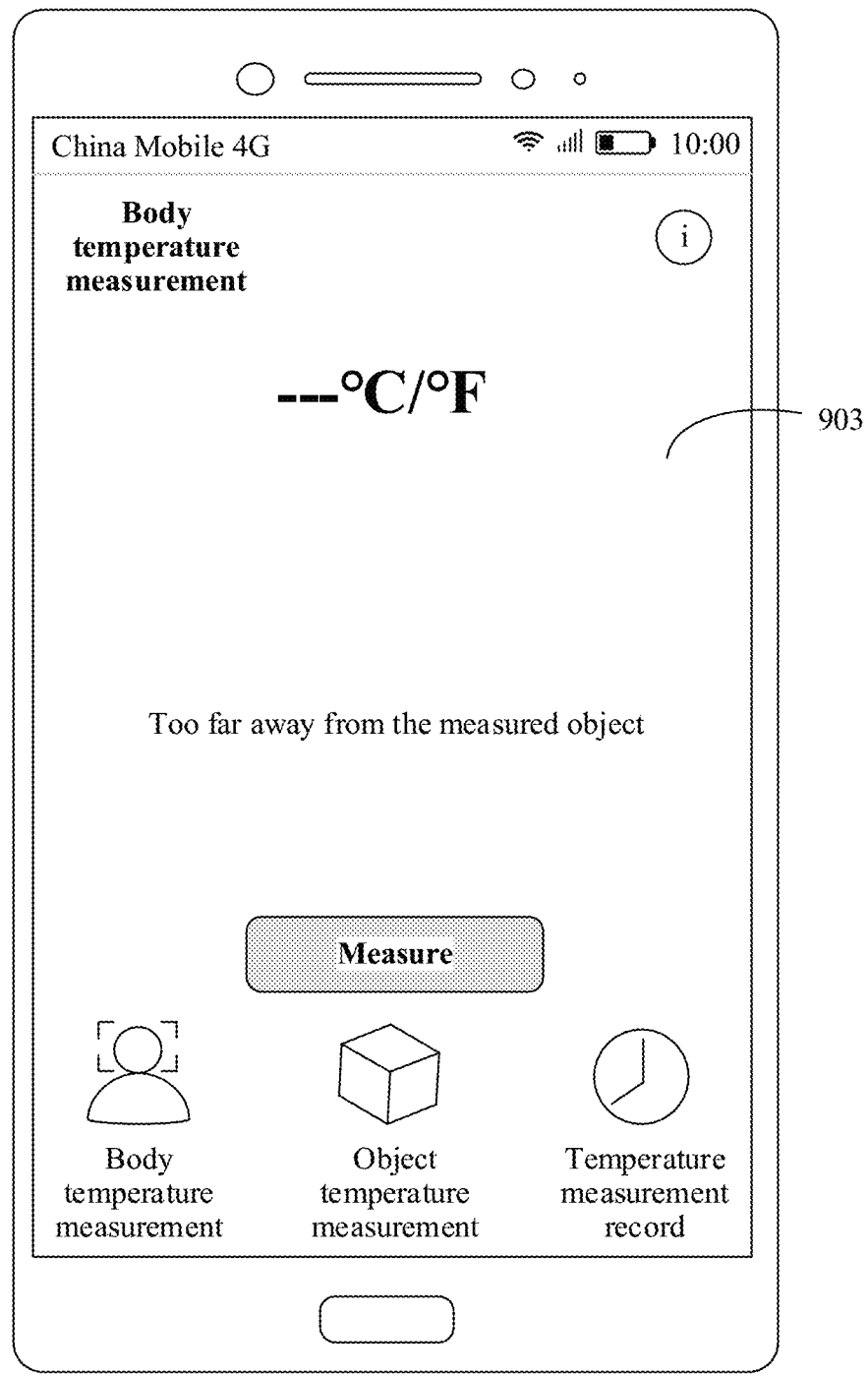

In still another possible implementation, when a mode currently selected by a user is a body temperature measurement mode, and when a mobile phone detects that an infrared temperature sensor is too far away from a measured object, as shown in FIG. 9C, the mobile phone may display a prompt message on a temperature measurement interface 903, to prompt the user with "Too far away from the measured object". The user can reduce a distance between the infrared temperature sensor and the measured object according to the prompt, to complete a temperature measurement process.

Optionally, for a scenario in which temperature measurement cannot be performed, such as the diagram in FIG. 9B and the diagram in FIG. 9C, in this case, a "Measure" button is gray, and when a temperature measurement box is gray, the user cannot start a temperature measurement process.

In this embodiment of this application, the mobile phone may detect the distance between the infrared temperature sensor and the measured object in a plurality of manners.

Optionally, the mobile phone may detect the distance between the mobile phone and the measured object by using a distance sensor 180F. The distance sensor 180F may be a laser distance sensor. The distance between the mobile phone and the measured object is determined by transmitting a laser to the measured object and measuring a time period required for a round trip of the laser.

Alternatively, when a camera assembly 10 of the mobile phone includes a TOF lens, the mobile phone may detect the distance between the mobile phone and the measured object based on depth-of-field data collected by the TOF lens. It should be understood that the TOF lens may emit a "light wall" along a direction of the lens when working. When encountering the measured object, the "light wall" reflects back a corresponding light. The mobile phone may determine a distance between the measured object and the TOF lens through those lights, in other words, can determine the distance between the mobile phone and the measured object.

Alternatively, when a camera assembly 10 of the mobile phone includes a dual-lens device, the dual-lens device collects depth-of-field data through a joint function of two lenses with different focal lengths. The mobile phone may detect the distance between the mobile phone and the measured object based on the depth-of-field data collected by the dual-lens device.

In still another possible implementation, when a mode currently selected by a user is a body temperature measurement mode, a temperature range that can be measured by a system is 35.0° C. to 42.0° C. by default, and the system may further set a temperature interval shown in the following Table 1, or the user may manually enter a set temperature interval. When the temperature measurement is correctly performed and the body temperature is accurately measured, the system can determine a health status of the user based on a temperature measurement result and send a prompt.

Optionally, the system may determine the health status of the user based on a body temperature interval in Table 1, and prompt the user with the current health status by displaying different colors.

TABLE 1

| Body temperature range | Measure result and display |
| --- | --- |
| 35.0° C.-35.6° C. | Normal low (blue) |
| 35.7° C.-37.4° C. | Normal (green) |

TABLE 1-continued

| Body temperature range | Measure result and display |
| --- | --- |
| 37.5° C.-38.5° C. | Normal high or low fever (yellow) |
| 38.6° C.-42.0° C. | High fever (red) |

For example, when the temperature ranges from 35.0° C. to 35.6° C. is a normal low temperature range of a human body, the temperature result can be displayed in blue. Alternatively, a prompt window is displayed in an interface to prompt the user that the current body temperature is low, and clothing can be properly added to keep warm. When the temperature ranges from 35.7° C. to 37.4° C. is a normal temperature range of a human body, the temperature result can be displayed in green. Alternatively, a prompt window is displayed in the interface to prompt the user that the current body temperature is normal and the user needs to exercise properly to keep healthy. When the temperature ranges from 37.5° C. to 38.5° C. is a normal high or low fever temperature range of a human body, the temperature result can be displayed in yellow. Alternatively, a prompt window is displayed in the interface to prompt the user that the current body temperature is high and the user needs to seek medical treatment in time if the body is unwell.

When the temperature ranges from 38.6° C. to 42.0° C. is a high fever temperature range of a human body, the temperature result can be displayed in red. Alternatively, a prompt window is displayed in the interface to prompt the user that the current body is in a high fever state, and the user needs to go to a hospital for check and treatment as soon as possible. In addition, information such as a position and a phone number of a fever clinic near the user is recommended. This is not limited in this embodiment of this application.

Figure 9D:
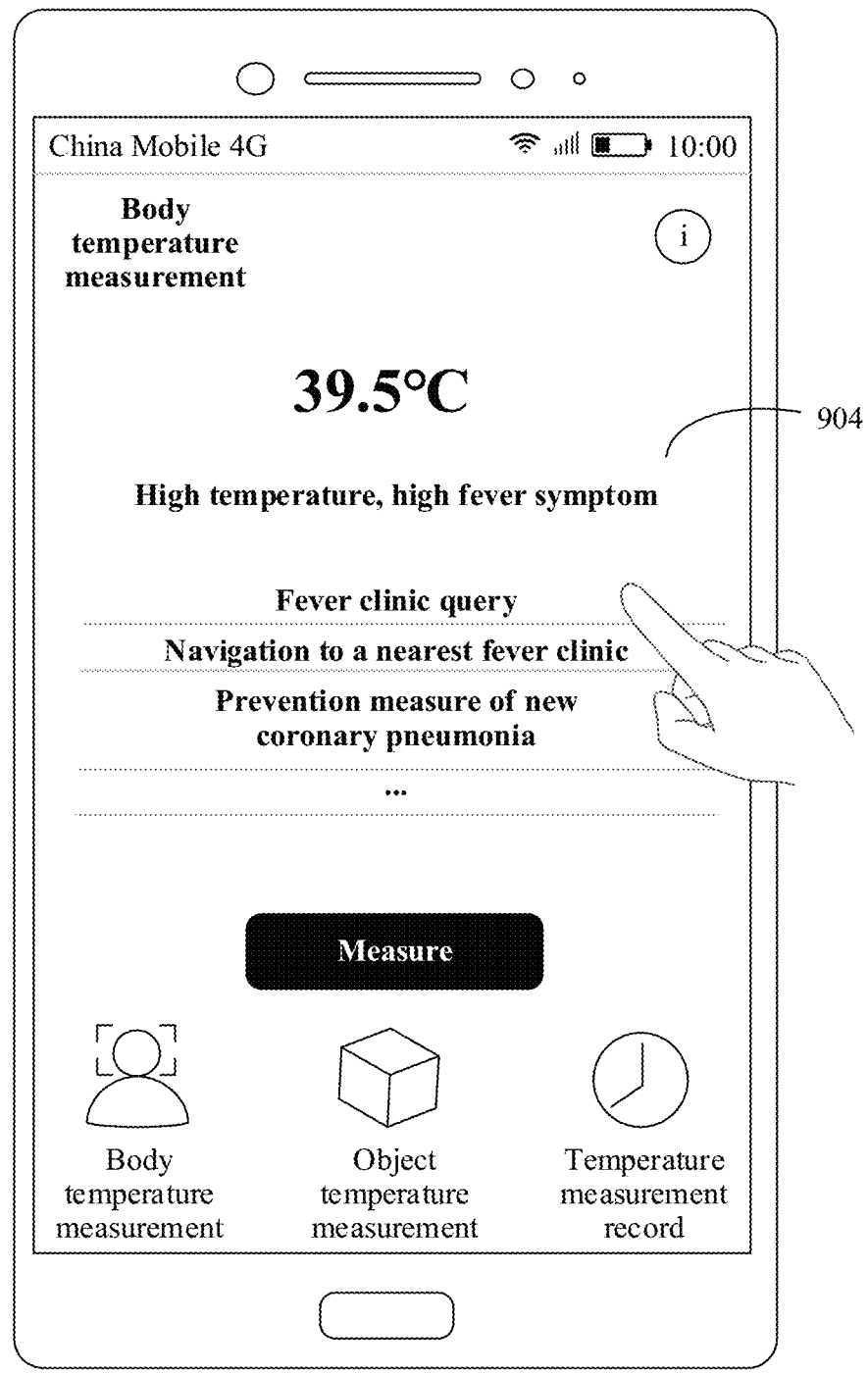

For example, as shown in FIG. 9D, if the current temperature measurement result is 39.5° C., the system determines that the measured object is in the high fever state, and may display the temperature measurement result in red, and prompt the user with "High temperature, high fever symptom".

Optionally, the mobile phone may automatically connect to a cloud server, obtain a current phase current news event, and send a prompt message to the user, for example, an epidemic prevention measure and a precaution related to a fever.

For example, as shown in FIG. 9D, for the high fever state of the currently measured object, prompt content in the interface 904 may further include different content such as "Fever clinic query", "Navigation to a nearest fever clinic", and "Prevention measure of new coronary pneumonia". The user can tap any prompt content to view corresponding detailed information.

Figure 9E:
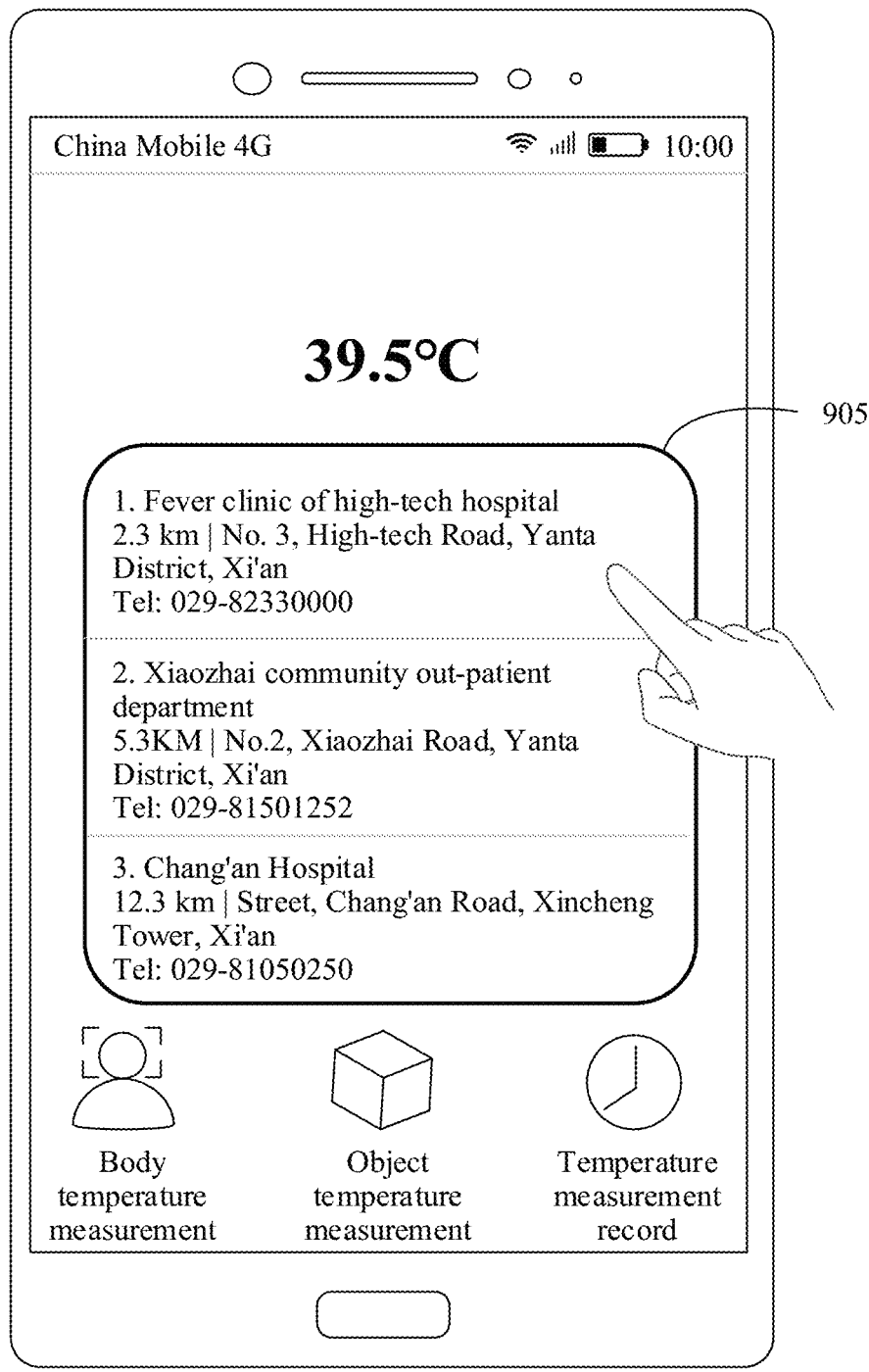
Figure 9F:

For example, when the user taps "Fever clinic query", the mobile phone may display an interface 905 shown in FIG. 9E. The interface 905 includes fever clinic information queried by the system, for example, distances, geographical position information, and phone numbers of several nearest fever clinics. This is not limited in this embodiment of this application. When the user taps a nearest fever clinic "Fever clinic of high-tech hospital", the mobile phone may invoke an installed navigation application, and display a navigation route interface 906 of the fever clinic for the user.

Figure 9G:
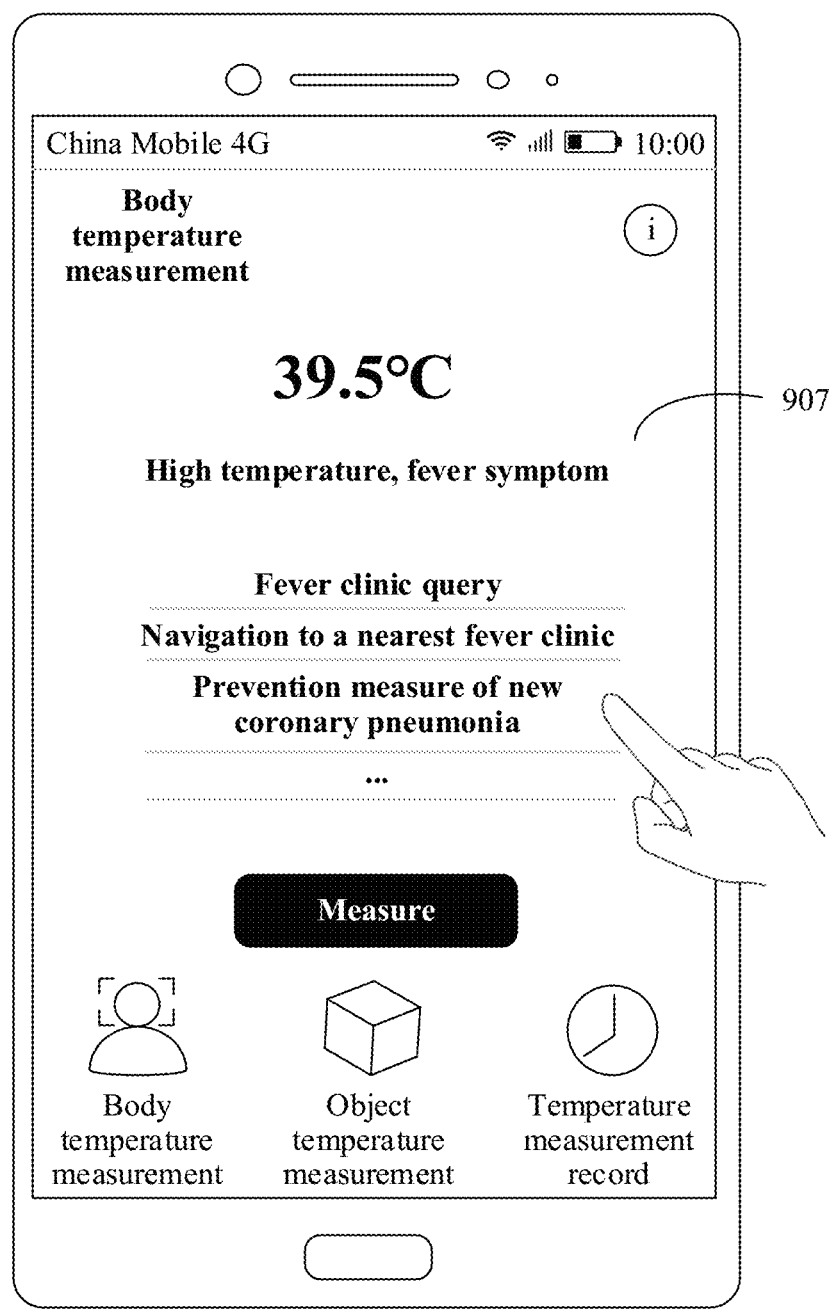
Figure 9H:
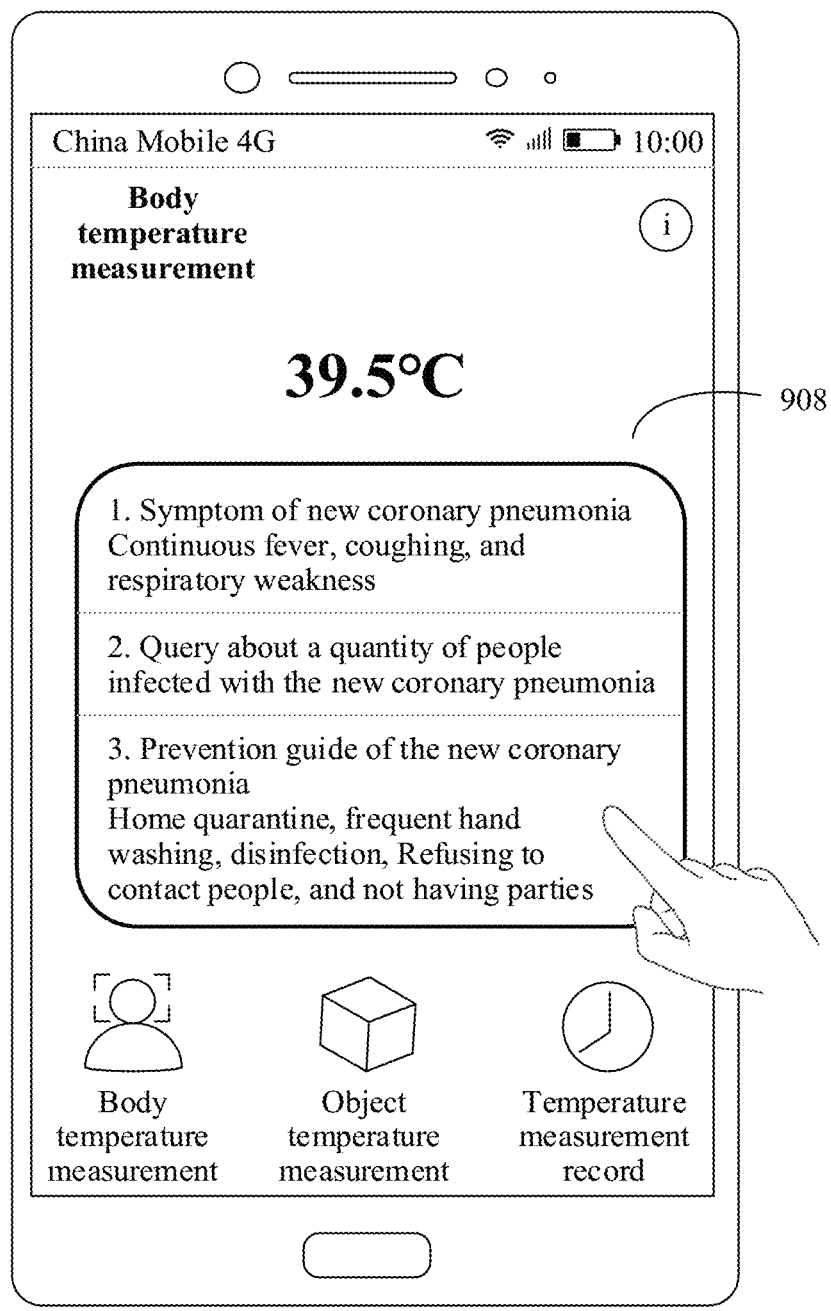

Alternatively, for example, as shown in FIG. 9G, when the user taps the epidemic prevention measure option related to a fever, the mobile phone may obtain more news events related to the epidemic, and display more content, for example, a query about a new coronary pneumonia symptom, a query about a quantity of people infected with the new coronary pneumonia, and a query about a prevention guide of the new coronary pneumonia. The user can query different content based on different requirements.

Figure 9I:
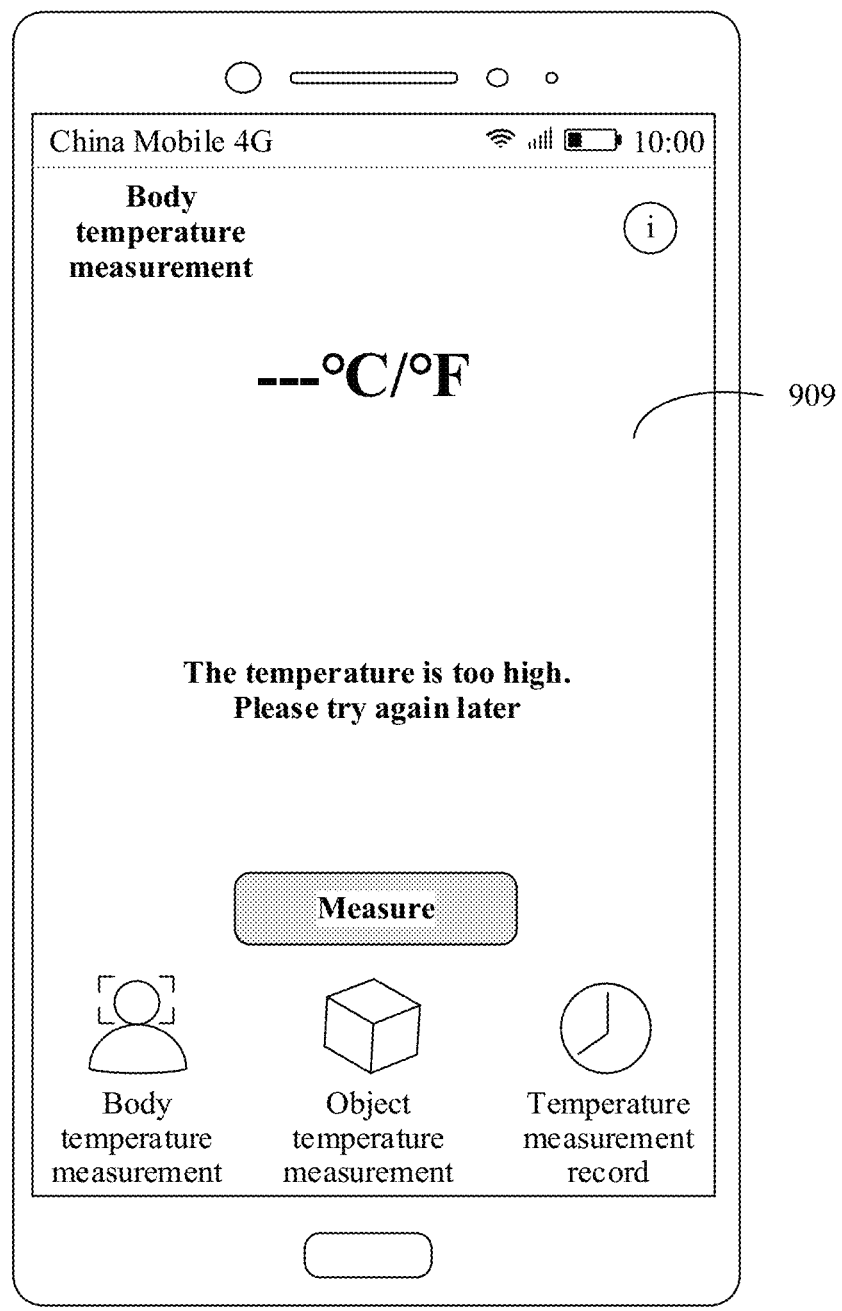

In another possible implementation, when the mobile phone performs calibration before temperature measurement, if the mobile phone detects that an ambient temperature is too high, for example, the ambient temperature is higher than 42° C., the mobile phone may display a prompt box. As shown in FIG. 9I, the mobile phone may display prompt content, for example, "The temperature is too high. Please try again later" on an interface 909 to prompt the user. In this case, "Measure" is gray, and when a temperature measurement box is gray, the user cannot start a temperature measurement process.

Alternatively, when the user uses the mobile phone for a long time, the mobile phone heats up, and the temperature sensor detects that a temperature of the mobile phone is too high, which may affect measurement of the infrared temperature sensor due to heat conduction. In this case, the interface 909 may further display "The temperature of the mobile phone is too high. Please rest for 5 minutes and try again", and the like, to prompt the user that the temperature cannot be accurately measured. In this case, "Measure" can be displayed in gray.

In a possible implementation, the mobile phone may prompt the user by displaying a prompt message on an interface of the mobile phone, or may prompt the user by voice.

For example, after the user correctly performs a measurement operation and measures the temperature, the mobile phone notifies, through voice broadcast, the user that "The current body temperature is 36° C., and the body temperature is normal". Alternatively, when the user incorrectly performs a measurement operation, for example, in various abnormal scenarios in FIG. 9A to FIG. 9I, the mobile phone may notify the user of a correct operation through voice broadcast. In addition, an alarm prompt tone may be further added to prompt the user that the operation is incorrect. Alternatively, when the temperature measured by the user is too high, for example, 39.5° C., the mobile phone may add an alarm prompt tone, and notify, through voice broadcast, the user that the current measured object is in a high fever state, and the user needs to seek medical treatment in time. This is not limited in this embodiment of this application. The foregoing describes a process of measuring a human body temperature. In addition, the temperature measurement method in this embodiment of this application may be further used to measure an object temperature. FIG. 10A to FIG. 10D are schematic diagrams of an interface of an object temperature measurement process according to an embodiment of this application.

Figure 10A:
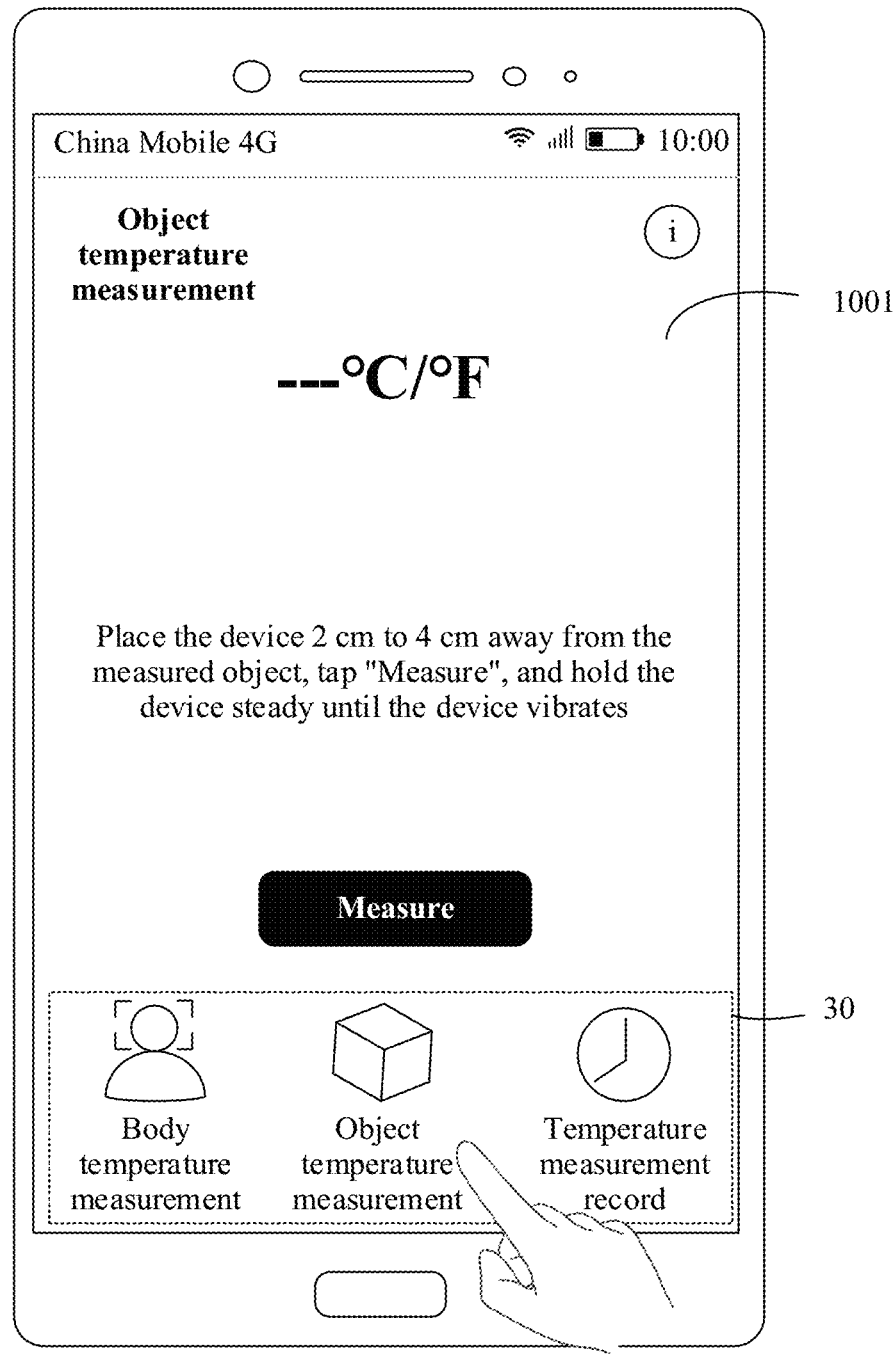
FIG. 10A to FIG. 10D are schematic diagrams of an interface of an object temperature measurement process according to an embodiment of this application.
Figure 10B:
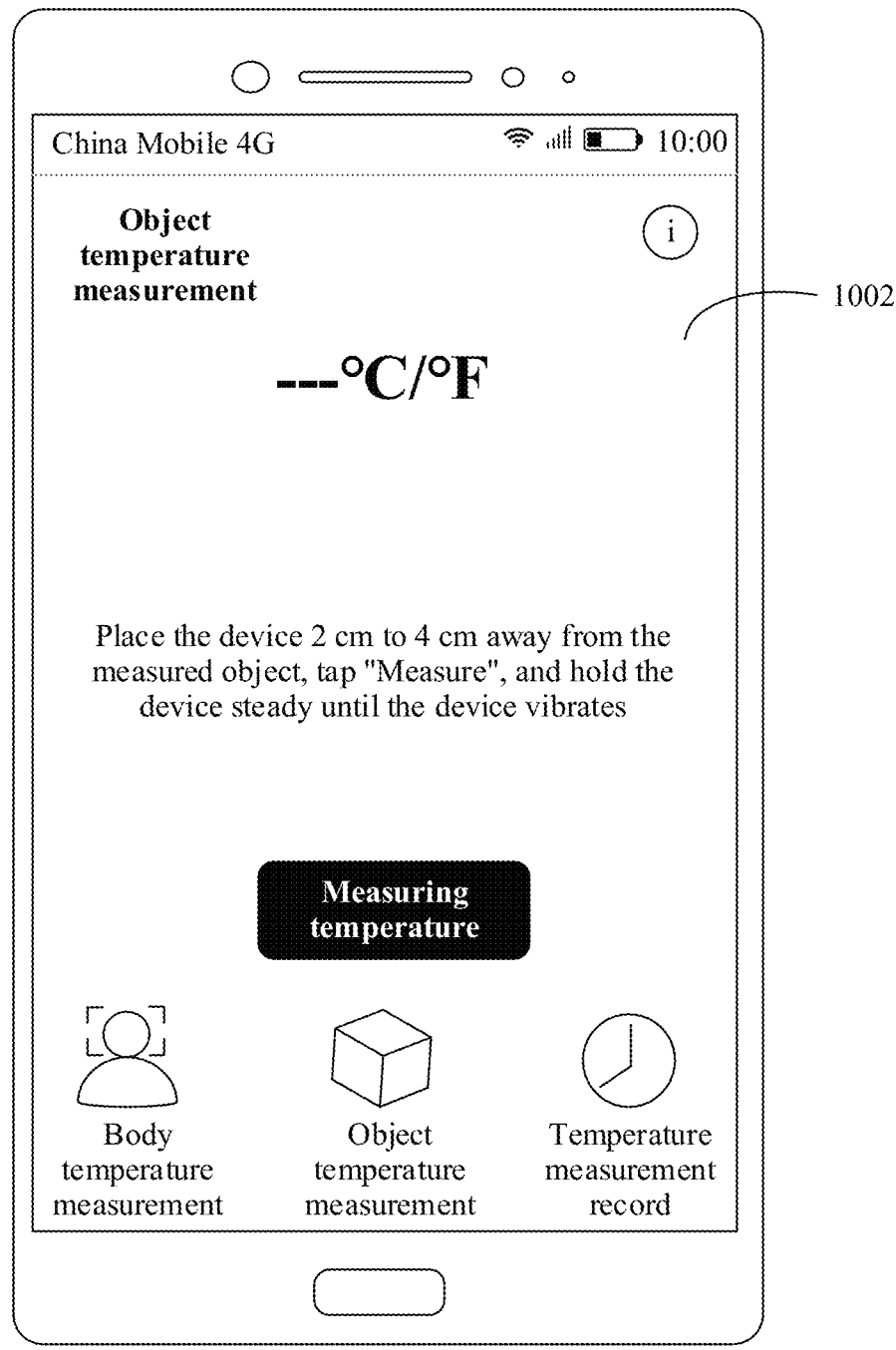
Figure 10C:
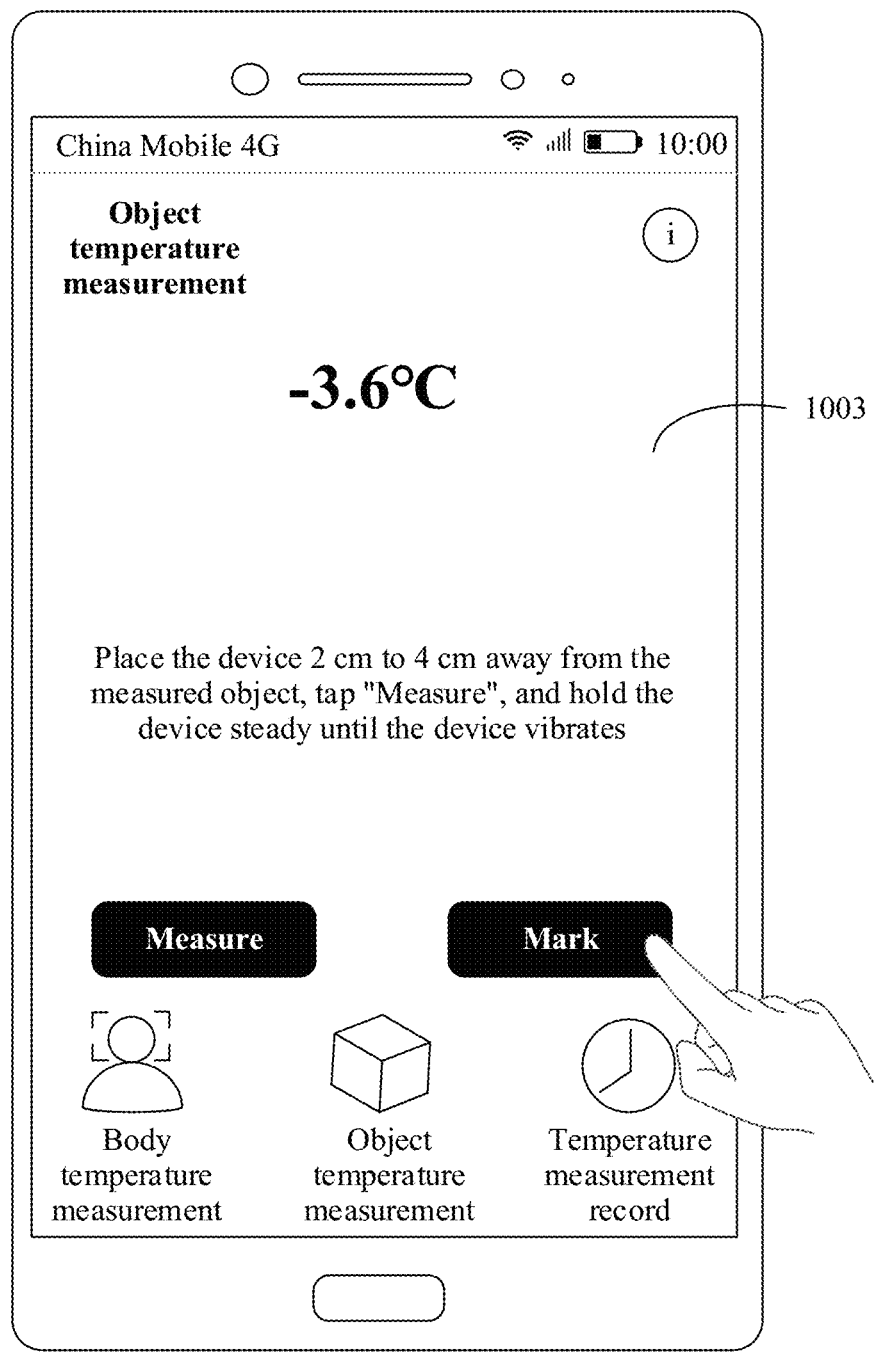
Figure 10D:
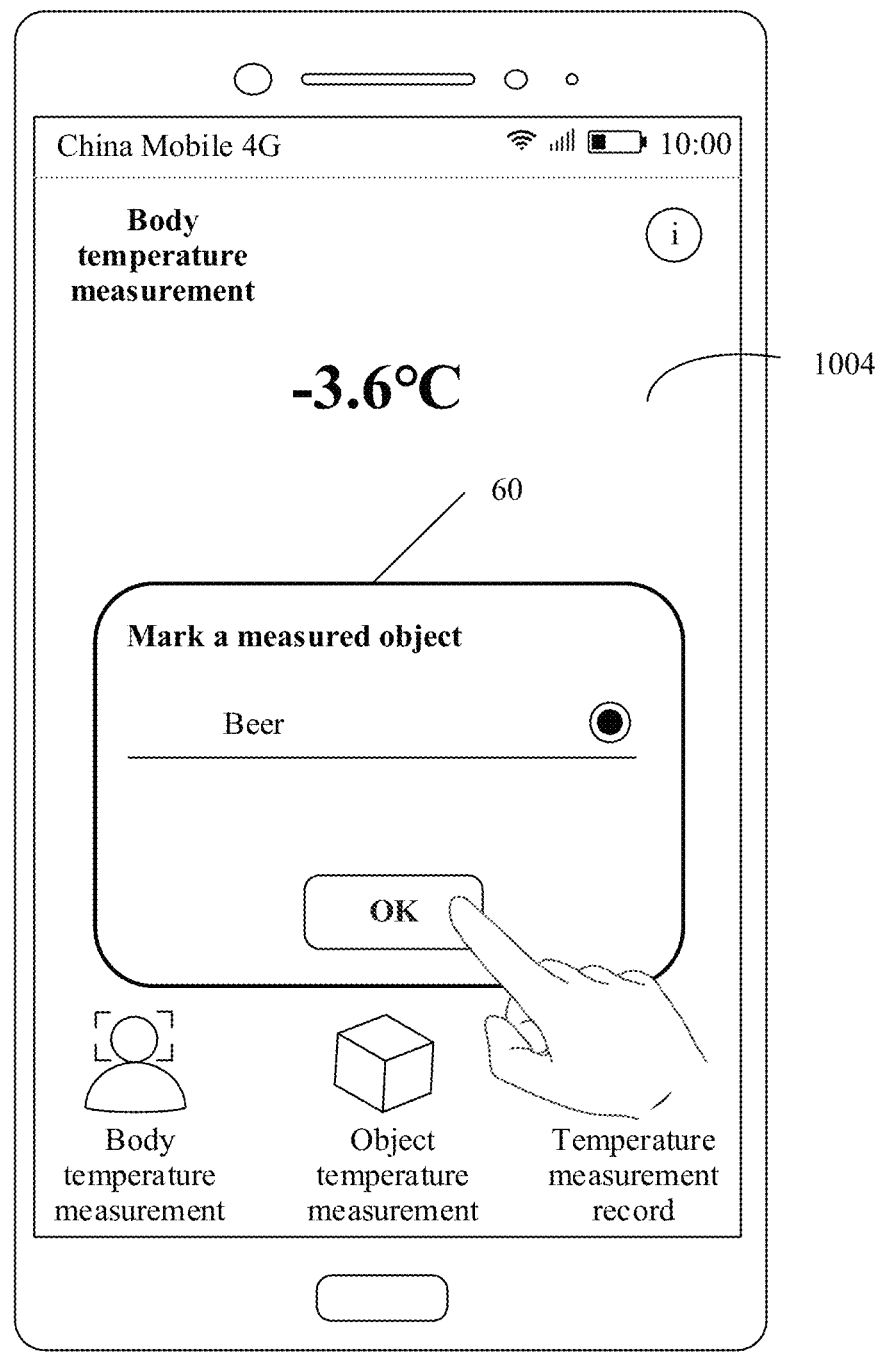

After a thermometer application is run, on a home screen 1001 shown in FIG. 10A, a user may tap "Object temperature measurement" in a menu area 30 on the home screen 1001, select a temperature measurement mode of the "Object temperature measurement", and perform the following operations according to a prompt in the temperature measurement interface: Place a mobile phone 2 cm to 4 cm away from a measured object, and tap "Measure" to start a temperature measurement process. The mobile phone may display an interface 1002 shown in FIG. 10B.

After the mobile phone vibrates, the temperature measurement process ends. A temperature of the current object is displayed as −3.6° C. on a temperature measurement interface 1003, and a "Measure" button and a "Mark" button are further displayed in the temperature measurement interface 1003. The user may tap the "Measure" button to restart the temperature measurement process, and measure the temperature of the object again. The user may tap the "Mark" button to record the temperature of the current object. For example, the user performs an operation shown in FIG. 10C, and in response to the tapping operation of the user, a temperature measurement interface 1004 displays an object temperature marking window 60, the object temperature marking window 60 may display a list of objects measured by the user, and the user may input a currently measured object, for example, beer, in the object temperature marking window 60. In addition, the mobile phone may further intelligently classify objects measured by the user, for example, classify the objects into liquid, solid, gas, colloid, and the like based on physical forms of the objects, or classify the objects into food, plant, and the like based on types of the objects. This is not limited in this embodiment of this application.

In a possible implementation, when the user starts a temperature measurement process, when a system invokes an infrared temperature sensor to measure the temperature, the camera assembly 10 may be invoked at the same time, and the camera assembly 10 may obtain image information of the current measured object.

Optionally, in different scenarios, different cameras in a camera assembly 10 may be invoked. For example, when a body temperature of a person is measured, the person is relatively close to a mobile phone, and to obtain a feature of the person, a wide-angle camera may be used to obtain a full-view feature of the person, or a macro lens may be used to obtain facial information.

Alternatively, the mobile phone may obtain a full-view feature of the measured object by using a wide-angle camera, and determine, based on the full-view feature, that the measured object is a person, a pet, or another object, and further obtain detail information by using a macro lens, and determine that a forehead, an oral cavity, an armpit, or the like is specifically measured when a human body temperature is measured. This is not limited in this embodiment of this application.

Optionally, any one or more cameras in the camera assembly 10 may obtain image information of the current measured object in a background. In other words, the temperature measurement interface of the mobile phone does not display a preview image that is of the measured object and that is obtained by the camera. The mobile phone performs intelligent identification based on the preview image that is of the measured object and that is obtained by the camera, and when identifying that the current measured object is beer, automatically displays a beer label in the object temperature marking window 60. The user does not need to enter "Beer" into the measured object list. When determining that the currently automatically identified and displayed beer label is correct, the user may perform an operation shown in FIG. 10D, and tap an "OK" button to save a currently measured temperature −3.6° C. to the beer label.

Alternatively, when the mobile phone automatically identifies that the currently measured object is a beer and displays a beer label, but the object actually measured by the user is Coke, the user may also perform modification in the object temperature marking window 60, delete "Beer", enter "Coke", and save the modification. This is not limited in this embodiment of this application.

Alternatively, any one or more cameras in the camera assembly 10 may obtain image information of the current measured object in a foreground. All or some of areas in the temperature measurement interface of the mobile phone may be used to display a preview image that is of the measured object and that is obtained by the camera. The user may disable the preview image, or zoom in on the preview image displayed in an area to a full screen for display. Alternatively, the user may take a photo of the measured object and save the photo to a local album. This is not limited in this embodiment of this application.

FIG. 11A to FIG. 11D are schematic diagrams of an interface of another object temperature measurement process according to an embodiment of this application. In a possible implementation, on a temperature measurement interface 1001 in an object temperature measurement mode shown in FIG. 11A, a plurality of buttons may be further provided for a user, for example, a "Measure only" button and an "Identification and temperature measurement" button. The user taps the "Measure only" button, to perform the object temperature measurement method described in FIG. 10A to FIG. 10D. Alternatively, the user taps the "Identification and temperature measurement" button, to invoke the camera assembly 10, and a mobile phone may display an identification and temperature measurement interface 1102 shown in FIG. 11B. The interface 1102 may include an image preview area 70 (or referred to as an "Image identification area").

Figure 11A:
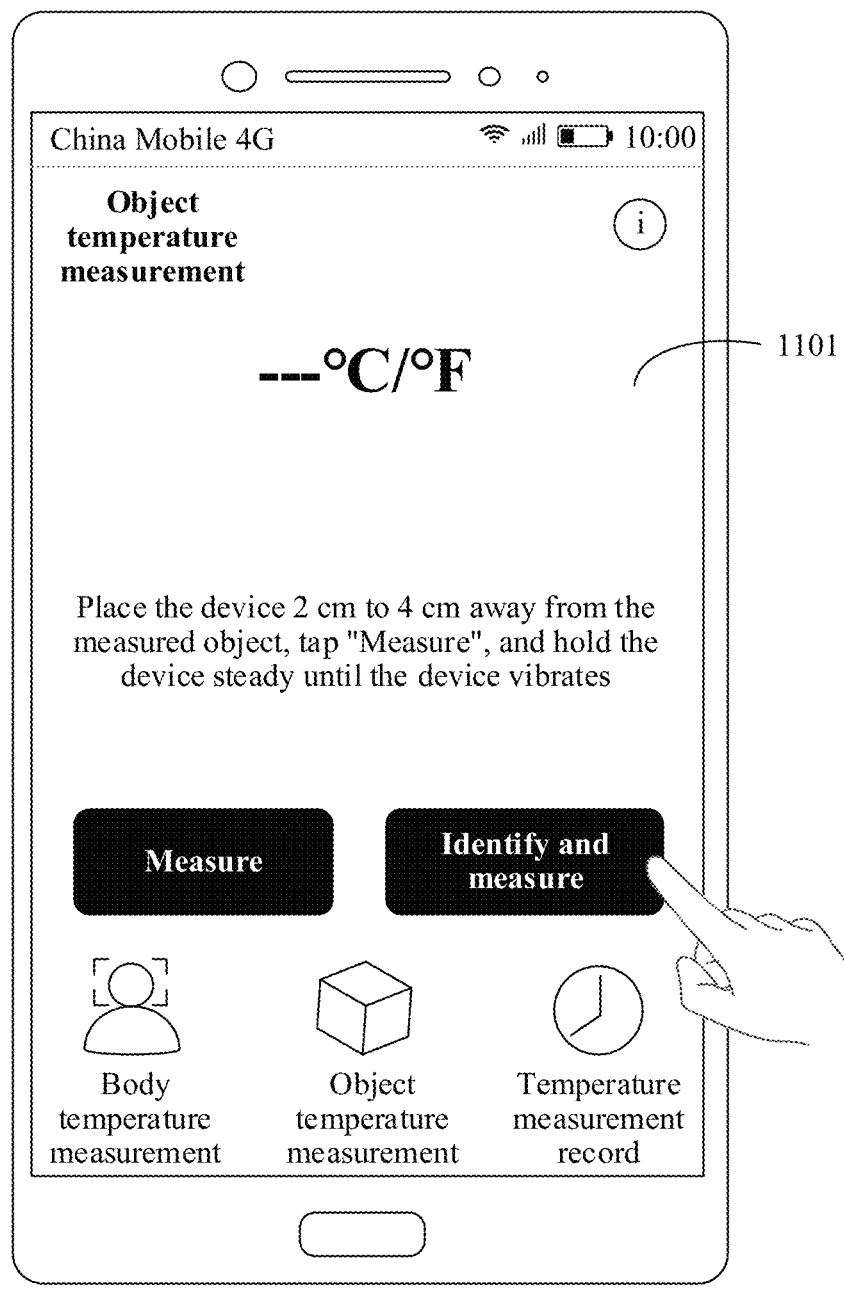
FIG. 11A to FIG. 11D are schematic diagrams of an interface of another object temperature measurement process according to an embodiment of this application.
Figure 11B:
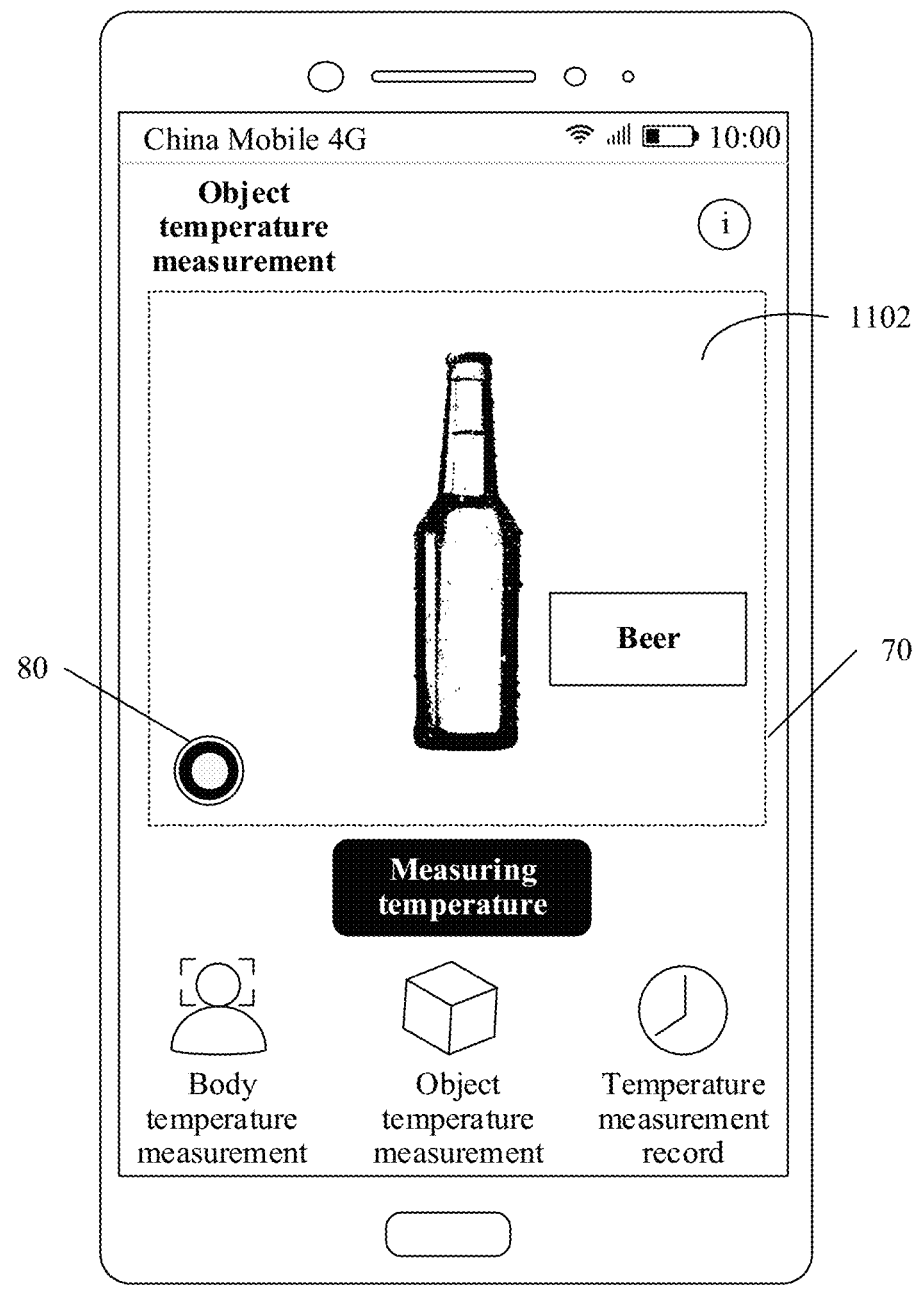
Figure 11C:
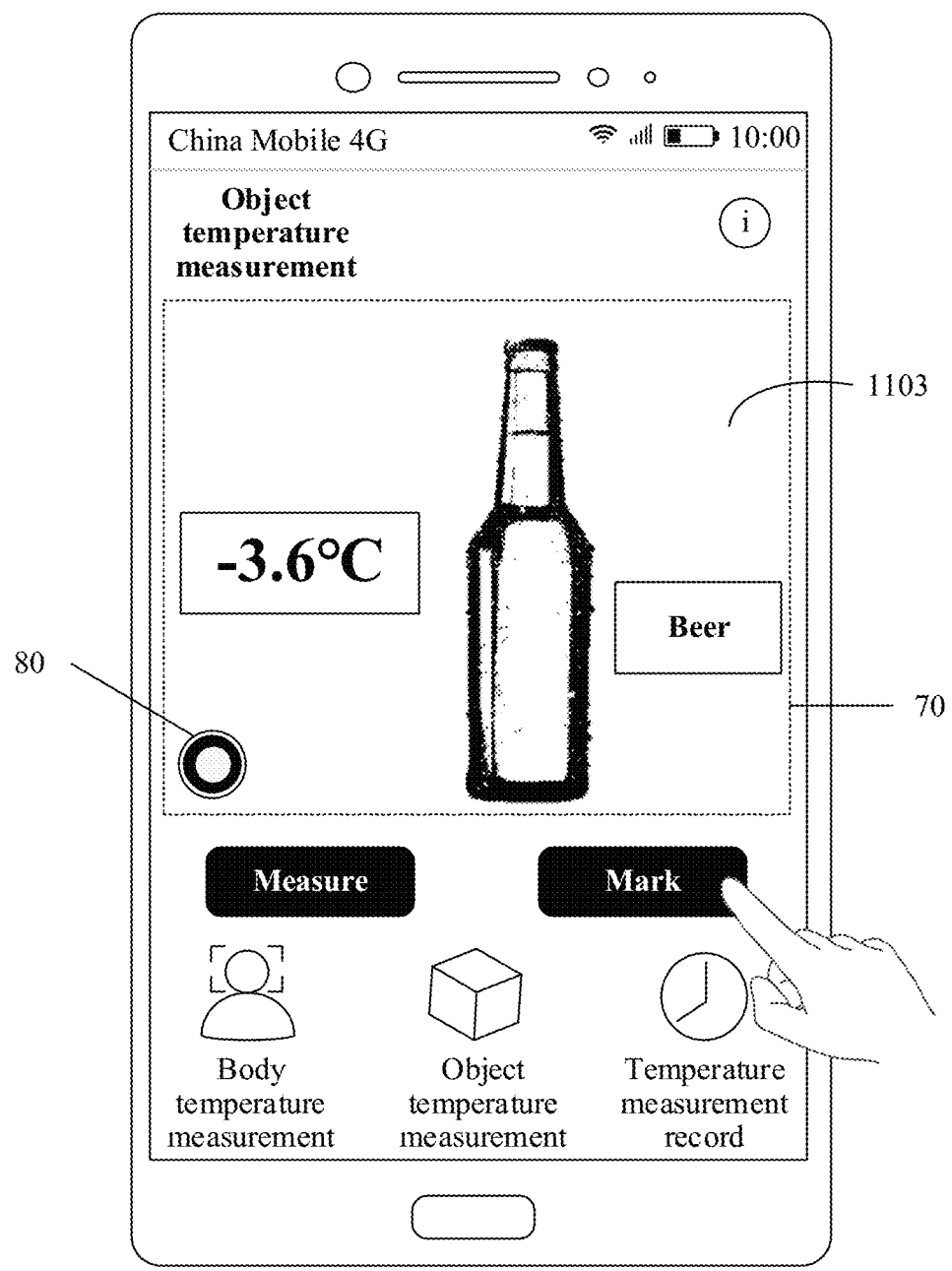
Figure 11D:
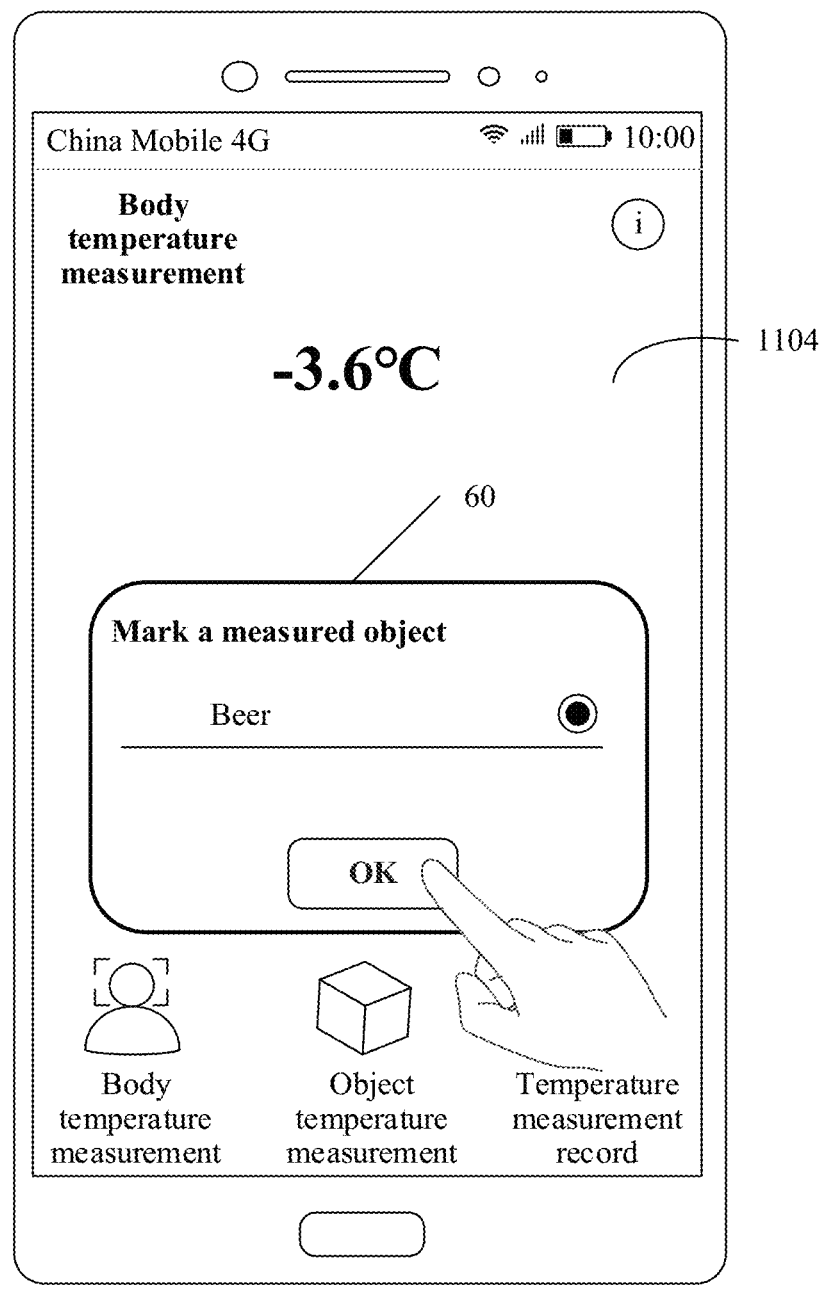

For example, as shown in FIG. 11B, the image preview area 70 may display a currently measured object beer and a photographing shutter button 80. The user may collect a photo of the measured object by tapping the photographing shutter button 80 or pressing a volume button, and save the photo to a local album.

When a system identifies the current measured object, a name or a classification label of the measured object is displayed in the image preview area 70. For example, as shown in FIG. 11B, the mobile phone identifies beer and displays a beer prompt box. It should be understood that an object identification process and temperature measurement may be performed at the same time. A sequence of object identification and temperature measurement is not limited in this embodiment of this application.

After the mobile phone completes the temperature measurement, the mobile phone may display a currently measured temperature −3.6° C. in the image preview area 70. As shown in a diagram in FIG. 11C, after the mobile phone completes the temperature measurement, the mobile phone displays a "Measure" button and a "Mark" button on an interface 1103. The user may tap the "Measure" button to restart a temperature measurement process, and measure the temperature of the object again. The user may tap the "Mark" button to record the temperature of the current object. For a specific temperature marking process, refer to the method described in FIG. 10A to FIG. 10D. Details are not described herein again.

The foregoing describes the body temperature measurement process with reference to FIG. 6A to FIG. 8D, and describes the object temperature measurement process with reference to FIG. 10A to FIG. 11D. For both the body temperature of the person and the temperature of the object, after the temperature measurement is completed, the system may store and manage the measured temperature.

FIG. 12A to FIG. 12D are schematic diagrams of a temperature management interface according to an embodiment of this application. As shown in FIG. 12A to FIG. 12D, after a thermometer application is run, a user may tap "Measure record" in the menu area 30 on the home screen of the thermometer application. In response to the tap operation of the user, a mobile phone displays a temperature measurement record interface 1201 shown in FIG. 12D. Temperature information that is of a measured object and that is stored by the user may be displayed in the temperature measurement record interface 1201.

For example, according to the operation shown in FIG. 7A to FIG. 7E, the mobile phone stores the temperature information of "Xiao Ming". According to the operation shown in FIG. 8A to FIG. 8D, the mobile phone stores the temperature information of "Baby". In other words, a database of "Xiao Ming" and "Baby" is established in the thermometer application. Correspondingly, a temperature curve chart of "Xiao Ming" and a temperature curve chart of "Baby" may be displayed in the temperature measurement record interface 1201. In addition, the temperature measurement record interface 1201 may further include temperature data that is not recorded by the user. For example, when the temperature measurement record interface 1201 is slid, temperature information of an unmarked object may be shown in FIG. 12B. It should be understood that the unmarked object may be a same object, or may be a different object. This is not limited in this embodiment of this application.

Optionally, the curve chart may include a temperature measurement time point, for example, 08:00 on January 4 and 10:00 on January 10. Optionally, the curve chart may further include other information such as a temperature measurement position. This is not limited in this embodiment of this application.

Figure 12A:
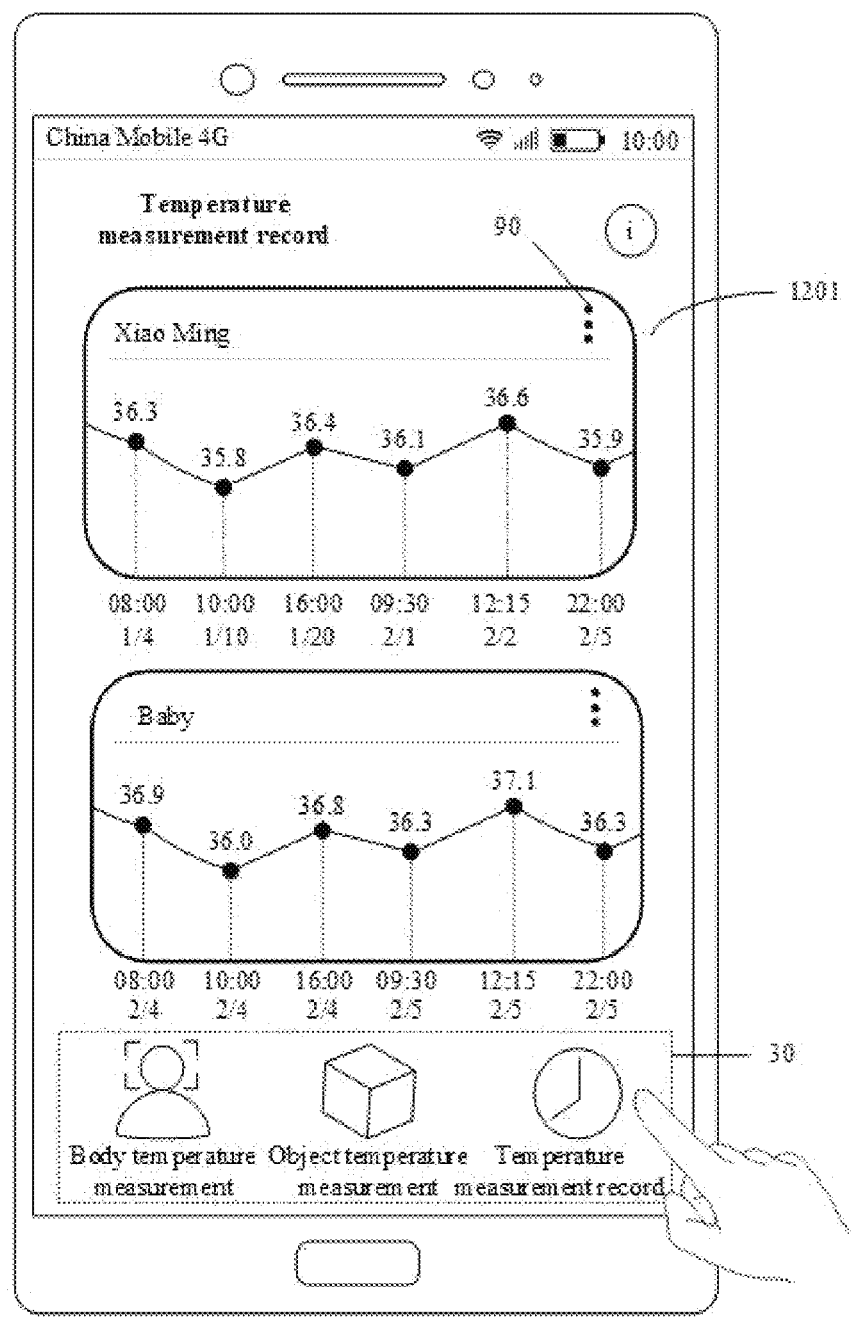
FIG. 12A to FIG. 12D are schematic diagrams of a temperature management interface according to an embodiment of this application.
Figure 12B:
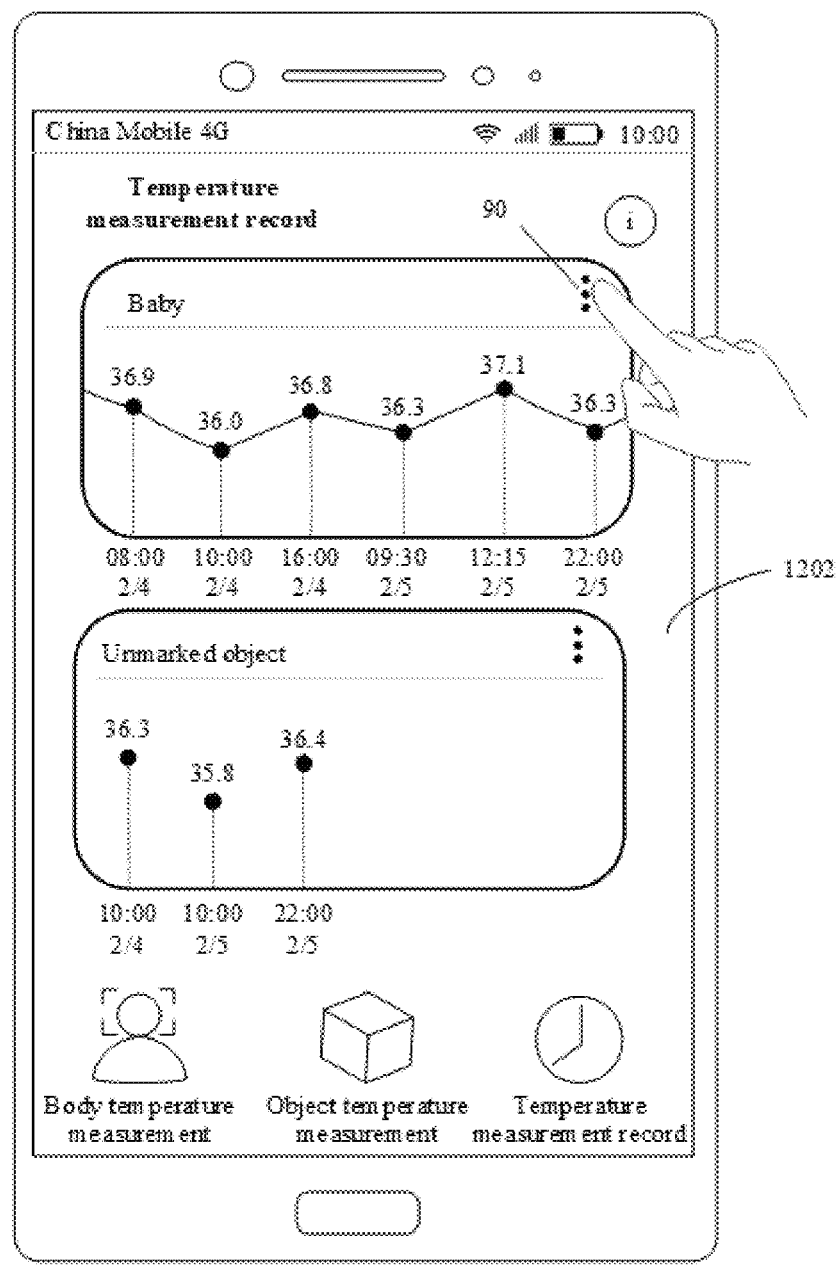
Figure 12C:
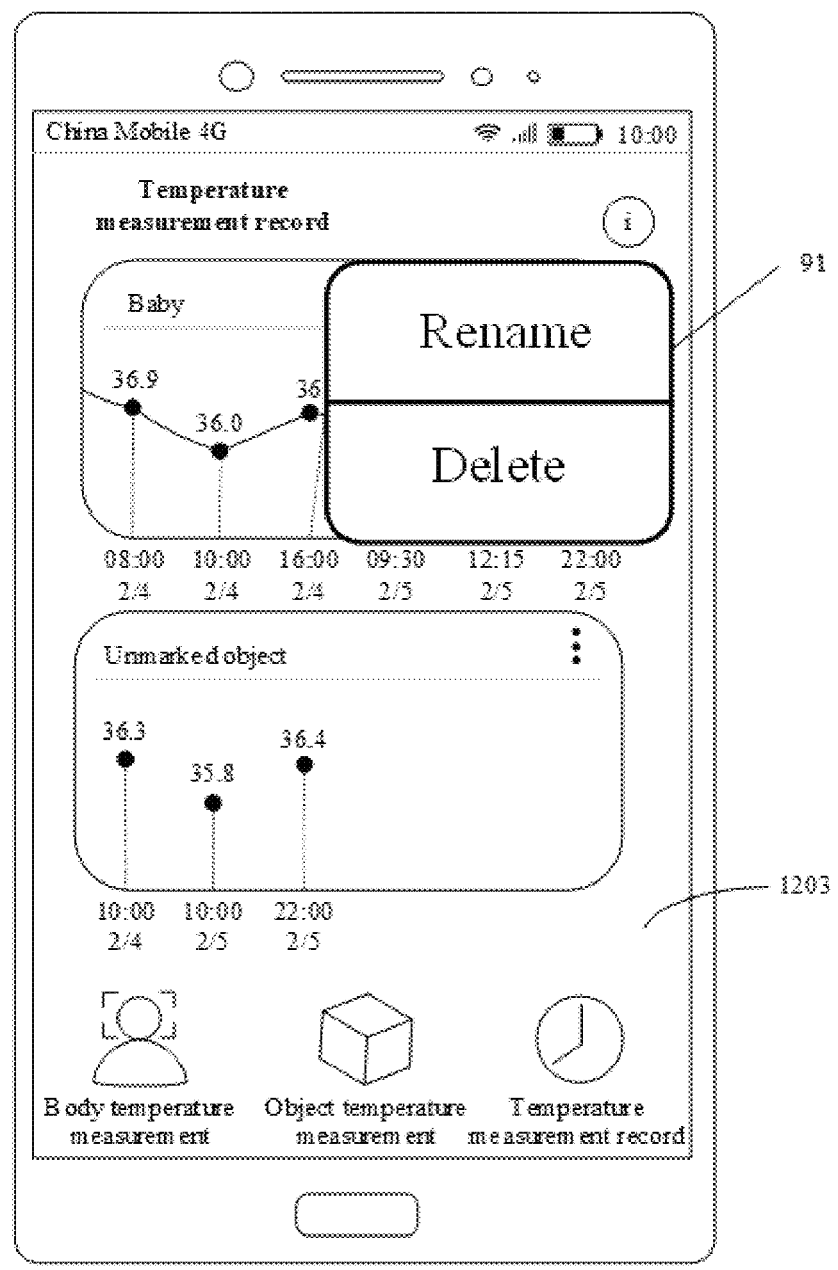

In a possible implementation, a temperature display area of each measured object on the temperature measurement record interface 1201 may include a button 90, and the user may perform a batch operation on temperature data of the measured object by tapping the button 90. For example, as shown in FIG. 12B, the user taps the button 90, and in response to the tapping operation of the user, an operation window 91 shown in FIG. 12C is displayed. The operation window may include a "Rename" option and a "Delete" option. The user may delete the temperature data of the measured object by tapping the "Delete" option. For example, as shown in FIG. 12C, the user taps the "Delete" option, and in response to the tapping operation of the user, a deletion confirmation window 92 is displayed in an interface 1204. The deletion confirmation window 92 may prompt the user with the following: Whether to delete all temperature measurement records of "Baby". The user can tap "Delete" to delete all the temperature measurement records of "Baby".

Figure 13A:
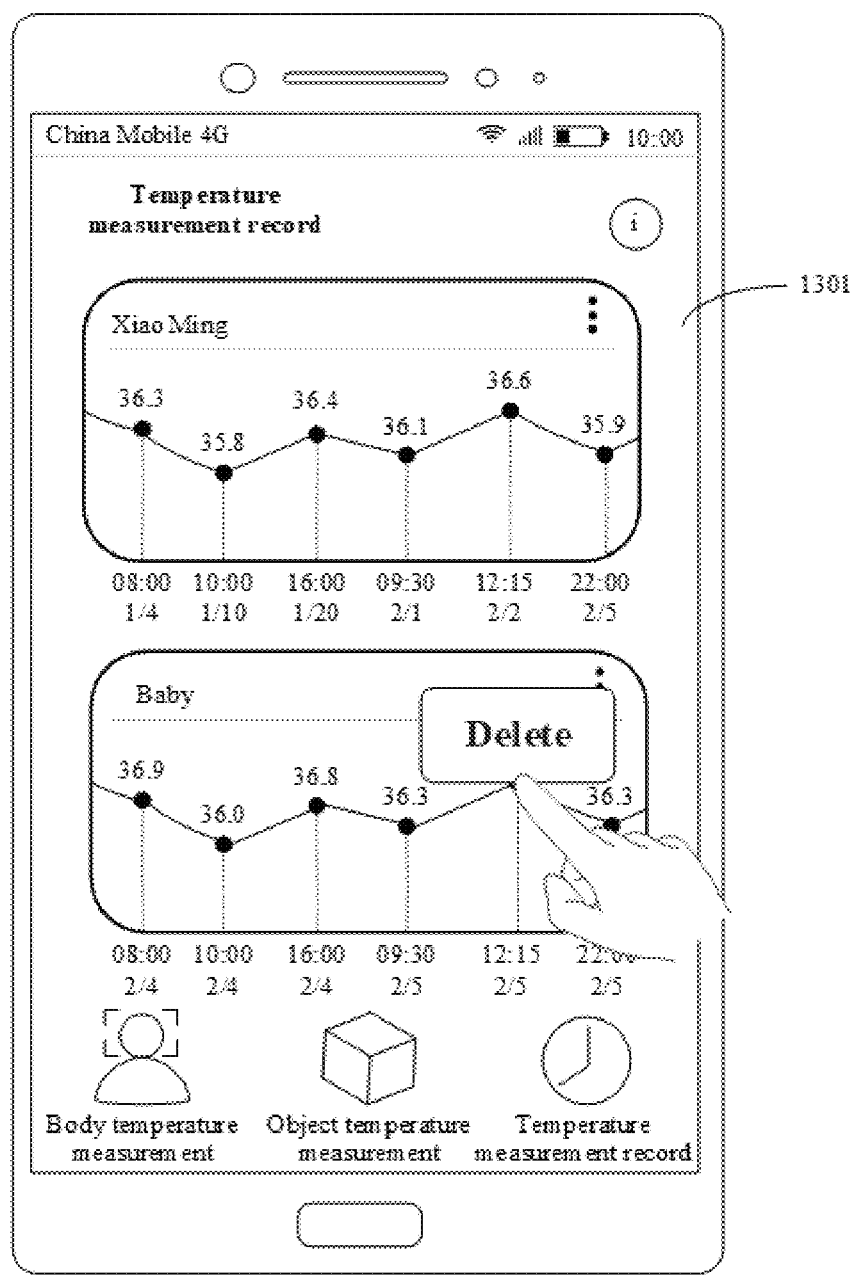
FIG. 13A and FIG. 13B are schematic diagrams of another temperature management interface according to an embodiment of this application.
Figure 13B:
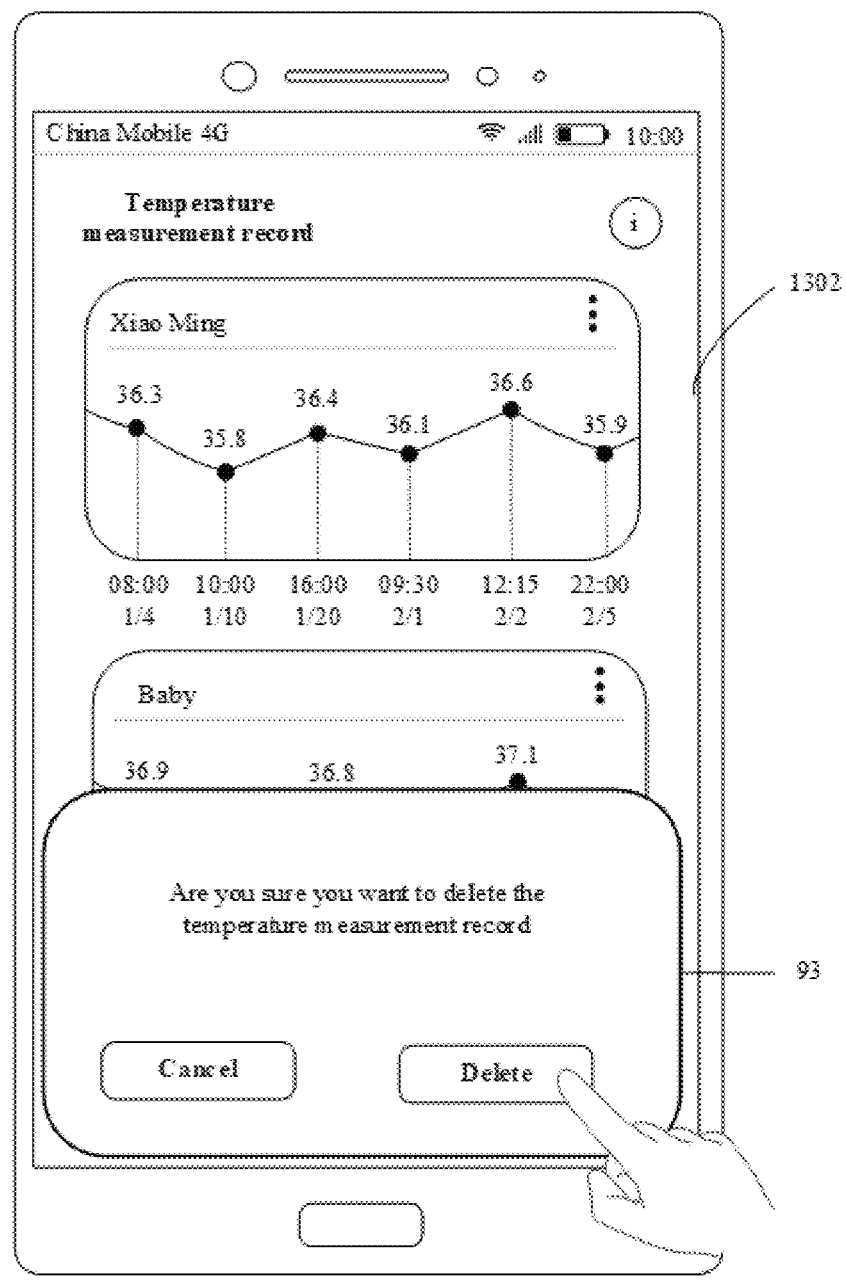

In another possible implementation, the user may delete one of the temperature measurement records of the measured object, and reserve other temperature measurement records. FIG. 13A and FIG. 13B are schematic diagrams of another temperature management interface according to an embodiment of this application. For example, an interface 1301 shown in FIG. 13A includes a temperature measurement record of "Baby". A user may tap or hold one temperature value, for example, a body temperature of "Baby" that is measured at 12:15 on February 5, on a temperature curve of "Baby", until a "Delete" option is displayed. The user then taps the "Delete" option, and in response to the tapping operation of the user, as shown in FIG. 13B, the mobile phone displays a deletion confirmation window 93 on an interface 1302. The deletion confirmation window 93 may prompt the user with the following: Whether to delete the temperature measurement record. The user may tap "Delete" to delete the temperature measurement record of "Baby" at 12:15 on February 5.

In conclusion, according to the temperature measurement method provided in this embodiment of this application, new thermometer software is designed based on an electronic device integrated with an infrared temperature sensor. The user may measure temperatures of different objects such as a human body, the object, and an animal by using the electronic device and the thermometer software. Temperature data is intelligently managed based on temperature measurement results of the different objects.

Specifically, before starting temperature measurement, the mobile phone may automatically calibrate the temperature based on the current ambient temperature, or start temperature calibration based on a selection of the user, to reduce impact of the ambient temperature on the temperature measurement result and to improve temperature measurement accuracy.

In a temperature measurement process, the user may select different temperature measurement modes based on a current requirement, for example, select a body temperature measurement mode or an object temperature measurement mode. For the different temperature measurement modes, the mobile phone may intelligently identify the current measured object, and perform temperature based on different parts of the current measured object, to improve temperature measurement accuracy.

After the temperature is measured, the user may record the temperature data of the different measured objects by using a thermometer application, and may associate the measured object with an address book user of the mobile phone, an object identified by a gallery, a fingerprint user, and the like, to manage the temperature data more intelligently. In addition, when the temperature measurement result is abnormal, for example, when it is determined, based on a high body temperature, that the measured object has a fever, the mobile phone may automatically recommend information such as a position and a phone number of a fever clinic to the user. Alternatively, the mobile phone may automatically connect to a cloud server, obtain a current phase current news even, and send a prompt message to the user, for example, an epidemic prevention measure and a precaution related to a fever.

Figure 14A:
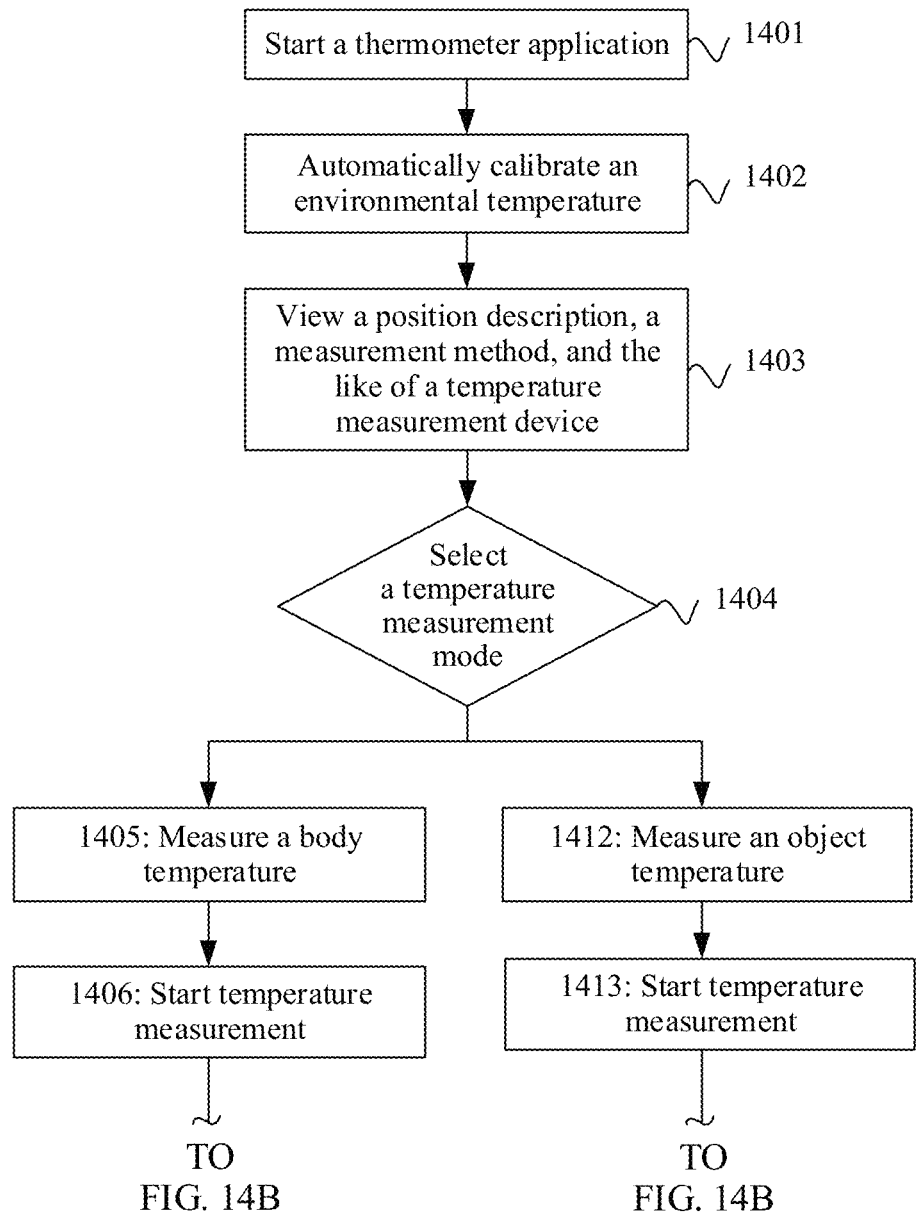
FIG. 14A and FIG. 14B are a schematic flowchart of a temperature measurement method according to an embodiment of this application.
Figure 14B:
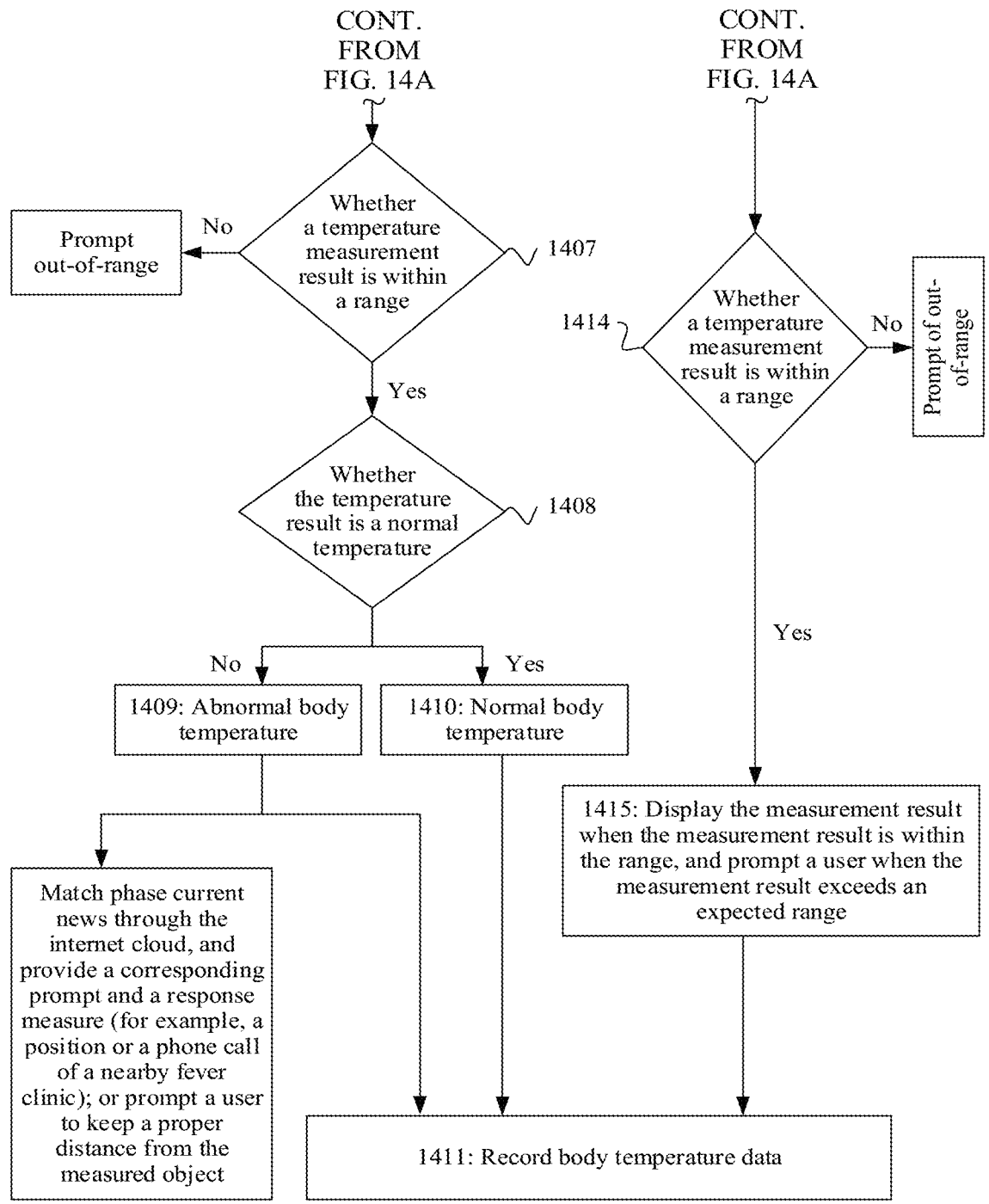

With reference to the foregoing embodiments and related accompanying drawings, the temperature measurement method is described from a user interaction layer. The following describes, from a software implementation policy layer with reference to FIG. 14A to FIG. 17, the temperature measurement method provided in this embodiment of this application. It should be understood that the method may be implemented in a structural electronic device (for example, a mobile phone or a tablet computer) that is shown in FIG. 1 and FIG. 4 and that has a touchscreen, an infrared temperature sensor, a camera assembly, and the like. FIG. 14A and FIG. 14B are a schematic flowchart of a temperature measurement method according to an embodiment of this application. As shown in FIG. 14A and FIG. 14B, the method may include the following steps.

Step 1401: Start a thermometer application.

Step 1402: Measure an ambient temperature, and perform calibration based on the ambient temperature.

It should be understood that a difference in the ambient temperature affects an energy value received by an infrared temperature sensor, and the energy value is reflected in a final temperature measurement result. In an automatic calibration process, the temperature of the environment in which the object is located may be automatically obtained before the temperature of the object is measured, and the infrared temperature sensor of the mobile phone is automatically calibrated based on the ambient temperature. In other words, the measured object temperature is corrected or temperature compensation is performed based on the ambient temperature, to reduce a temperature measurement error and improve temperature measurement accuracy.

Before the temperature is measured, the ambient temperature may be obtained, to calibrate the infrared temperature sensor based on an influence factor, for example, an ambient temperature of air or a temperature of the mobile phone body, to ensure temperature measurement accuracy. Alternatively, the obtained ambient temperature may be used as a parameter and participate in a subsequent process of determining or modifying the measured object temperature.

Optionally, there may be different calibration methods for different types of infrared temperature sensors, such as a thermocouple type, a thermoelectric pile type, a thermal resistance type, a photovoltaic effect type, and an optoelectronic effect type. This is not limited in this embodiment of this application.

Optionally, the calibration process of the step 1402 may be an automatic calibration process, for example, an automatic calibration process of the mobile phone after the thermometer application is started. Alternatively, the calibration process of the step 1402 may be a manual calibration process of the user. In the method described in FIG. 6A to FIG. 6D, the user taps a "Manually calibrate" button before temperature measurement, to start the calibration process of the mobile phone. This is not limited in this embodiment of this application.

Step 1403: The user views a position description, a measurement method, and the like of a temperature measurement device.

For example, in the method described in FIG. 5A to FIG. 5D, when the user runs the thermometer application for the first time after installing the thermometer application, a temperature measurement method and a temperature measurement precaution may be displayed in an interface. Alternatively, after the user installs the thermometer application, when the user starts the thermometer application not for the first time, the user may view a temperature measurement precaution in another manner. For example, the user may view the temperature measurement precaution by tapping another button in the interface. This step is an optional step.

Step 1404: The user selects a temperature measurement mode.

It should be understood that in this embodiment of this application, the thermometer application may include different temperature measurement modes, for example, a body temperature measurement mode and an object temperature measurement mode. Alternatively, more temperature measurement modes, such as a pet temperature measurement mode, an adult male temperature measurement mode, and an adult female temperature measurement mode, may be obtained through classification in a plurality of manners such as a measured object, a gender, and an age. Alternatively, a targeted temperature measurement mode may be set based on a physiological status such as whether a female is in a physiological period or whether a female is in a pregnancy period. A quantity and types of temperature measurement modes are not limited in this embodiment of this application. The following uses the body temperature measurement mode and the body temperature measurement mode as examples for description.

If the user selects the body temperature measurement mode as the temperature measurement mode, the following steps 1405 to 1411 are performed. Step 1405: The user selects the body temperature measurement mode as the current temperature measurement mode.

Step 1406: Start temperature measurement.

Optionally, before the temperature measurement is started, a mobile phone interface may display one or more prompt windows, in which different prompt content is displayed, for example, the following: Place the infrared temperature sensor 2 cm to 4 cm away from the measured object, tap "Measure", and hold the device steady until the device vibrates" shown in FIG. 7A to FIG. 7C. According to the prompt content displayed in the interface, the user can perform an operation of tapping a "Measure" button, to start the temperature measurement.

For example, the temperature measurement may be performed according to a principle of a formula (1) of the Stefan-Boltzmann law listed below.

$$M_b = \sigma T^4 \quad (1)$$

$M_b$ is total energy radiated from a surface of the measured object per unit area within a unit time, and is also referred to as radiosity or an energy flux density of the object. $\sigma$ represents a Stefan-Boltzmann law constant, $5.67 \times 10^{-8}$.

It should be understood that the Stefan-Boltzmann law is a well-known law in thermodynamics. Any object with a specific temperature radiates heat in a form of an electromagnetic wave, and a magnitude of radiated energy is directly related to the temperature of the object. The energy radiated by the object is proportional to a fourth power of a thermodynamic temperature T (also referred to as an absolute temperature) of the object.

Compared with a conventional process of determining the temperature of the measured object, in this embodiment of this application, the measured temperature may be corrected based on a type of the measured object, a current temperature measurement environment, and the like.

Optionally, in a human body temperature measurement process, a human rectum temperature or a brain sphere temperature is called as a core temperature, namely, a human standard temperature in the medical field or the scientific research field. In the measurement process, an easy-to-obtain temperature of a forehead, an oral cavity, a carotid artery, and a wrist is taken as the body temperature, which is different from the core temperature of the human body. To obtain a more accurate temperature, in this embodiment of this application, different temperature algorithm models or temperature correction algorithms are matched based on the currently measured human forehead, the oral cavity, the carotid artery, the wrist, or the like, to determine the core temperature of the human. The core temperature is displayed in the temperature measurement interface as the measurement result, to provide a temperature value for the user to more accurately monitor a health status.

In a possible implementation, in a temperature measurement process, after obtaining the temperature measured by the infrared temperature sensor, the mobile phone may correct, based on different measured objects or measurement scenarios, the temperature obtained by the infrared temperature sensor, to obtain a final measurement result. In other words, the different measurement scenarios may correspond to different error correction algorithms.

The temperature obtained by the infrared temperature sensor may be corrected based on an epsilon $\varepsilon_h$ determined by using the following formula (2):

$$\varepsilon_h = \frac{M(T)}{M_b(T)} \quad (2)$$

M(T) is used to represent total radiant existence of the measured object at the temperature T. $M_b(T)$ is used to represent total radiant existence of a black body at the temperature T.

It should be understood that, if the black body is an ideal object and an epsilon of the black body is 1, for different measured objects, energy of the measured object is corrected based on different epsilons. The following Table 2 lists epsilons of several measured objects. For the different measured objects, an actual temperature of the measured object at the temperature T may be corrected based on an epsilon of the detected object. This correction process is not limited in this embodiment of this application.

TABLE 2

| Measured object | Epsilon |
| --- | --- |
| Timber | 0.94 |
| Glass | 0.94 |
| Cotton | 0.77 |
| Steel and other metal | 0.52 |
| Black body | 1 |
| Person | 0.95 |
| ... | ... |

According to the foregoing solution, in a process of obtaining the measurement result, the measured object is intelligently detected and identified, for example, the measured object is identified as a person or an object, and different temperature algorithm models or temperature correction algorithms are matched based on the identified measured object. Alternatively, the measurement result may be corrected based on the ambient temperature, to more accurately determine the temperature of the measured object, and to improve temperature measurement accuracy.

In addition to the foregoing, in a possible implementation, different age ranges may be set in the thermometer application, and before starting temperature measurement, the user may select a corresponding age range. For example, different age ranges are divided for measured objects being a baby or an infant, a teenager, a middle-aged person, and an elderly person. As shown in Table 3, before starting temperature measurement, the user may select different age ranges. It should be understood that average body temperatures of people in the different age ranges are different to some extent. For example, a body temperature of a person in adolescence may be higher than a body temperature of a person in old age. The different age ranges are set, to avoid incorrect measurement or incorrect determining, so that system determining is more accurate.

TABLE 3

| Measured object | Age range division |
| --- | --- |
| Baby or infant | 0 to 6 years old |
| Teenager | 6 to 18 years old |
| Middle-aged person | 18 to 50 years old |
| Elderly person | Over 50 years old |

Optionally, different physiological statuses may be further set in the thermometer application, such as whether a female is in a physiological period and whether a female is in a pregnancy period. Therefore, before starting temperature measurement, the user may select a corresponding physiological status, to perform body temperature measurement accordingly.

Alternatively, the thermometer application may obtain a current time point of the mobile phone. For example, a body temperature of a person in a noon time period (12:00-16:00) may be higher than that in a morning time period (06:00-12:00). Therefore, before the user starts temperature measurement, the thermometer application performs temperature measurement based on a current temperature measurement time period, for example, each temperature measurement period may correspond to a different temperature correction process, to more accurately monitor the body temperature and monitor the health status of the person.

After the user starts temperature measurement, the mobile phone may detect a distance between the mobile phone and the measured object in real time in a plurality of manners. If the distance exceeds a proper measurement range (for example, from 2 cm to 4 cm), the mobile phone displays a prompt as shown in FIG. 9C, to indicate that the distance is too long.

In this embodiment of this application, the mobile phone may detect the distance between the infrared temperature sensor and the measured object in a plurality of manners.

Optionally, the mobile phone may detect the distance between the mobile phone and the measured object by using a distance sensor 180F. Alternatively, when a camera assembly 10 of the mobile phone includes a TOF lens, the mobile phone may detect the distance between the mobile phone and the measured object based on depth-of-field data collected by the TOF lens. Alternatively, when the camera assembly 10 of the mobile phone includes a dual-lens device, the mobile phone may detect the distance between the mobile phone and the measured object based on depth-of-field data collected by the dual-lens device. This is not limited in this embodiment of this application.

In some embodiments, the mobile phone may assist in determining a position of the mobile phone by using various sensors, or an orientation of the mobile phone held by the user, and prompt the user with an optimal measurement position in real time. This is not limited in this embodiment of this application.

For example, an angular velocity of the mobile phone around three axes (namely, an x-axis, a y-axis, and a z-axis) may be determined by using the gyro sensor 180B. The gyro sensor 180B may be configured to perform image stabilization during photographing. When the user measures the temperature, if the orientation of the mobile phone held by the user is not conducive to measurement, the mobile phone may prompt the user with "Please horizontally hold the mobile phone" or the like.

Optionally, when the user starts a temperature measurement process, when a system invokes an infrared temperature sensor to measure the temperature, the camera assembly 10 may be invoked at the same time, and the camera assembly 10 may obtain image information of the current measured object. It should be understood that a camera that is used to obtain the image information of the current measured object in the camera assembly 10 is not limited in this embodiment of this application. For example, a macro lens or a long-focus camera may be used. A manner of converting between cameras is not limited in this embodiment of this application.

Optionally, if the mobile phone identifies the measured object as a human body, the mobile phone may further identify a human body part, for example, a forehead, a wrist, an armpit, and an oral cavity. For the different detection parts, the temperature obtained by the infrared temperature sensor is corrected to obtain a final measurement result.

For example, a temperature below 37.5° C. is normal for an oral cavity of a person, and a temperature from 36° C. to 37° C. is normal for an armpit. Different algorithms are used for correction based on the identified human body measurement parts. Different temperature correction algorithms are used for measuring the oral cavity temperature and measuring the armpit temperature, to ensure temperature data accuracy during measurement of the different parts.

Alternatively, normal temperature ranges corresponding to the different parts are adjusted. For example, the oral cavity temperature 37.5° C. is a normal temperature, and the armpit temperature 37.5° C. may be determined as a low fever temperature.

Alternatively, if the measured object is identified as an animal, the animal is further identified as a warm-blooded animal or a cold-blooded animal. The temperature obtained by the infrared temperature sensor is modified to different degrees for the warm-blooded animal or the cold-blooded animal, to obtain a final measurement result. Alternatively, normal temperature ranges corresponding to the warm-blooded animal and the cold-blooded animal are adjusted to display different measurement results.

Step 1407: After temperature measurement is completed, determine whether the measurement result is within a preset body temperature range. When the measurement result is not within the preset body temperature range, the mobile phone may display a prompt message, to prompt the user that the current measurement result is not within the body temperature range.

In a possible implementation, when a mode currently selected by the user is a body temperature measurement mode, a temperature range that can be measured by a system is 35.0° C. to 42.0° C. by default. When a temperature range measured by the mobile phone is less than 35.0° C. or greater than 42.0° C., in other words, when a current temperature is not within the temperature range of the body temperature measurement mode, as shown in FIG. 9A, the mobile phone may display a prompt message on a temperature measurement interface 901, to prompt the user with "The temperature is not within the body temperature range. Please measure temperature again". The user may tap "Measure" again according to the prompt.

Step 1408: When the measurement result is within the body temperature range, display the measurement result, and determine whether the measurement result is a normal body temperature.

Step 1409: When the system determines that the current measurement result is an abnormal body temperature, prompt the user, or match phase current news through the internet cloud, and provide a corresponding prompt and a response measure, for example, a position or a phone call of a nearby fever clinic, or prompt the user to keep a proper distance from the measured object.

In a possible implementation, the system may set the temperature interval shown in Table 1, or the user manually enters a set temperature interval. When the temperature measurement is correctly performed and the body temperature is accurately measured, the system can determine a health status of the user based on a temperature measurement result and send a prompt. Optionally, the system may determine the health status of the user based on the body temperature interval in Table 1, and prompt the user with the current health status by displaying different colors.

For example, as shown in FIG. 9D, if the current temperature measurement result is 39.5° C., the system determines that the measured object is in a high fever state, and may display the temperature measurement result in red, and prompt the user with "High temperature, high fever symptom". Optionally, the mobile phone may automatically connect to a cloud server, obtain a current phase current news event, and send a prompt message to the user, for example, an epidemic prevention measure and a precaution related to a fever.

In another possible implementation, the user may also record the abnormal body temperature.

Steps 1410-1411: When the system determines that the current measurement result is the normal body temperature, the user may record the normal body temperature, to implement classification and marking of body temperature data.

If the user selects the object temperature measurement mode as the temperature measurement mode, the following steps 1412 to 1415 and a step 1411 are performed.

Step 1412: The user selects the object temperature measurement mode as the current temperature measurement mode.

Step 1413: Start temperature measurement. For a specific process, refer to the step 1406. Details are not described herein again.

Step 1414: After temperature measurement is completed, determine whether a measurement result is within a preset range. When the measurement result is not within the preset body temperature range, the mobile phone may display a prompt message, to prompt the user that the current measurement result is not within the body temperature range.

Step 1415. Display the measurement result when the measurement result is within the preset temperature range, and display a prompt message when the measurement result exceeds an expected range, to prompt the user that the temperature of the measured object has exceeded the expected temperature range.

Optionally, the user may manually set the temperature range of the object. If the measurement result exceeds the expected temperature range set by the user, the prompt message is displayed to prompt the user that the temperature of the measured object exceeds the expected temperature range.

Step 1411: The user may record the temperature of the measured object, to implement classification, marking, and the like of object temperature data. In other words, the user can mark and save the measurement result, for both of the body temperature and the object temperature.

For example, for a process of recording the temperature measurement result in the step 1410, refer to the schematic diagrams in FIG. 7A to FIG. 8D. Measure results of different users are stored. Details are not described herein again. Specifically, for a process of classifying and marking the temperature data in the step 1410, refer to a subsequent diagram in FIG. 16 and related descriptions.

It should be understood that the method 1400 described above includes a plurality of steps. An actual temperature measurement process may include all or some of the steps described above. A temperature measurement method including all or some of the steps described above falls within the protection scope of this application. This is not limited in this embodiment of this application.

By using the above method, the temperature measurement function of the mobile phone can be used to quickly and safely measure the body temperature of the different objects such as the infant, the elderly people, and the pet anytime and anywhere. In the temperature measurement process, the temperature sensor does not need to contact the measured object. This makes the temperature measurement process more sanitary and safer. In addition, because the electronic device is portable and movable, temperatures of a human body and an object can be measured anytime and anywhere, and measurement results can be classified, recorded, intelligently matched, viewed, and managed, to avoid a trouble of carrying a plurality of devices by the user, and to improve user experience.

Figure 15A:
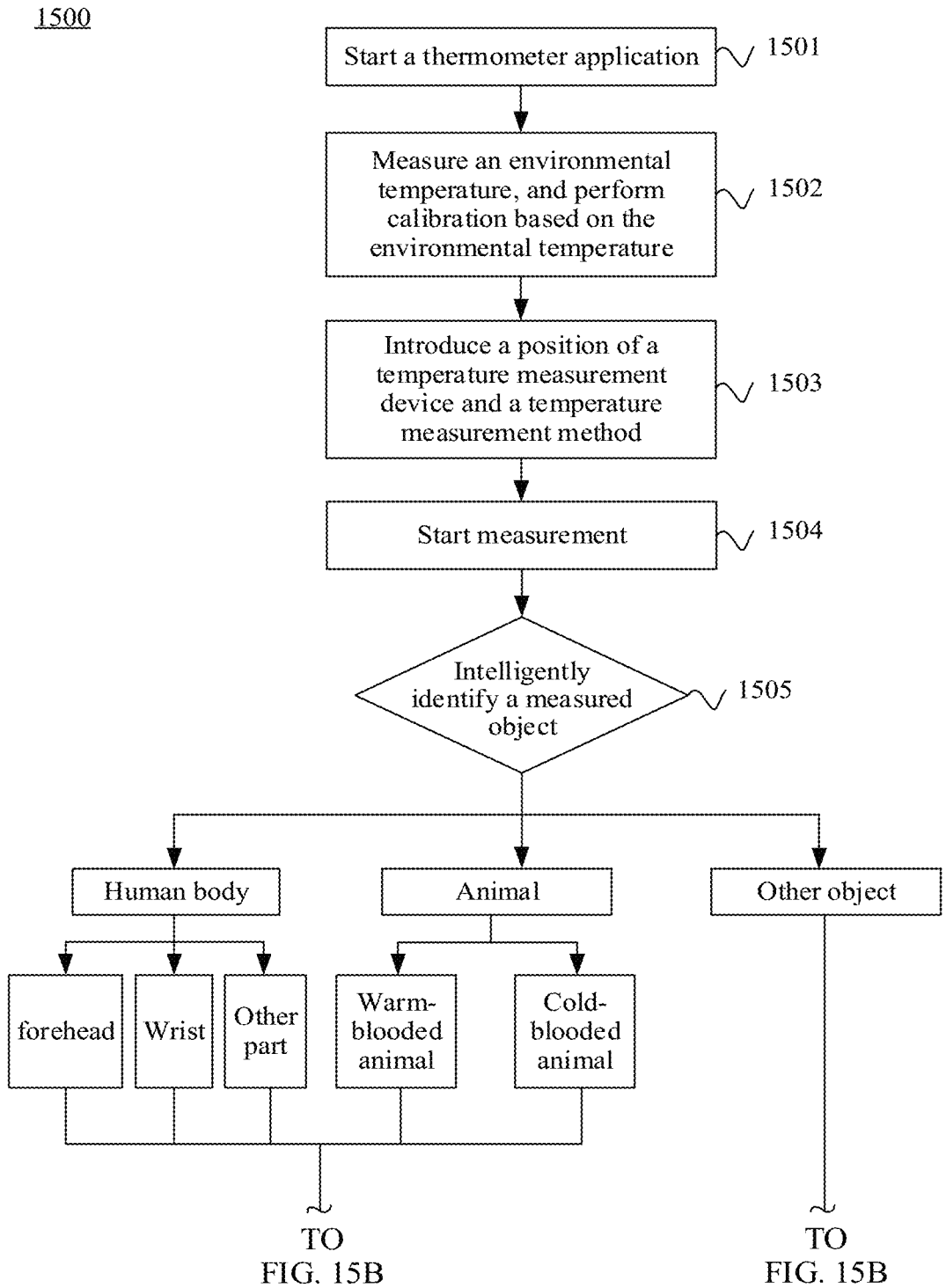
FIG. 15A and FIG. 15B are a schematic flowchart of another temperature measurement method according to an embodiment of this application.
Figure 15B:
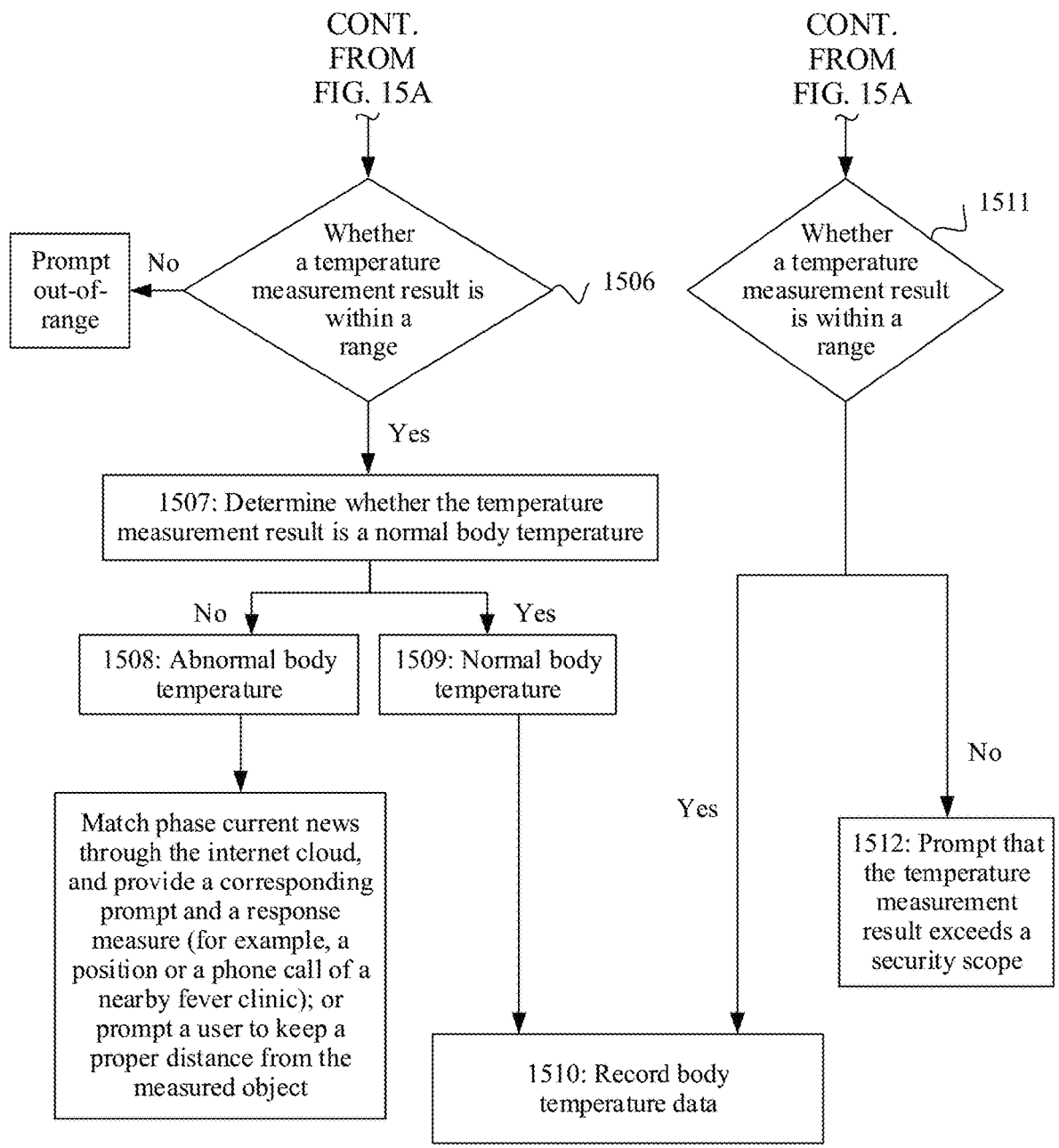

FIG. 15A and FIG. 15B are a schematic flowchart of another temperature measurement method according to an embodiment of this application. As shown in FIG. 15A and FIG. 15B, the method may include the following steps.

Step 1501: Start a thermometer application.

Step 1502: Measure an ambient temperature, and perform calibration based on the ambient temperature.

Step 1503: The user views a position description, a measurement method, and the like of a temperature measurement device.

For the steps 1501 to 1503, correspondingly refer to the steps 1401 to 1403 in the method 1400. Details are not described herein again.

Step 1504: The user starts measurement.

Step 1505: The mobile phone intelligently identifies a measured object.

It should be understood that the mobile phone may first intelligently identify the measured object, and determine a type of the measured object, such as a human body, an animal, or another object. Alternatively, when the mobile-phone intelligently identifies the measured object, identified object types of the measured object may include a solid object, a liquid object, a gas object, and the like. This is not limited in this embodiment of this application.

It should be further understood that the technology for intelligently identifying the measured object may perform intelligent identification based on an image obtained by the camera assembly 10 of the mobile phone. This is not limited in this embodiment of this application.

Specifically, in a process of intelligently identifying the measured object, verification may be performed by using different methods such as existing deep learning, an AI identification technology, and an algorithm model trained by using neural network big data. The process of identifying the measured object is not limited in this embodiment of this application.

In a possible implementation, when the user starts a temperature measurement process, when a system invokes an infrared temperature sensor to measure the temperature, the camera assembly 10 may be invoked at the same time, and the camera assembly 10 may obtain image information of the current measured object.

It should be understood that a camera that is used to obtain the image information of the current measured object in the camera assembly 10 is not limited in this embodiment of this application. For example, a wide-angle camera, a macro lens, or a long-focus camera may be used. A manner of converting between cameras is not limited in this embodiment of this application.

Optionally, any one or more cameras in the camera assembly 10 may obtain image information of the current measured object in a background. In other words, a temperature measurement interface of the mobile phone does not display a preview image that is of the measured object and that is obtained by the camera.

Alternatively, any one or more cameras in the camera assembly 10 may obtain image information of the current measured object in a foreground. All or some of areas on a temperature measurement interface of the mobile phone may be used to display a preview image that is of the measured object and that is obtained by the camera. The user may disable the preview image, or zoom in on the preview image displayed in an area to a full screen for display. Alternatively, the user may take a photo of the measured object and save the photo to a local album. This is not limited in this embodiment of this application. For example, as shown in FIG. 11A to FIG. 11D, the user may invoke the camera assembly 10 of the mobile phone to identify the measured object and measure temperature.

In a possible implementation, if the mobile phone identifies the measured object as a human body, the mobile phone may further identify a human body part, for example, a forehead, a wrist, a tongue, and an armpit. If the mobile phone identifies the measured object as an animal, the mobile phone may further identify the animal as a warm-blooded animal or a cold-blooded animal.

Optionally, if the mobile phone identifies the measured object as a human body, the mobile phone may further identify a human body part, for example, a forehead, a wrist, an armpit, and an oral cavity. For the different detection parts, the temperature obtained by the infrared temperature sensor is corrected to obtain a final measurement result.

For example, a temperature below 37.5° C. is normal for an oral cavity of a person, and a temperature from 36° C. to 37° C. is normal for an armpit. Different algorithms are used for correction based on the identified human body measurement parts. Different temperature correction algorithms are used for measuring the oral cavity temperature and measuring the armpit temperature, to ensure temperature data accuracy during measurement of the different parts.

Alternatively, normal temperature ranges corresponding to the different parts are adjusted. For example, the oral cavity temperature 37.5° C. is a normal temperature, and the armpit temperature 37.5° C. may be determined as a low fever temperature.

Alternatively, if the measured object is identified as an animal, the animal is further identified as a warm-blooded animal or a cold-blooded animal. The temperature obtained by the infrared temperature sensor is modified to different degrees for the warm-blooded animal or the cold-blooded animal, to obtain a final measurement result. Alternatively, normal temperature ranges corresponding to the warm-blooded animal and the cold-blooded animal are adjusted to display different measurement results. For a specific process of determining the temperature measurement result, refer to the step 1406 in FIG. 14A. Details are not described herein again.

Specifically, compared with a conventional process of determining the temperature of the measured object, in this embodiment of this application, the measured temperature may be corrected based on a type of the measured object, a current temperature measurement environment, and the like. For example, the temperature obtained by the infrared temperature sensor may be corrected based on the epsilon $\varepsilon_h$ determined by using the formula (2). Details are not described herein.

In this implementation, for the identified human body, the specific measured part such as the forehead, the wrist, the carotid artery, or the oral cavity may be further identified. For the identified animal, the animal may be further determined as the warm-blooded animal or the cold-blooded animal. For another object, a liquid object, a solid object, a gas object and the like may be distinguished. For the identified type and part of the measured object, different temperature algorithm models or temperature correction algorithms may be matched, or the measurement result may be corrected based on an ambient temperature, to improve temperature measurement accuracy.

According to the foregoing solution, in a process of obtaining the measurement result, the measured object is intelligently detected and identified, for example, the measured object is identified as a person or an object, and different temperature algorithm models or temperature correction algorithms are matched based on the identified measured object. Alternatively, the measurement result may be corrected based on the ambient temperature, to more accurately determine the temperature of the measured object, and to improve temperature measurement accuracy.

Step 1506: Return a measurement result after the temperature measurement is completed, and first determine, based on the different identified objects and the measurement result, whether the measurement result is within a preset range.

It should be understood that different temperature intervals may be set for the different measured objects that are identified. For example, a temperature interval of the human body is from 25° C. to 42° C., a temperature interval of the warm-blooded animal is from 35° C. to 45° C., and a temperature range of the cold-blooded animal is from −10° C. to +45° C. This is not limited in this embodiment of this application.

Step 1507: When the identified measured object is a person or an animal, determine whether the temperature measurement result is a normal body temperature.

Step 1508: When the system determines that the current measurement result is an abnormal body temperature, prompt the user, or match phase current news through the internet cloud, and provide a corresponding prompt and a response measure, for example, a position or a phone call of a nearby fever clinic, or prompt the user to keep a proper distance from the measured object.

Step 1509: When the measurement result is the normal body temperature, display the measurement result.

Step 1510: The user may record the normal body temperature, to implement classification and marking of body temperature data.

Optionally, for the returned body temperature result, whether a body temperature value is the normal body temperature may be determined based on an age of the object that is intelligently identified. If the measurement result is within the normal range and is the normal temperature, the result is displayed directly. If the measurement result is within the body temperature range and is the abnormal temperature, the result is displayed, and the cloud is connected to match the phase current news and provide the corresponding prompt and the response measure. For example, for a specific process, refer to FIG. 9D to FIG. 9H. Details are not described herein again.

Step 1511: When the identified measured object is another object, return a measurement result after the temperature measurement is completed, and first determine, based on the identified different objects and the measurement result, whether the measurement result is within a preset range.

Step 1510: When the system determines that the current measurement result is within the preset range, the user may record the measured object temperature, to implement classification, marking, and the like of the object temperature data.

Figure 16:
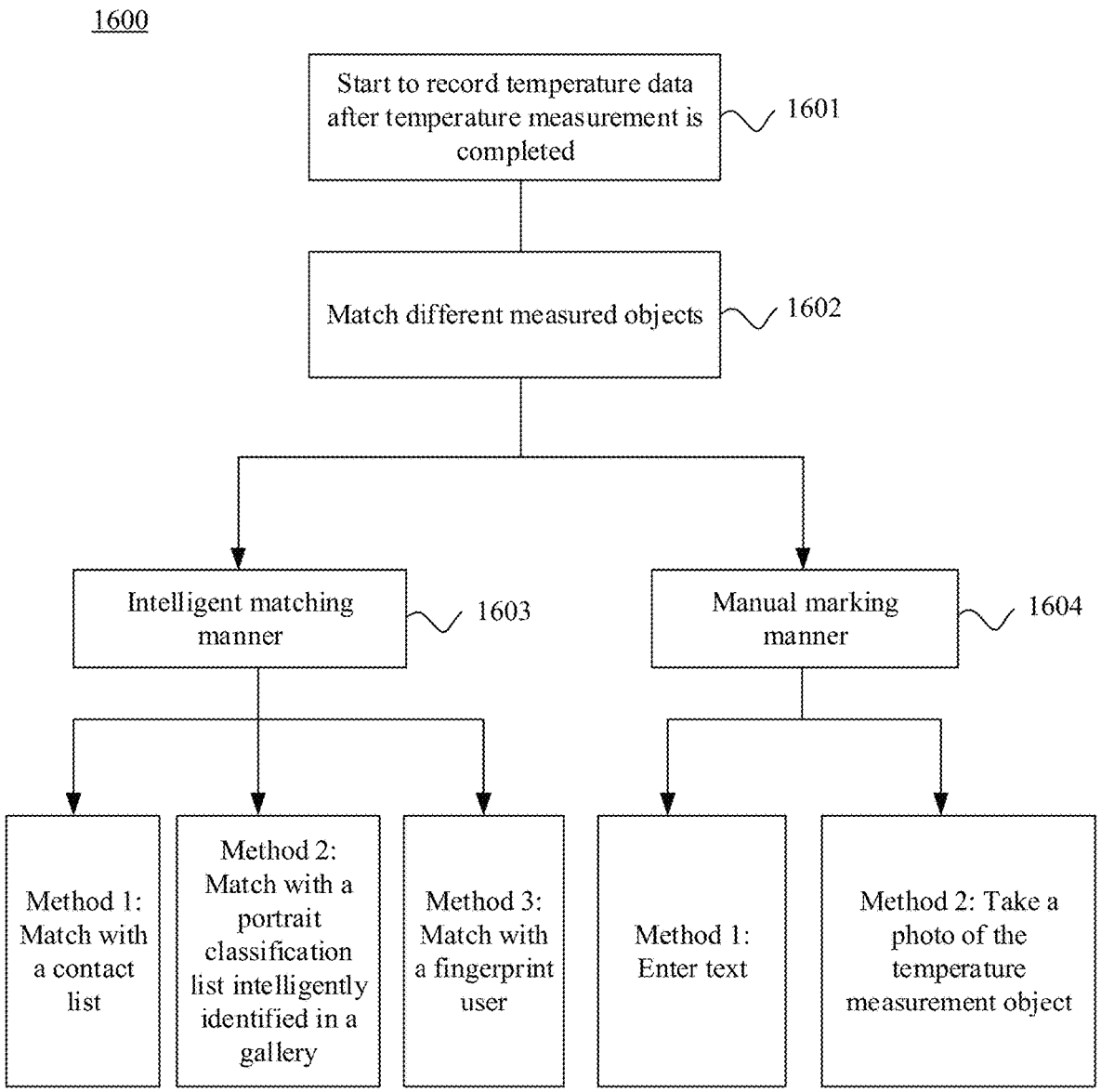
FIG. 16 is a schematic flowchart of recording temperature data according to an embodiment of this application.

It should be understood that, for a process of classifying and marking the temperature data in the step 1510, refer to a subsequent diagram in FIG. 16 and related descriptions.

Step 1512: When the system determines that the current measurement result is not within the preset range, prompt the user that the current measurement result is beyond a safety range.

Optionally, if the measurement result is within the preset range and a value is abnormal, for example, the value exceeds the safety range, an abnormal prompt may be given. It should be understood that the safety range is intelligently matched based on the object that is intelligently identified, and does not need to be manually set by the user. The safety range may be used for data management, for example, safety and health management, an anti-freezing injury prompt, and an anti-scalding prompt. This is not limited in this embodiment of this application.

It should be understood that the measurement result may be marked and stored for the body temperature, the animal temperature, or the object temperature.

It should be further understood that the method 1500 described above includes a plurality of steps. An actual temperature measurement process may include all or some of the steps described above. A temperature measurement method including all or some of the steps described above falls within the protection scope of this application. This is not limited in this embodiment of this application.

According to the foregoing method, by using a temperature measurement function and an intelligent identification function of the mobile phone, the different measured objects that are identified, for example, the identified body measurement part, the human body, or the animal, may correspond to the different temperature correction algorithms. The measured temperature data is corrected by using the different temperature correction algorithms. This ensures measured temperature data accuracy of the different parts of the measured object or the different types of measured objects. Alternatively, the normal temperature intervals corresponding to the different parts or the normal temperature intervals corresponding to the different types of measured objects may be adjusted, to improve accuracy of health monitoring and improve user experience.

According to the temperature measurement methods described in FIG. 14A to FIG. 15B, after temperature measurement is completed, temperature data may be recorded. FIG. 16 is a schematic flowchart of recording temperature data according to an embodiment of this application. As shown in FIG. 16, a method 1600 may include the following steps.

Step 1601: Start to record temperature data after temperature measurement is completed.

Step 1602: Match different measured objects.

Step 1603: The user may record temperature data in an intelligent matching manner.

Step 1604: The user may record temperature data in a manual marking manner.

It should be understood that, for a measurement result, there may be two matching manners when the measurement result is stored, which are an intelligent matching manner and a manual marking manner. In the intelligent matching manner, the measurement result may be specifically matched with an existing database in a mobile phone, for example, the following methods.

Method 1: Match the measurement result with a contact list on the mobile phone.

Optionally, as shown in FIG. 7D, the predicted object name including "Xiao Ming" in the temperature record window 50 is associated with the address book list of the mobile phone, the predicted object name may display one or more contacts in the address book list of the mobile phone, and the user selects the current measured object from the contacts, for example, taps "Xiao Ming" to save the temperature information to "Xiao Ming". Optionally, after the temperature information is saved, the recorded temperature information may be viewed in contact information of "Xiao Ming" in the address book.

Alternatively, the predicted object name "Xiao Ming" displayed in the temperature record window 50 is displayed to the user after the mobile phone performs screening and matching from the address book. Specifically, if a profile picture of "Xiao Ming" that is stored in the address book is used as a contact profile picture, after the temperature is measured, the mobile phone obtains facial information of the measured object and the like by using a camera component 10 (for example, a wide-angle camera or a macro lens), compares the facial information, and matches the profile picture of "Xiao Ming", to determine that the current measured object is "Xiao Ming". "Xiao Ming" is displayed in the temperature record window 50. The user can tap "OK" to save current temperature information in the information of "Xiao Ming". In this process, the user does not need to select the current measured object from the plurality of contacts, and the measured object is automatically matched for the user. The process is simple and facilitates user operations.

Alternatively, the user goes to the address book list of the mobile phone through a jump link in the temperature record window 50, so that the user selects the current measured object. After finding "Xiao Ming", the user may select "Xiao Ming" and store current temperature information. This is not limited in this embodiment of this application. Method 2: Match the measurement result with a portrait classification list intelligently identified in a gallery of the mobile phone. Optionally, the predicted object name "Xiao Ming" displayed in the temperature record window is an object in a portrait classification in a local album of the mobile phone, and a system performs screening and matching from a plurality of portrait objects, and then displays "Xiao Ming" to the user. Specifically, if a portrait album of "Xiao Ming" is established in the local album, after the temperature is measured, the mobile phone obtains facial information of the measured object by using a camera component 10 (for example, a wide-angle camera or a macro lens), compares the facial information, and matches a portrait of "Xiao Ming", to determine that the measured object is "Xiao Ming". "Xiao Ming" is displayed in the temperature record window 50. The user can tap "OK" to save current temperature information in the information of "Xiao Ming". In this process, the user does not need to select or enter the current measured object, and the measured object is automatically matched for the user. The process is simple and facilitates user operations.

Alternatively, the user goes to an album list of the mobile phone through a jump link in the temperature record window, so that the user selects a photo of "Xiao Ming". The photo of "Xiao Ming" may be selected and the current temperature information may be stored. This is not limited in this embodiment of this application.

Method 3: Match the measurement result with a fingerprint user that has been established by the mobile phone.

Specifically, the predicted object name displayed in the temperature record window may be associated with the fingerprint user established by the mobile phone. For example, after temperature measurement is completed, the measured object may enter fingerprint information in a fingerprint identification module of the mobile phone, so that the temperature measurement result may be directly associated with the established fingerprint user. This is not limited in this embodiment of this application.

In the manual marking manner, matching may be specifically performed based on input of the user, for example, the following methods.

Method 1: The user manually enters and saves a text. For example, in the operations shown in FIG. 7A to FIG. 8D, the user enters "Baby" and "Xiao Ming", to separately save corresponding temperature information.

Figure 17:
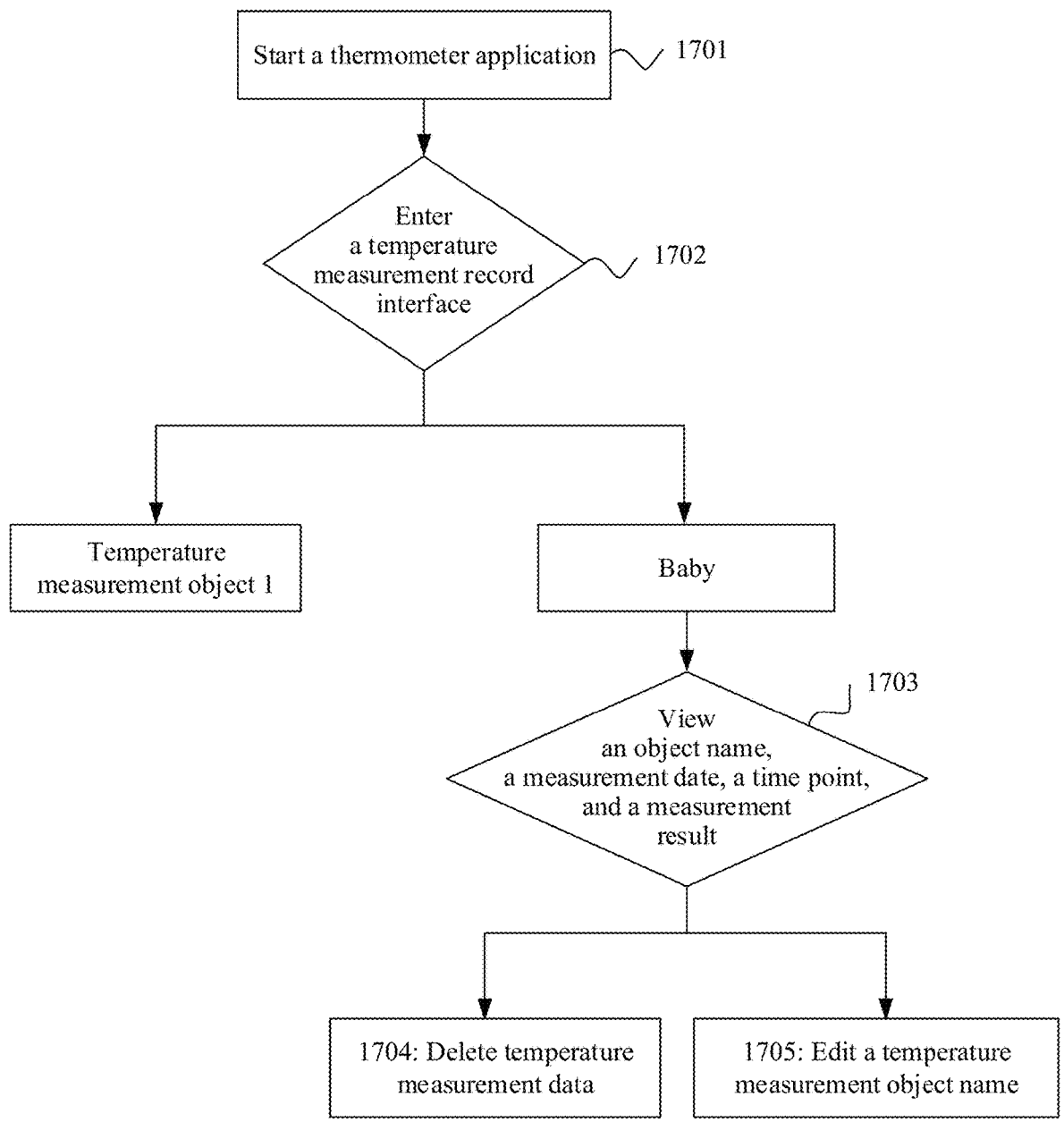
FIG. 17 is a schematic flowchart of managing temperature data according to an embodiment of this application.

Method 2: The user takes a photo of the measured object, and marks and saves data and the photo of the measured object. For example, in the operation shown in FIG. 11A to FIG. 11D, the user takes a photo of the current measured object, namely, beer, and saves temperature information of the beer. In addition, for the temperature data of the different measured objects that has been stored, the user may intelligently manage the temperature data, for example, view the temperature data at any time, and classify, delete, and edit the temperature data. FIG. 17 is a schematic flowchart of managing temperature data according to an embodiment of this application. As shown in FIG. 17, a method 1700 includes the following steps.

Step 1701: Start a thermometer application.

Step 1702: A temperature measurement record interface is displayed.

Step 1703: In the temperature measurement record interface of the thermometer application, view the displayed temperature data that is classified based on a saved measured object.

For example, the temperature measurement record interfaces shown in FIG. 12D to FIG. 13B may include temperature data of "Xiao Ming" and "Baby". It should be understood that, for each measured object, a measured object name, a temperature measurement date, a temperature measurement time point, and a measurement result may be viewed.

1704: The user may delete the temperature data of the measured object on the temperature measurement record interface. Optionally, a plurality of pieces of temperature data may be deleted in batches, or all pieces of temperature data of the measured object may be deleted, or only one piece of temperature data is deleted. This is not limited in this embodiment of this application.

Figure 12D:
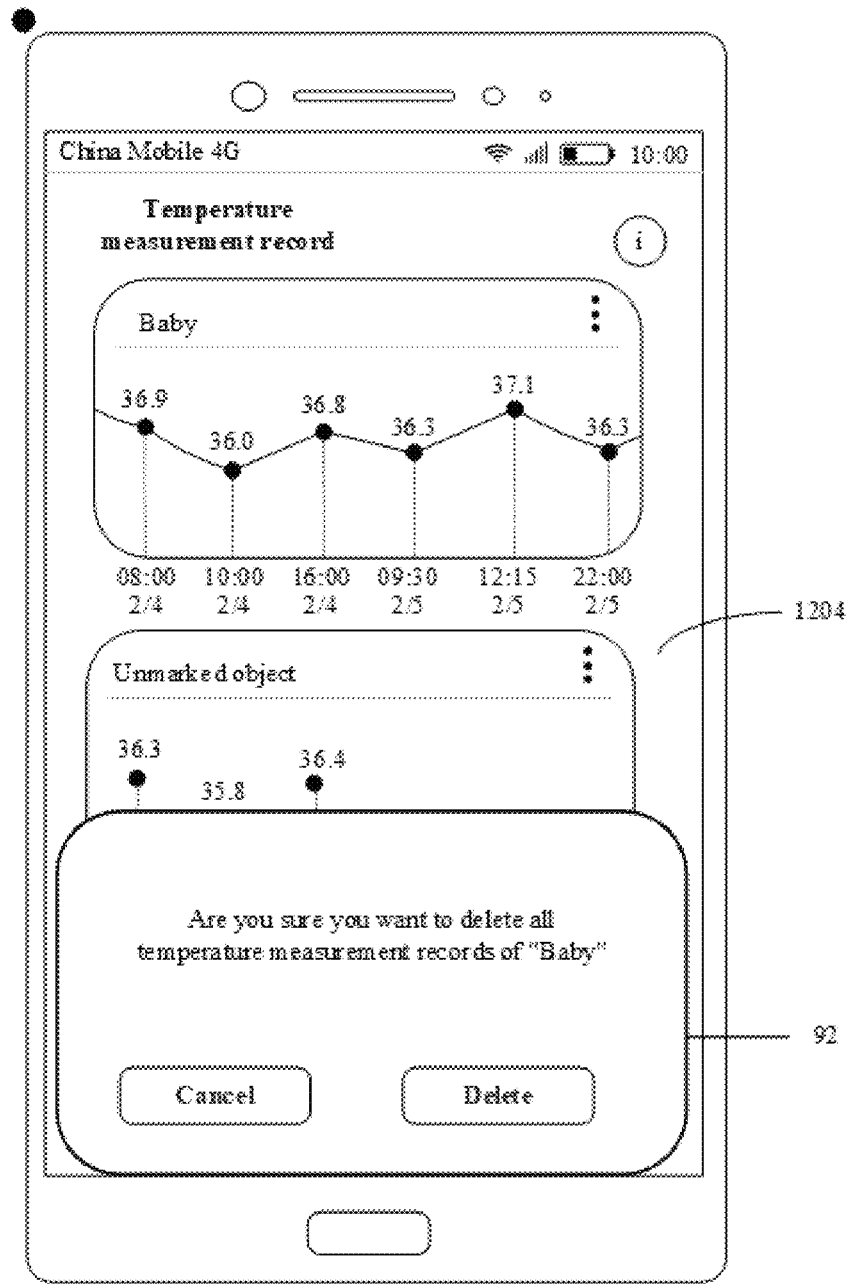

For example, as shown in FIG. 12C and FIG. 12D, the user may delete all temperature measurement records of "Baby". Alternatively, as shown in FIG. 13A and FIG. 13B, the user can delete a temperature measurement record of "Baby" at 12:15 on February 5.

Step 1705: The user may edit or rename the measured object name on the temperature measurement record interface.

In conclusion, in the embodiments of this application, a temperature measurement function of an electronic device can be used to quickly and securely measure the body temperature of the infant anytime and anywhere. In the temperature measurement process, a temperature sensor does not need to contact the measured object. This makes the temperature measurement process more sanitary and safer. In addition, because the electronic device is portable and movable, temperatures of a human body and an object can be measured anytime and anywhere, and measurement results can be classified, recorded, intelligently matched, viewed, and managed, to avoid a trouble of carrying a plurality of devices by the user, and to improve user experience.

Specifically, before temperature measurement, the user may select different temperature measurement modes, for example, body temperature measurement, animal temperature measurement, or another object temperature measurement, and then start a temperature measurement process. In the temperature measurement process, the user may be prompted in real time about a measurement distance. In addition, the user does not need to manually select a measurement object, and the measurement object may be intelligently identified, to complete the entire temperature measurement process. After the temperature measurement is complete, the measurement result is displayed, and the temperature data can be intelligently matched to different measured objects. Alternatively, the temperature data can be manually marked and saved to different measured objects. The user can view, classify, delete, and edit the temperature data.

It may be understood that, to implement the foregoing functions, the electronic device includes corresponding hardware and/or software modules for performing the functions. Algorithm steps in the examples described with reference to the embodiments disclosed in this specification can be implemented by hardware or a combination of hardware and computer software in this application. Whether a function is performed by hardware or hardware driven by computer software depends on particular applications and design constraints of the technical solutions. A person skilled in the art may use a different method to implement the described functions for each particular application, but it should not be considered that the implementation goes beyond the scope of this application.

In the embodiments, function modules of the electronic device may be obtained through division based on the foregoing method examples. For example, the function modules may be obtained through division corresponding to various functions, or two or more functions may be integrated into one processing module. The integrated module may be implemented in a form of hardware. It should be noted that the module division in this embodiment is an example, and is merely a logical function division. In actual implementation, another division manner may be used.

Figure 18:
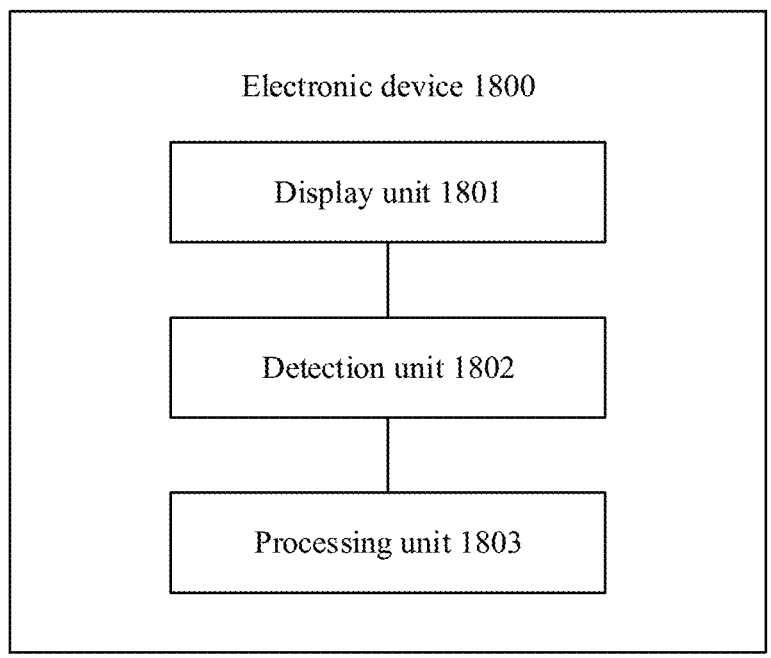
FIG. 18 is a possible schematic composition diagram of another electronic device according to an embodiment of this application.

When each function module is obtained through division based on each corresponding function, FIG. 18 is a schematic composition of a possible diagram of still another electronic device 1800 according to an embodiment of this application. As shown in FIG. 18, the electronic device 1800 may include a display unit 1801, a detection unit 1802, and a processing unit 1803.

The display unit 1801, the detection unit 1802, and the processing unit 180 cooperate with each other, and may be configured to support the electronic device 1800 in performing the foregoing temperature measurement process, and/or used in another process of the technology described in this specification.

It should be noted that all related content of the steps in the foregoing method embodiments may be cited in function descriptions of corresponding function modules. Details are not described herein again.

The electronic device provided in this embodiment is configured to perform the foregoing video playing method, and therefore can achieve a same effect as the foregoing implementation method.

When an integrated unit is used, the electronic device may include a processing module, a storage module, and a communications module. The processing module may be configured to control and manage an action of the electronic device. For example, the processing module may be configured to support the electronic device in performing the steps performed by the display unit 1801, the detection unit 1802, and the processing unit 1803. The storage module may be configured to support the electronic device in storing program code, data, and the like. The communications module may be configured to support communication between the electronic device and another device.

The processing module may be a processor a controller. The processing module may implement or execute various example logical blocks, modules, and circuits described with reference to content disclosed in this application. Alternatively, the processor may be a combination of processors implementing a computing function, for example, a combination of one or more microprocessors, or a combination of a digital signal processor (DSP) and a microprocessor. The storage module may be a memory. The communications module may be specifically a radio frequency circuit, a BLUETOOTH chip, a Wi-Fi chip, or another device that interacts with another electronic device.

In an embodiment, when the processing module is a processor and the storage module is a memory, the electronic device in this embodiment may be a device in the structure shown in FIG. 1.

This embodiment further provides a computer-readable storage medium. The computer-readable storage medium stores a computer instruction. When the computer instruction is run on an electronic device, the electronic device is enabled to perform the related method steps to implement the temperature measurement method in the foregoing embodiment.

This embodiment further provides a computer program product. When the computer program product runs on a computer, the computer is enabled to perform the foregoing related steps, to implement the temperature measurement method in the foregoing embodiment.

In addition, an embodiment of this application further provides an apparatus. The apparatus may be specifically a chip, a component, or a module. The apparatus may include a processor and a memory that are connected. The memory is configured to store a computer execution instruction. When the apparatus runs, the processor may execute the computer execution instruction stored in the memory, to enable the chip to perform the temperature measurement method in the foregoing method embodiments.

The electronic device, the computer-readable storage medium, the computer program product, or the chip provided in the embodiments may be configured to perform the corresponding methods provided above. Therefore, for beneficial effects that can be achieved, refer to the beneficial effects of the corresponding methods provided above. Details are not described herein again.

The foregoing descriptions about implementations allow a person skilled in the art to understand that, for convenient and brief description, division of the foregoing function modules is taken as an example for illustration. In actual application, the foregoing functions can be allocated to different modules and implemented according to a requirement, in other words, an inner structure of an apparatus is divided into different function modules to implement all or some of the functions described above.

In the several embodiments provided in this application, it should be understood that the disclosed apparatus and method may be implemented in another manner. For example, the described apparatus embodiment is merely an example. For example, the module or unit division is merely logical function division. In actual implementation, there may be another division manner. For example, a plurality of units or components may be combined or integrated into another apparatus, or some features may be ignored or not performed. In addition, the displayed or discussed mutual couplings, direct couplings, or communication connections may be implemented by using some interfaces. The indirect couplings or the communication connections between apparatuses or units may be implemented in electronic, mechanical, or other forms.

The units described as separate parts may or may not be physically separate, and parts displayed as units may be one or more physical units, may be located in one place, or may be distributed in different places. Some or all of the units may be selected based on actual requirements to achieve the objectives of the solutions in the embodiments.

In addition, function units in the embodiments of this application may be integrated into one processing unit, or each of the units may exist alone physically, or two or more units are integrated into one unit. The integrated units may be implemented in a form of hardware, or may be implemented in a form of a software functional unit.

When the integrated unit is implemented in the form of a software function unit and sold or used as an independent product, the integrated unit may be stored in a readable storage medium. Based on such an understanding, the technical solutions in the embodiments may be implemented in a form of a software product. The software product is stored in a storage medium, and includes several instructions for instructing a device (which may be a single-chip microcomputer, a chip, or the like) or a processor to perform all or some of the steps of the methods in the embodiments of this application. The foregoing storage medium includes: any medium that can store program code, such as a Universal Serial Bus (USB) flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method implemented by one or more processors of an electronic device, wherein the method comprises:
    displaying a temperature measurement interface;
    receiving, from a user on the temperature measurement interface, a temperature measurement operation;
    measuring, in response to the temperature measurement operation and using a temperature sensor of the electronic device, a first temperature of a measured object;
    collecting, using a camera of the electronic device, a picture of the measured object;
    determining, based on the picture, a type of the measured object;
    matching, based on the type, a temperature algorithm for the measured object; and
    determining, based on the first temperature and the temperature algorithm, a second temperature of the measured object.

2. The method of claim 1, further comprising:
    receiving, from the user, a recording operation;
    displaying, in response to the recording operation, a predicted object name; and
    saving information about the second temperature in an information base of the measured object when the predicted object name comprises the measured object; and
    adding the measured object to the predicted object name and saving information about the second temperature in the information base when the predicted object name does not comprise the measured object.

3. The method of claim 1, wherein when the measured object is a person, the method further comprises:
    determining, based on the picture, a measurement part of the person;
    determining, based on the measurement part, a first correction algorithm; and
    further determining, based on the first correction algorithm, the second temperature.

4. The method of claim 3, wherein the picture comprises a facial feature of the measured object, and wherein the method further comprises displaying a first contact in the predicted object name when a degree of matching between the facial feature and a profile picture of the first contact in an address book contacts is greater than a preset value.

5. The method of claim 3, wherein the picture comprises a facial feature of the measured object, and wherein the method further comprises displaying a first portrait user in the predicted object name when a degree of matching between the facial feature and the first portrait user marked in a gallery is greater than a preset value.

6. The method of claim 1, further comprising displaying a first prompt window or sending a first voice prompt when a preset scenario is met, wherein the first prompt window or the first voice prompt prompts the user that the second temperature cannot be currently displayed, and wherein the preset scenario comprises:
    detecting that the second temperature is beyond a first preset range;
    detecting that a distance between the measured object and the temperature sensor is beyond a second preset range;
    failing to detect the measured object;
    detecting that an ambient temperature is beyond a third preset range; or
    detecting that a temperature of the electronic device is beyond a fourth preset range.

7. The method of claim 1, further comprising displaying a second prompt window or sending a second voice prompt when the measured object is a person, the second temperature is within a first preset range, and a health status of the measured object, based on the second temperature, is abnormal, wherein content of the second prompt window or the second voice prompt comprises one or more:
    the abnormal health status of the measured object;
    outpatient medical information for the abnormal health status; or
    a news event related to the abnormal health status.

8. The method of claim 1, further comprising:
    determining a second correction algorithm based on the type; and
    determining the second temperature of the measured object based on the first temperature, the temperature algorithm, the first correction algorithm, and the second correction algorithm.

9. The method of claim 8, further comprising:
    determining an epsilon of the measured object based on the type; and
    determining the second correction algorithm based on the epsilon.

10. The method of claim 1, further comprising displaying the second temperature in the temperature measurement interface or broadcasting the second temperature by voice when the second temperature is within a first preset range.

11. The method of claim 2, wherein the information comprises a measurement time point, and wherein the method further comprises:

receiving, from a user, a deletion operation of the user; and deleting in response to the deletion operation, current information about the second temperature or deleting information about all second temperatures of the measured object.

12. The method of claim 1, wherein after displaying the temperature measurement interface, the method further comprises calibrating, in a calibration manner, the temperature sensor, wherein the calibration manner comprises one or more of:

automatically calibrating the temperature sensor;

periodically calibrating the temperature sensor;

calibrating, in response to receiving, from the user, a calibration operation instruction, the temperature sensor; or calibrating the temperature sensor when detecting an environment change or a position change of the electronic device.

13. An electronic device comprising:

a camera;

a temperature sensor disposed adjacent to the camera;

a memory coupled to the temperature sensor and configured to store computer instructions; and one or more processors coupled to the memory, wherein when executed by the processor, the computer instructions cause the electronic device to:

display a temperature measurement interface;

receive, from a user on the temperature measurement interface, a temperature measurement operation;

measure, in response to the temperature measurement operation and using the temperature sensor, a first temperature of a measured object;

collect, using the camera, a picture of the measured object;

determine, based on the picture, a type of the measured object;

match, based on the type, a temperature algorithm for the measured object; and determine, based on the first temperature and the temperature algorithm, a second temperature of the measured object.

14. The electronic device of claim 13, wherein when executed by the one or more processors, the computer instructions further cause the electronic device to:

receive, from the user, a recording operation;

display, in response to the recording operation, a predicted object name; and save information about the second temperature in an information base of the measured object when the predicted object name comprises the measured object; and add the measured object to the predicted object name, and saving information about the second temperature in an information base of the measured object when the predicted object name does not comprise the measured object.

15. The electronic device of claim 13, wherein the measured object is a person, and wherein when executed by the one or more processors, the computer instructions further cause the electronic device to:

determine a measurement part of the person based on the picture;

determine a first correction algorithm based on the measurement part; and further determine the second temperature based on the first correction algorithm.

16. The electronic device of claim 15, wherein the picture comprises a facial feature of the measured object, and wherein when executed by the one or more processors, the computer instructions further cause the electronic device to display a first contact in the predicted object name when a degree of matching between the facial feature and a profile picture of a first contact in an address book contacts is greater than a preset value.

17. The electronic device of claim 15, wherein the picture of the measured object comprises a facial feature of the measured object, and wherein when executed by the one or more processors, the computer instructions further cause the electronic device to display a first portrait user in the predicted object name when a degree of matching between the facial feature and a first portrait user marked in a gallery is greater than a preset value.

18. The electronic device of claim 13, wherein when executed by the one or more processors, the computer instructions further cause the electronic device to display a first prompt window or send a first voice prompt when a preset scenario is met, wherein the first prompt window or the first voice prompt prompts the user that the second temperature cannot be currently displayed, and wherein the preset scenario comprises:

detecting that the second temperature is beyond a first preset range;

detecting that a distance between the measured object and the temperature sensor is beyond a second preset range;

failing to detect the measured object;

detecting that an ambient temperature is beyond a third preset range;

detecting that a temperature of the electronic device is beyond a fourth preset range.

19. The electronic device of claim 13, wherein when executed by the one or more processors, the computer instructions further cause the electronic device to display a second prompt window or send a second voice prompt when the measured object is a person, the second temperature is within the first preset range and a health status of the measured object, based on the second temperature is abnormal, and wherein content of the second prompt window or the second voice prompt comprises one or more of the following:

the abnormal health status of the measured object;

outpatient medical information for the abnormal health status; or a news event related to the abnormal health status.

20. A computer program product comprising computer-executable instructions that are stored on a non-transitory computer-readable storage medium and that, when executed by one or more processors, cause an electronic device to:

display a temperature measurement interface;

receive, from a user on the temperature measurement interface, a temperature measurement operation;

measure, in response to the temperature measurement operation and using the temperature sensor, a first temperature of a measured object;

collect, using the camera, a picture of the measured object;

determine a type of the measured object based on the picture;

match, based on the type, a temperature algorithm for the measured object; and determine, based on the first temperature and the temperature algorithm, a second temperature of the measured object.

* * * * *